(12) United States Patent
Yoshimura

(10) Patent No.: US 7,884,887 B2
(45) Date of Patent: Feb. 8, 2011

(54) PROJECTOR DEVICE COMPRISING OPTICAL COMPENSATION SHEET HOLDER INCLUDING TURNING MEMBER AND SLIDING MEMBER

(75) Inventor: Taichi Yoshimura, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 428 days.

(21) Appl. No.: 11/516,774

(22) Filed: Sep. 7, 2006

(65) Prior Publication Data

US 2007/0064198 A1    Mar. 22, 2007

(30) Foreign Application Priority Data

Sep. 9, 2005    (JP) .............................. 2005-262886

(51) Int. Cl.
G02F 1/1335    (2006.01)
G02F 1/1333    (2006.01)
G03B 21/14    (2006.01)
G03B 21/22    (2006.01)

(52) U.S. Cl. .............................. 349/5; 349/58; 349/62; 349/117; 353/20; 353/119

(58) Field of Classification Search .............. 349/5–10, 349/58, 62, 117; 353/100, 119, 20
See application file for complete search history.

(56) References Cited

U.S. PATENT DOCUMENTS

| | | | |
|---|---|---|---|
| 6,556,266 B1 * | 4/2003 | Shirochi et al. ............. | 349/118 |
| 6,624,862 B1 * | 9/2003 | Hayashi et al. ............. | 349/119 |
| 6,902,277 B1 * | 6/2005 | Ehrne ......................... | 349/58 |
| 7,097,306 B2 * | 8/2006 | Furuta et al. ................. | 353/20 |
| 2005/0110962 A1 * | 5/2005 | Watanabe et al. ........... | 353/119 |

FOREIGN PATENT DOCUMENTS

| | | |
|---|---|---|
| JP | 2001-042314 A | 2/2001 |
| JP | 2002-182213 A | 6/2002 |
| JP | 2006-39087 A | 2/2006 |
| JP | 2006-78637 A | 3/2006 |

OTHER PUBLICATIONS

Japanese Office Action dated Jun. 10, 2008, issued in corresponding Japanese Patent Application No. 2005-262886.
Japanese Office Action dated Oct. 5, 2010, issued in corresponding Japanese Patent Application No. 2008-101037.

* cited by examiner

*Primary Examiner*—Mark A Robinson
*Assistant Examiner*—Paisley L Arendt
(74) *Attorney, Agent, or Firm*—Westerman, Hattori, Daniels & Adrian, LLP

(57)    ABSTRACT

A liquid crystal projector device of the present invention has a liquid crystal panel and a polarizing plate oppositely arranged on each optical path of light of three primary colors, and a rectangular optical compensation sheet for compensating birefringence of liquid crystal molecules in the liquid crystal panel, which is held by an optical compensation sheet holder and arranged between the liquid crystal panel and the polarizing plate. The optical compensation sheet holder includes a frame for holding the optical compensation sheet, and a turning member, which holds the frame turnably on a rotation axis approximately parallel to one of a pair of diagonals of the liquid crystal panel, and is attached to an end edge of an optical system holding case for holding an optical system turnably on a rotation axis perpendicular to the optical compensation sheet.

5 Claims, 37 Drawing Sheets

FIG. 34
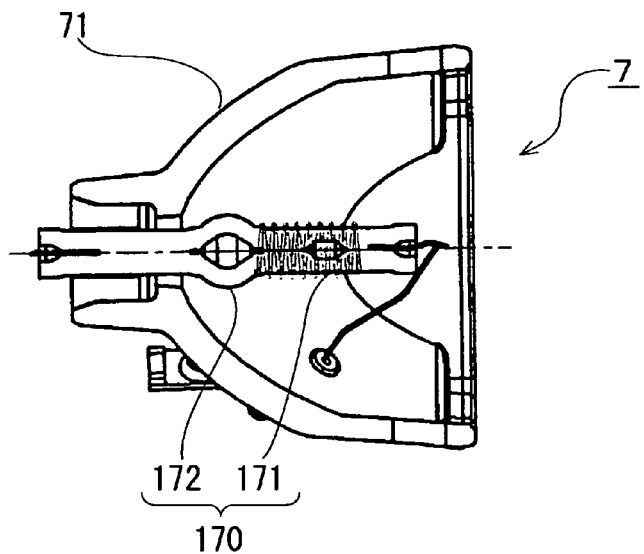
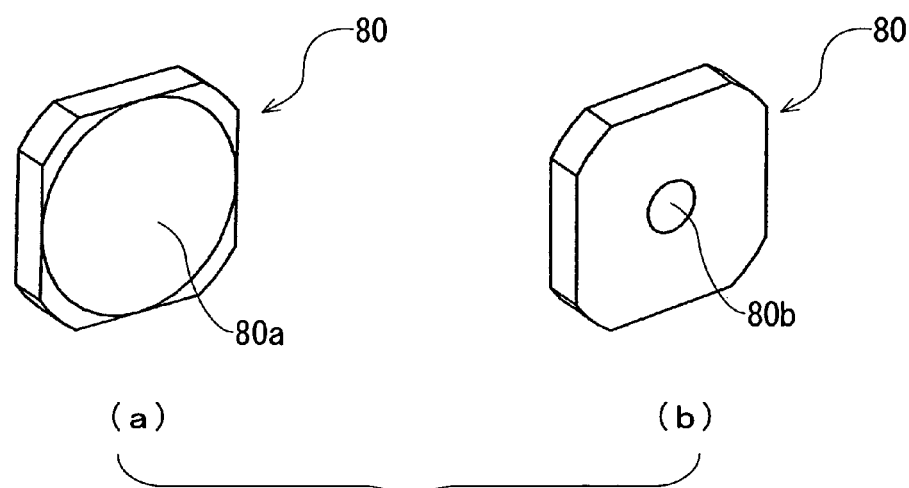
(a) (b)
FIG. 35

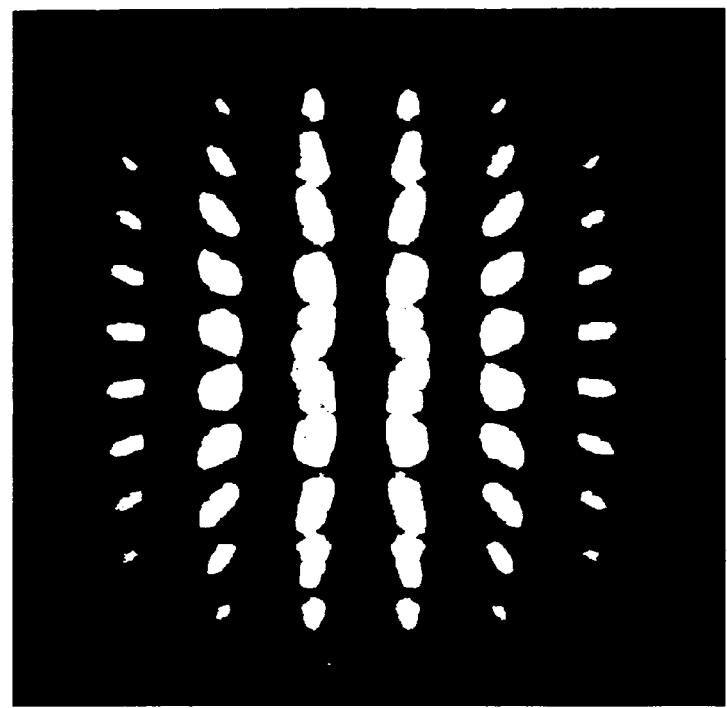
(a)
FIG. 43
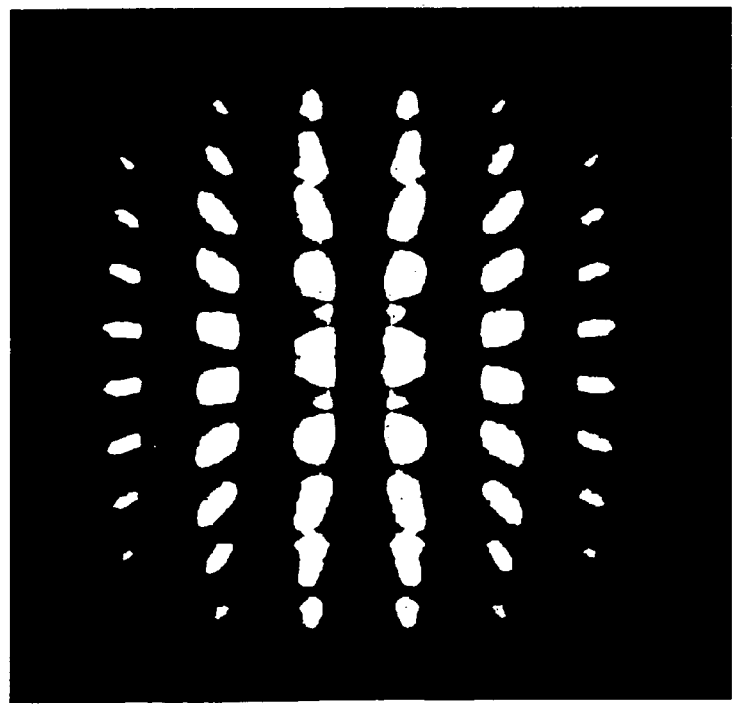
(b)

OUTSIDE AIR TEMPERATURE [°C]

PROJECTOR DEVICE COMPRISING OPTICAL COMPENSATION SHEET HOLDER INCLUDING TURNING MEMBER AND SLIDING MEMBER

The priority application Number 2005-262886 upon which this patent application is based is hereby incorporated by reference.

BACKGROUND OF THE INVENTION

1. Field of the Invention

The present invention relates to a projector device adapted to guide light from a light source to an optical system to generate image light for magnification projection on a forward screen.

2. Description of Related Art

Conventionally known as a projector device of this type is a liquid crystal projector device adapted to separate white light emitted from a light source into three primary colors of blue, green, and red for incidence on three liquid crystal panels for three primary colors, to synthesize the light transmitted by the liquid crystal panels with a color synthesis prism to generate a color image, and to magnifyingly project the color image on a forward screen with a projection lens.

Known as one of those as described above is a liquid crystal projector device having optical compensation sheets arranged at light incidence sides or light emergence sides of the respective liquid crystal panels for the respective colors in order to prevent light leak. The optical compensation sheets have liquid crystal molecules therein. The optical compensation sheets are attached such that the liquid crystal molecules have a slow axis in a direction parallel to an alignment direction of liquid crystal molecules constituting the respective liquid crystal panels to thereby perform a function of blocking incidence of unwanted component waves of light on the respective liquid crystal panels. This can prevent light leak and uneven coloring from occurring in the liquid crystal panels.

The optical compensation sheets are prepared by being cut in a necessary size from a sheet material. Therefore, the optical compensation sheets have variations within a certain tolerance in the slow axis direction of the liquid crystal molecules in each of the optical compensation sheets. Therefore, an adjustment mechanism for adjusting the optical compensation sheets in place relative to the liquid crystal panels is necessary in order to attach the optical compensation sheets such that the liquid crystal molecules in the optical compensation sheets have a slow axis in a direction parallel to an alignment direction of liquid crystal molecules in the liquid crystal panels.

The applicant has proposed an optical compensation sheet holder constructed such that an optical compensation sheet is inclination-adjustable relative to an optical axis of a liquid crystal panel, and is rotation-adjustable within a plane perpendicular to the optical axis (JP 2006-039087, A). As shown in FIG. 48 and FIG. 49, the optical compensation sheet holder 200 includes a generally L-shaped turning member 210 for holding the optical compensation sheet 290, and an auxiliary member 220 to which the turning member 210 is fastened, and which is to be attached to a stationary part 251 erected on a chassis 250 of an optical system.

As shown in FIG. 49, the turning member 210 has a centrally provided opening 211, which allows light passage. The optical compensation sheet 290 is fitted in the opening 211. The upper part of the turning member 210 has a pair of first long holes 212, 212 longer along the optical axis L and provided at opposite sides across the optical axis L, and operation parts protruded from opposite ends thereof and to be operated by an adjustment worker.

The auxiliary member 220 has screw holes 221, 221, which are provided in positions corresponding to the pair of first long holes 212, 212, and into which screws 230, 230 for fastening the turning member 210 are screwed, a pair of second long holes 223, 223 longer in the direction perpendicular to the optical axis L and provided at opposite sides across the optical axis L, and a third long hole 222 longer in the direction perpendicular to the optical axis L.

The upper surface of the stationary part 251 on the chassis 250 has guide pins 252, 252 projectingly provided in positions corresponding to the pair of second long holes 223, 223 to penetrate through both long holes 223, 223, and a screw hole 253, which is provided in a position corresponding to the third long hole 222, and into which a screw 260 for fastening the auxiliary member 220 is screwed.

As described above, the optical compensation sheet holder 200 allows a first adjustment operation of sliding the optical compensation sheet holder 200, with the screw 260 loosened, in the direction perpendicular to the optical axis L, and a second adjustment operation of turning the turning member 210, with one of the two screws 230, 230 loosened, on the other screw to incline a surface of the optical compensation sheet 290 relative to a plane perpendicular to the optical axis L. Therefore, using the first and second adjustment operations, the above optical compensation sheet holder 200 enables the optical compensation sheet 290 to be adjusted in place such that liquid crystal molecules in the optical compensation sheet 290 have a slow axis in a direction parallel to an alignment direction of liquid crystal molecules in the liquid crystal panel.

However, the above optical compensation sheet holder 200 has caused a problem of poor workability because in the second adjustment operation the optical compensation sheet 290 turns with one of the two screws 230, 230 loosened on the other screw, and therefore the reference position of the turning axis of the optical compensation sheet 290 in adjustment work varies depending on where the other screw is screwed. In addition, the second adjustment operation could produce warpages and flexures in the auxiliary member 220, which produce a stress in the optical compensation sheet 290 attached to the auxiliary member 220. This has resulted in a problem of deviation of the slow axis direction of the liquid crystal molecules in the optical compensation sheet 290.

SUMMARY OF THE INVENTION

An object of the present invention is to provide a projector device in which an optical compensation sheet can be adjusted in place more easily than conventionally without any additional force acting on the optical compensation sheet after being adjusted in place.

A projector device of the present invention includes a light source, an optical system 3 for separating light from the light source into light of three primary colors, an image synthesizer 4 for synthesizing the light of three primary colors into color image light, and a holding case 30 for holding the image synthesizer 4 and the optical system 3. A liquid crystal panel and a polarizing plate are oppositely arranged on each optical path of the light of three primary colors, and a rectangular optical compensation sheet for compensating light birefringence due to the liquid crystal panel is arranged between the liquid crystal panel and the polarizing plate.

The optical compensation sheet is held by an optical compensation sheet holder and attached on the optical path, the optical compensation sheet holder including a frame 61 for holding the optical compensation sheet, a turning member 62 attached to the holding case 30 turnably on a first rotation axis perpendicular to the optical compensation sheet held by the frame 61, the frame 61 being attached to the turning member 62 turnably on a second rotation axis parallel to the optical compensation sheet.

In the projector device of the present invention, the optical compensation sheet can be adjusted in place using a first adjustment operation of turning the optical compensation sheet holder on the first rotation axis, and a second adjustment operation of turning the frame 61 for holding the optical compensation sheet on the second rotation axis to incline a surface of the optical compensation sheet relative to a plane perpendicular to an optical axis of light to pass through the optical compensation sheet.

The frame 61 is attached to the turning member 62 turnably on the rotation axis parallel to the optical compensation sheet. Therefore, the reference position of the rotation axis of the frame 61 in the second adjustment operation is constant regardless of the turning posture of the frame 61. The optical compensation sheet is thereby adjusted in place more easily than conventionally. In addition, no warpage or flexure occurs in the second adjustment operation, and therefore no stress acts on the optical compensation sheet attached to the frame 61. This will result in prevention of deviation of the slow axis direction of liquid crystal molecules in the optical compensation sheet.

In a specific configuration, the rotation axis of the frame 61 is provided parallel or approximately parallel to any one of a pair of diagonals of the liquid crystal panel. The optical compensation sheet is adjusted in place by projecting an adjustment image using the projector device and adjusting the optical compensation sheet holder in place using the first and second adjustment operations to ensure that the adjustment image has a clear black-and-white contrast. As a result of intensive study of a method for the second adjustment operation, the patent applicant has found that the contrast of the adjustment image significantly changes between before and after the slow axis of liquid crystal molecules in the liquid crystal panel corresponds to an apparent slow axis of the optical compensation sheet by setting the rotation axis of the frame 61 parallel or approximately parallel to one diagonal of the liquid crystal panel. Therefore, the specific configuration makes it easier to adjust the optical compensation sheet in place.

In a specific configuration, the frame 61 has a pair of columnar shanks 61a, 61a protruded outward from an outer peripheral thereof, and the turning member 62 has a rectangular opening 62c provided centrally therein, and a pair of supports 66a, 66b for supporting the shanks 61a, 61a of the frame 61, provided around the opening 62c, the pair of columnar shanks 61a, 61a providing the rotation axis of the frame 61. According to the specific configuration, the frame 61 turns on the pair of shanks 61a, 61a in the second adjustment operation. Therefore, the position of the rotation axis of the frame 61 can be arbitrarily set by changing the protruded position of the pair of shanks 61a, 61a in a plane parallel to the optical compensation sheet.

In a further specific configuration, the optical compensation sheet holder includes a slide member 63 attached to the turning member 62 slidably along the optical axis, and the slide member 63 has a pinching part 63b for pinching a turning end of the frame 61, provided at one end thereof.

According to the specific configuration, the surface of the optical compensation sheet can be inclined at any angle relative to a plane perpendicular to the optical axis by sliding the slide member 63 along the optical axis.

Furthermore, in a specific configuration, the turning member 62 is provided with a first long hole 69a longer in a direction perpendicular to the optical axis, and the slide member 63 is provided with a second long hole 69c longer in the optical axis direction, the slide member 63 being fastened to the turning member 62 by a first screw 64a through the second long hole 69c, the turning member 62 being fastened to the holding case 30 by a second screw 64b through the first long hole 69a.

According to the specific configuration, loosening the second screw 64b allows uniaxial slide operation of the optical compensation sheet holder perpendicular to the optical axis within the first long hole 69a. The slide operation allows the first adjustment operation of turning the optical compensation sheet holder on the rotation axis parallel to the optical axis.

Loosening the first screw 64a allows slide operation of the slide member 63 along the optical axis within the second long hole 69c. The slide operation allows the second adjustment operation of inclining the surface of the optical compensation sheet relative to a plane perpendicular to the optical axis.

As described above, according to the projector device of the present invention, the optical compensation sheet can be adjusted in place more easily than conventionally without any additional force acting on the optical compensation sheet after being adjusted in place.

BRIEF DESCRIPTION OF THE DRAWINGS

FIG. 34 is a sectional view showing an internal structure of the lamp unit;

FIG. 35 includes front and back perspective views of the concave lens;

FIG. 43 illustrates arc images formed on the polarization beam splitter in the case of using the concave lens of the present invention, and arc images formed on the polarization beam splitter in the case of using a conventional concave lens;

DETAILED DESCRIPTION OF THE INVENTION

The present invention embodied in a liquid crystal projector device will be specifically described below with reference to the drawings. In the description given below, the image projection direction of the liquid crystal projector device shown in FIG. 1 is defined as the forward direction, and right and left are defined by facing the front face of the liquid crystal projector device.

Overall Construction

Figure 1:
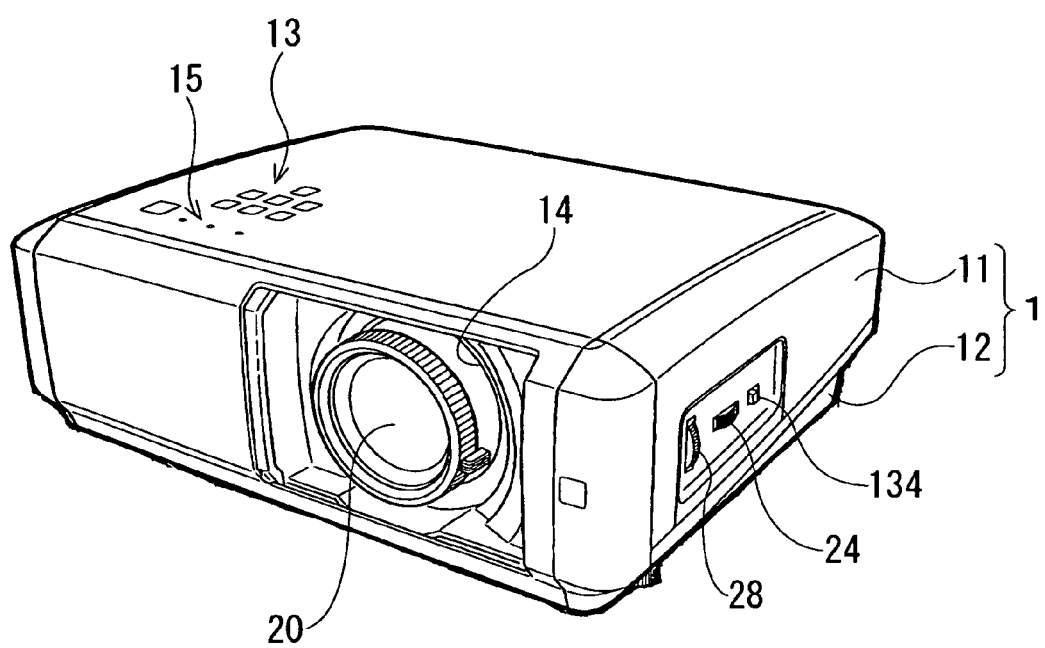
FIG. 1 is a perspective view of a liquid crystal projector device of the present invention.

As shown in FIG. 1, the liquid crystal projector device of the present invention includes a flat casing 1 including an upper half case 11 and a lower half case 12. The casing 1 has a surface thereof provided with an operation portion 13 including a plurality of operation buttons and a warning portion 15 including a plurality of warning lights, while the casing 1 has a front face thereof provided with a projection window 14. The projection window 14 has a projection lens 20 exposed therefrom.

Figure 2:
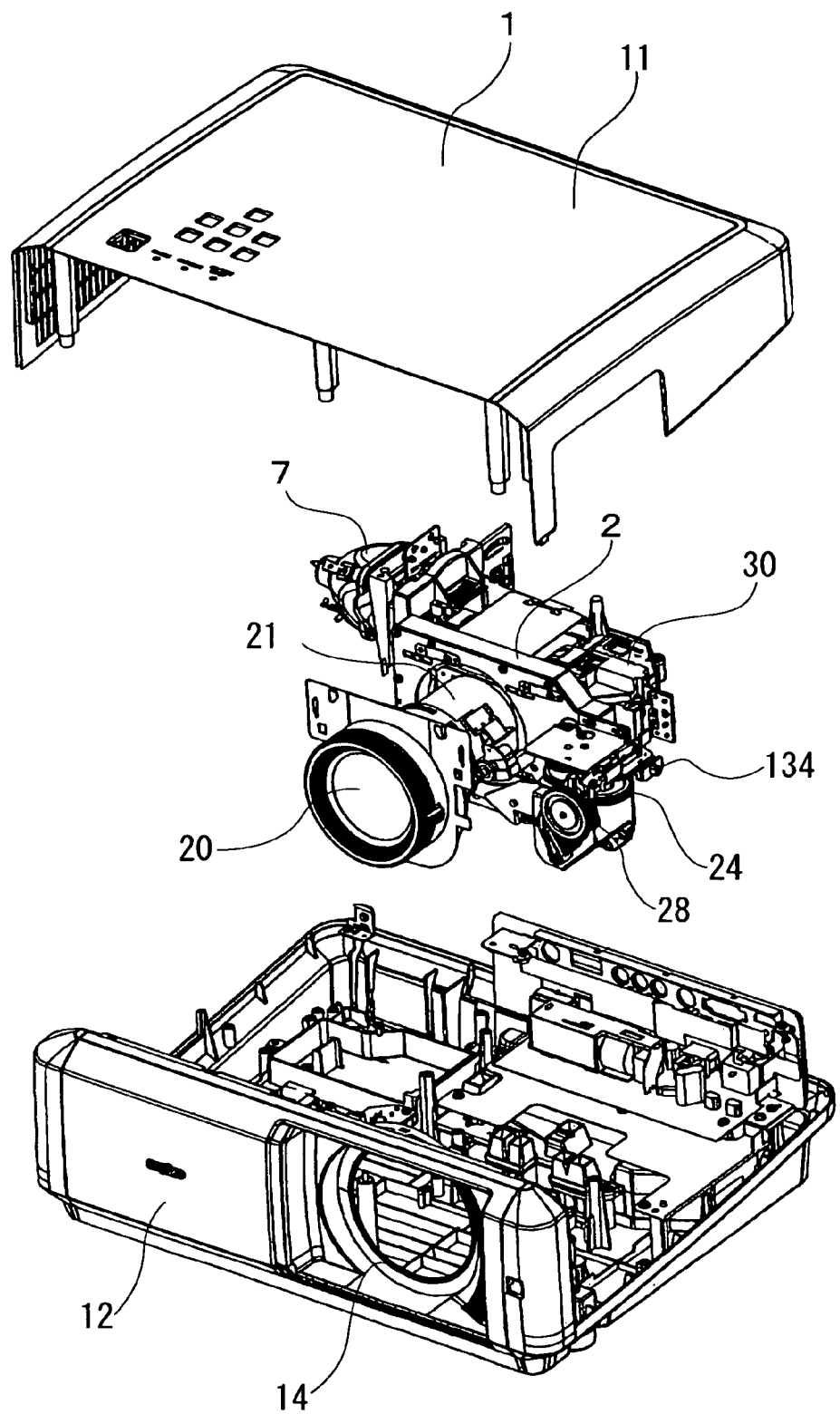
FIG. 2 is an exploded perspective view of the liquid crystal projector device.

As shown in FIG. 2, the casing 1 has an interior provided with a synthetic resin optical system holding case 30 extending in an approximate L-shape. The optical system holding case 30 has a lamp unit 7 providing a light source attached to the left end thereof. Also attached to the forward end of the optical system holding case 30 is a lens shift mechanism 2 for horizontally and vertically reciprocatingly moving a projection lens system including the projection lens 20 and a cylinder 21 for holding the projection lens 20.

Exposed to the right side wall of the casing 1 are, as shown in FIG. 1, a horizontal operation dial 24 for horizontally reciprocatingly moving the projection lens system, a vertical operation dial 28 for vertically reciprocatingly moving the projection lens system, and a knob 134 of a lever member 133 for fixing the projection lens system in a desired position.

Figure 3:
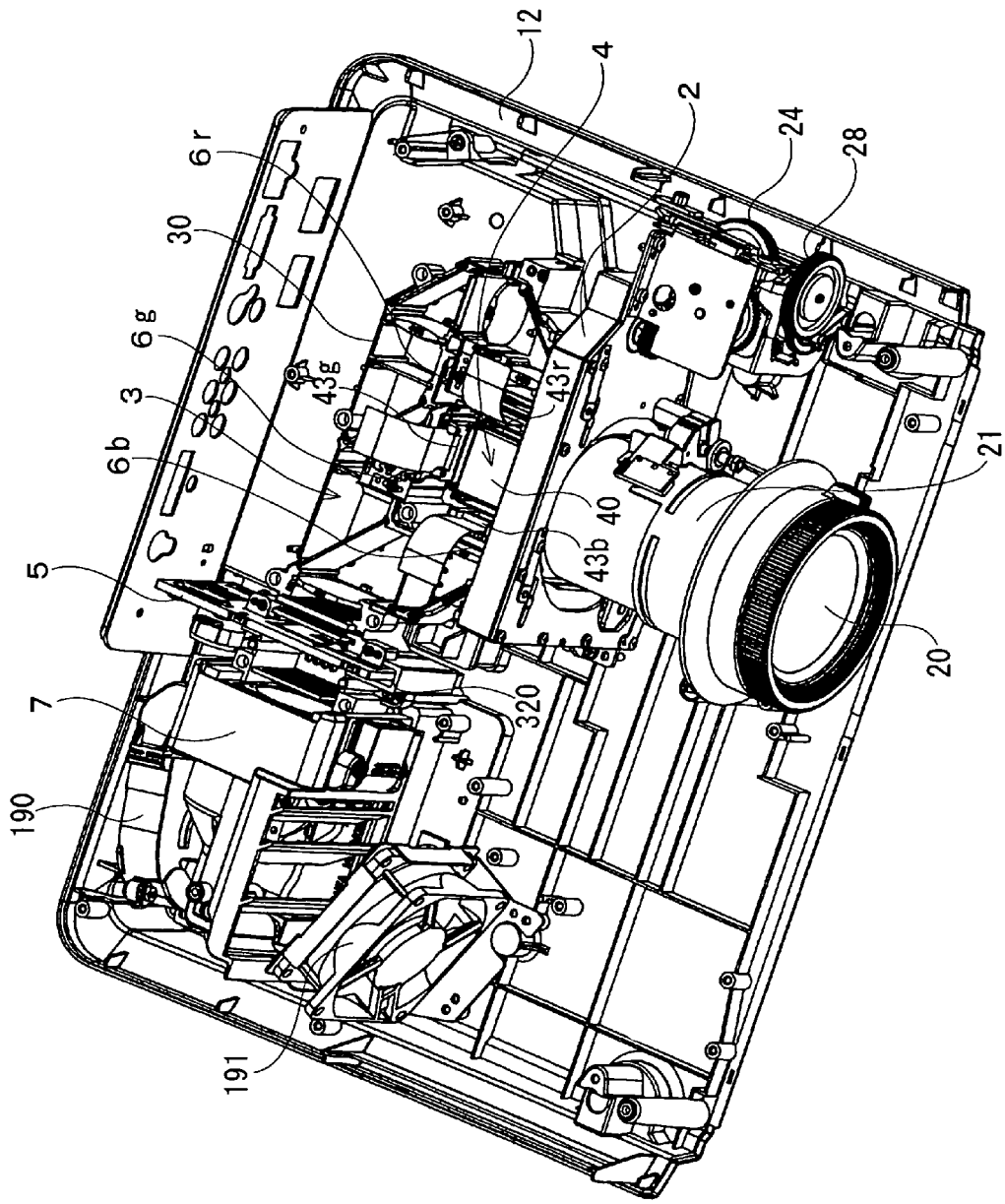
FIG. 3 is a perspective view showing the liquid crystal projector device with an upper half case thereof removed therefrom.

As shown in FIG. 3, the optical system holding case 30 has a slit opening 320 provided at the left end thereof. Inserted in the opening 320 is a diaphragm system 5 for regulating the amount of light to be incident on liquid crystal panels for respective colors 43b, 43g, 43r depending on input data for a projection image in order to improve a contrast of the projection image.

A lamp cooling fan 190 for cooling the lamp unit 7 is placed between the rear wall of the lower half case 12 and one side wall of the lamp unit 7 opposed thereto. An exhaust fan 191 is placed in the left middle of the lower half case 12, with an inlet direction thereof toward the lamp unit 7.

Disposed inside the optical system holding case 30 are an optical system 3 for separating white light emitted from the lamp unit 7 into light of three primary colors, and an image synthesizer 4 for irradiating the liquid crystal panels for three primary colors 43b, 43g, 43r with the light of three primary colors to generate image light of three primary colors, and synthesizing the generated image light of three primary colors into color image light.

Figure 4:
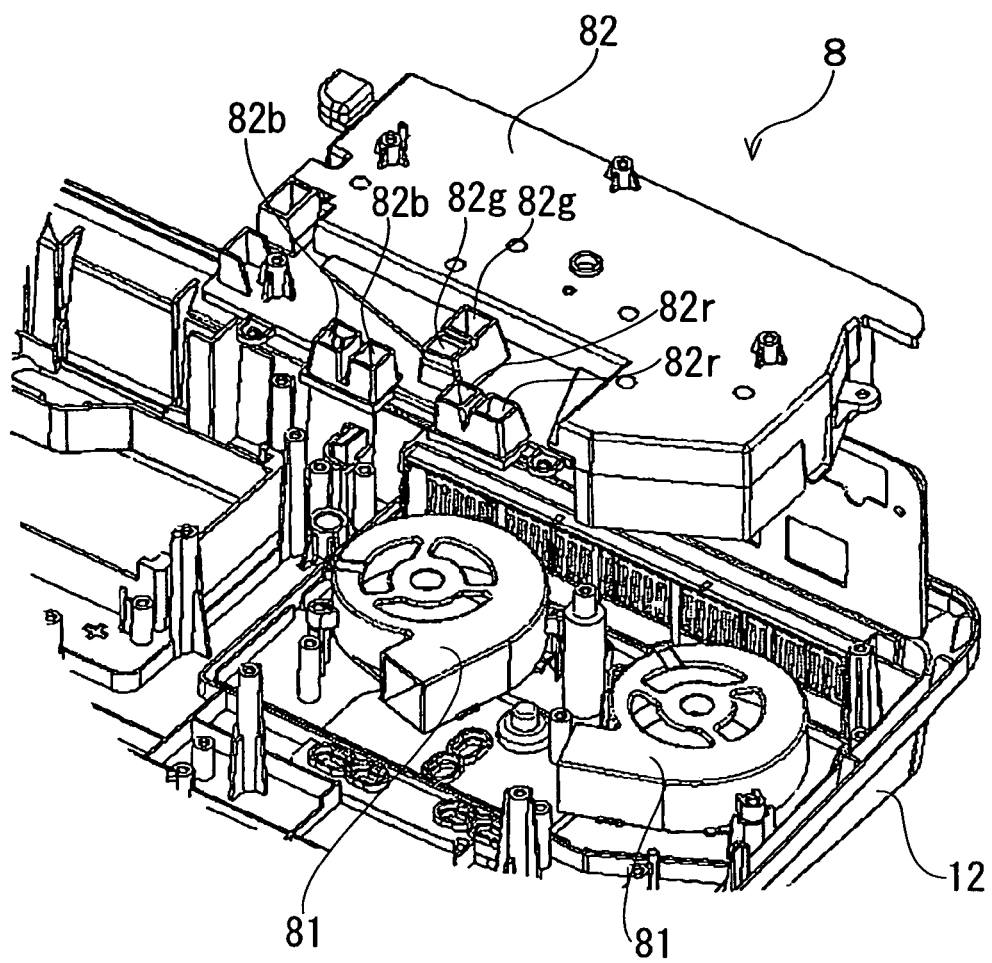
FIG. 4 is an exploded perspective view of a cooling unit.

The image synthesizer 4 includes a cube-like color synthesis prism 40 having the liquid crystal panel for blue 43b, liquid crystal panel for green 43g and liquid crystal panel for red 43r attached to three respective side surfaces thereof. The three liquid crystal panels 43b, 43g, 43r have light incidence sides thereof provided with optical compensation sheet holders 6b, 6g, 6r, respectively. The optical compensation sheet holders 6b, 6g, 6r hold three optical compensation sheets (not shown) for blocking incidence of unwanted component waves of light on the respective liquid crystal panels 43b, 43g, 43r. Disposed below the image synthesizer 4 is, as shown in FIG. 4, a cooling system 8 for cooling a plurality of optical components constituting the image synthesizer 4.

The liquid crystal projector device of the present invention will be described below in detail in construction with reference to the drawings.

Optical System 3

Figure 5:
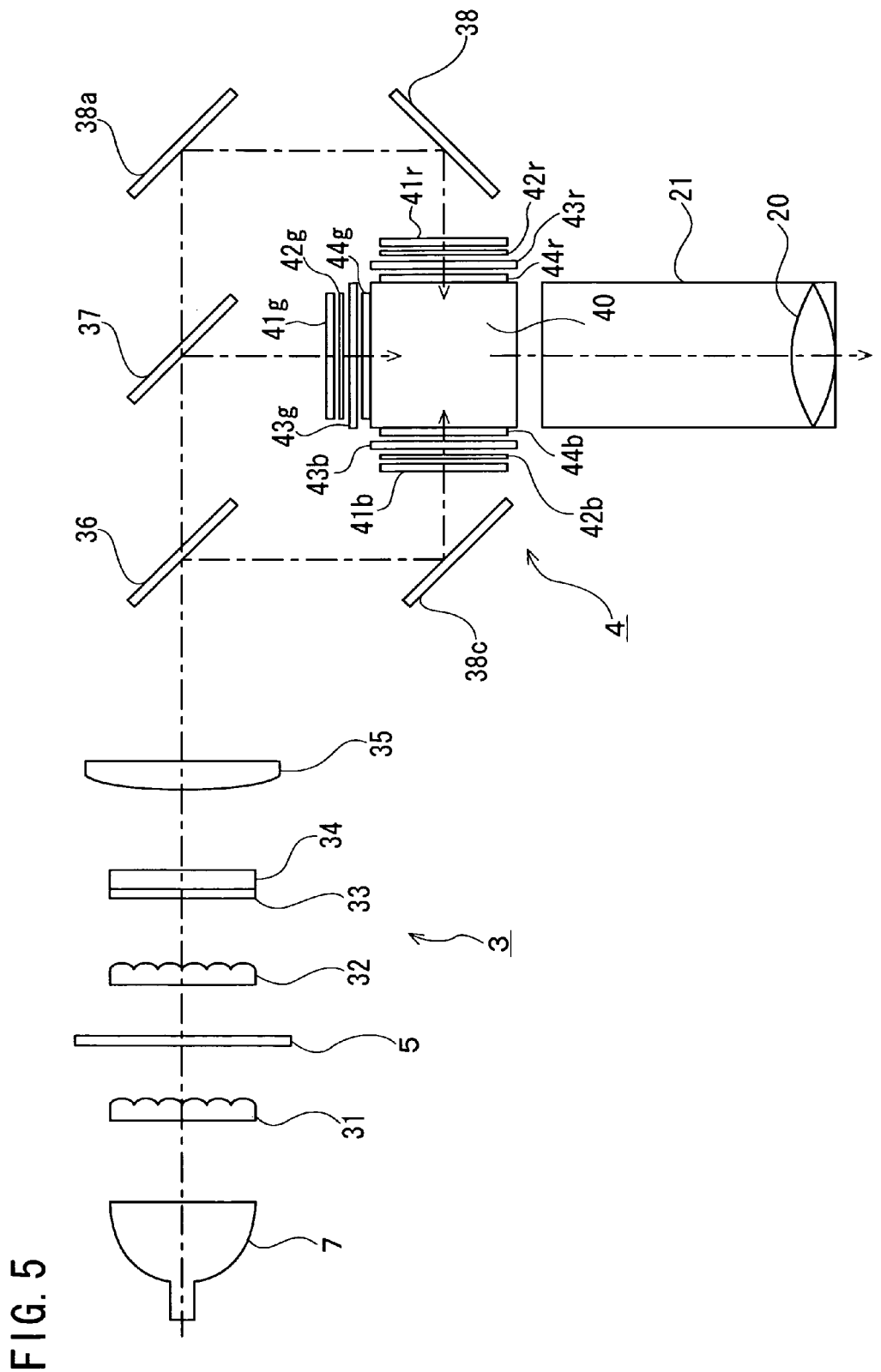
FIG. 5 illustrates an optical system and an image synthesizer.

As shown in FIG. 5, the white light from the lamp unit 7 is guided through a first integrator lens 31, the diaphragm mechanism 5, a second integrator lens 32, a slit plate 33, a polarization beam splitter 34 and a field lens 35 to a first dichroic mirror 36.

Figure 9:
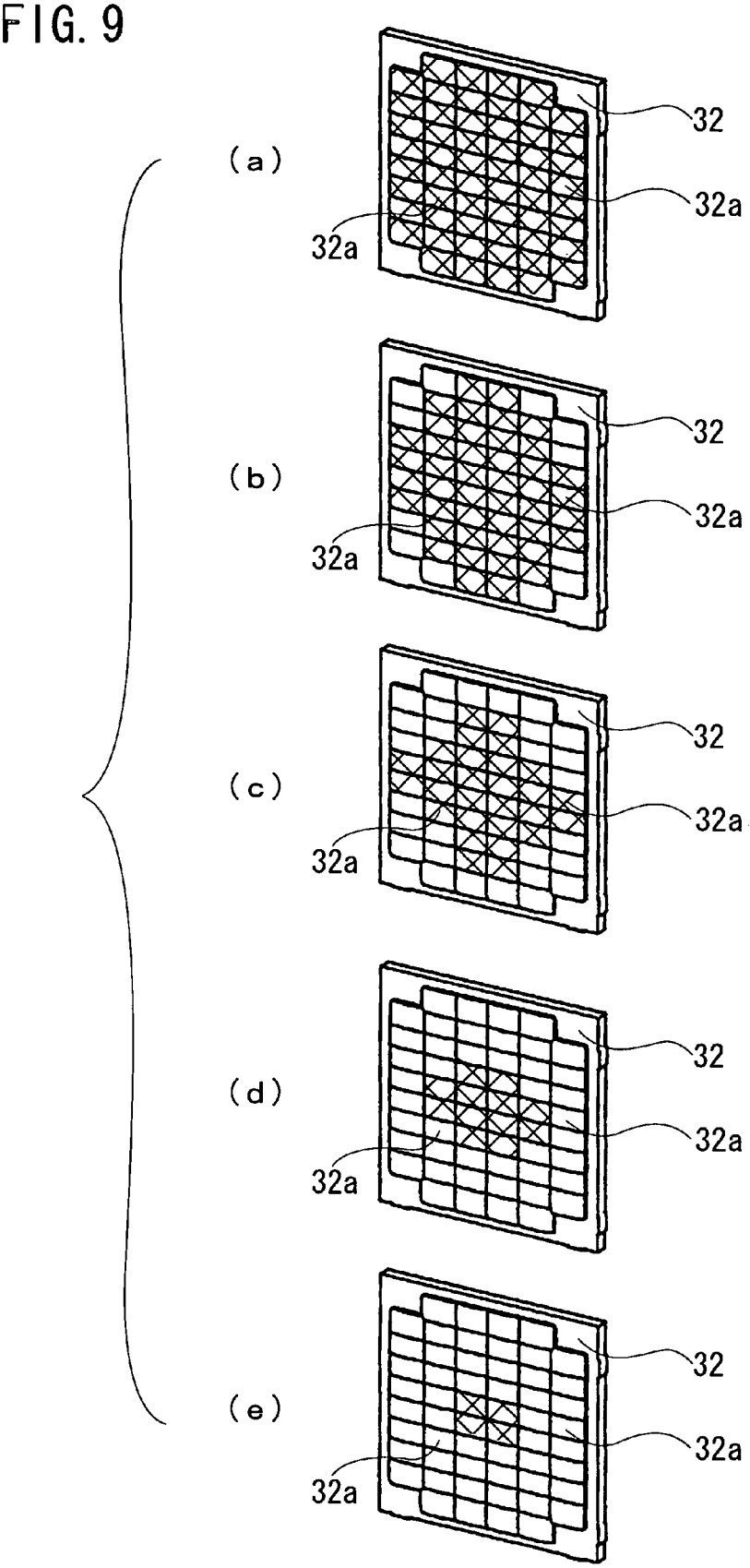
FIG. 9 illustrates areas of light irradiated on a second integrator lens when the diaphragm mechanism is set in respective states shown in FIG. 8.

The first integrator lens 31 and second integrator lens 32 are made of a heat-resistant glass fly-eye lens as shown in FIG. 9, and have a function of uniformizing illuminance distribution of the white light emitted from the lamp unit 7. The slit plate 33 is made of an aluminum thin plate, and has a function of blocking unwanted incident light toward the polarization beam splitter 34. The polarization beam splitter 34 has a function of extracting only one component wave out of P- and S-waves of light.

The light having passed through the polarization beam splitter 34 shown in FIG. 5 reaches through the field lens 35 to the first dichroic mirror 36. The first dichroic mirror 36 has a function of reflecting only a blue component of light and passing red and green components therethrough. A second dichroic mirror 37 has a function of reflecting the green component of light and passing the red component therethrough, and a field mirror 38a has a function of reflecting the red component. Thus, the white light emitted from the lamp unit 7 is separated by the first and second dichroic mirrors 36, 37 into blue light, green light and red light, and guided to the image synthesizer 4.

Image Synthesizer 4

As shown in FIG. 5, the image synthesizer 4 includes the cube-like color synthesis prism 40 having the liquid crystal panel for blue 43b, liquid crystal panel for green 43g and liquid crystal panel for red 43r attached to the three respective side surfaces thereof.

As shown in FIG. 3, the optical compensation sheet holders 6b, 6g, 6r are attached to the light incidence sides of the three liquid crystal panels 43b, 43g, 43r, respectively. The optical compensation sheet holders 6b, 6g, 6r hold the three optical compensation sheets 42b, 42g, 42r for blocking incidence of unwanted component waves of light on the respective liquid crystal panels 43b, 43g, 43r.

The blue light reflected by the first dichroic mirror 36 and a field mirror 38c shown in FIG. 5 is guided by an incidence polarizing plate for blue 41b through the incidence polarizing plate for blue 41b, the optical compensation sheet for blue 42b, the liquid crystal panel for blue 43b and an emergence polarizing plate for blue 44b to the color synthesis prism 40.

The green light reflected by the second dichroic mirror 37 is guided by an incidence polarizing plate for green 41g through the incidence polarizing plate for green 41g, the optical compensation sheet for green 42g, the liquid crystal panel for green 43g and an emergence polarizing plate for green 44g to the color synthesis prism 40.

Similarly, the red light transmitted by the first dichroic mirror 36 and second dichroic mirror 37 and reflected by two field mirrors 38a, 38b is guided by an incidence polarizing plate for red 41r of the image synthesizer 4 through the incidence polarizing plate for red 41r, the optical compensation sheet for red 42r, the liquid crystal panel for red 43r and an emergence polarizing plate for red 44r to the color synthesis prism 40.

The image light of the three colors guided to the color synthesis prism 40 is synthesized by the color synthesis prism 40, and the resulting color image light is to be magnifyingly projected through the projection lens 20 on a forward screen.

Diaphragm Mechanism 5

As shown in FIG. 5, the diaphragm mechanism 5 is arranged between the first integrator lens 31 and second integrator lens 32 constituting the optical system 3. As shown in FIG. 3, the diaphragm mechanism 5 is attached to the optical system holding case 30, while inserted in the slit opening 320 provided at the left end of the optical system holding case 30.

The diaphragm system 5 is for regulating the amount of light to be incident on the liquid crystal panels for the respective colors 43b, 43g, 43r depending on input data for an image to be projected to thereby improve a contrast of the projection image. For example, when input data for an image to be projected concentrates in a low brightness region, that is, when the image to be projected is a generally dark image, the diaphragm mechanism 5 partly blocks the light emitted from the lamp unit 7 to set a smaller than usually amount of light to be incident on the liquid crystal panels for the respective colors 43b, 43g, 43r, while a correction is made to the input data to expand a dynamic range. This can improve a contrast of the projection image.

Of the light having passed through the second integrator lens 32 to reach the liquid crystal panels for the respective colors 43b, 43g, 43r, light having peripherally passed through the second integrator lens 32 often causes light leak because it would be incident slantingly relative to a surface of each of the liquid crystal panels 43b, 43g, 43r compared with light having centrally passed through the second integrator lens 32. Accordingly, the diaphragm mechanism 5 blocks light to be peripherally incident on the second integrator lens 32 to thereby prevent light leak from occurring in the liquid crystal panels for the respective colors 43b, 43g, 43r, which improves a contrast of the projection image.

Figure 6:
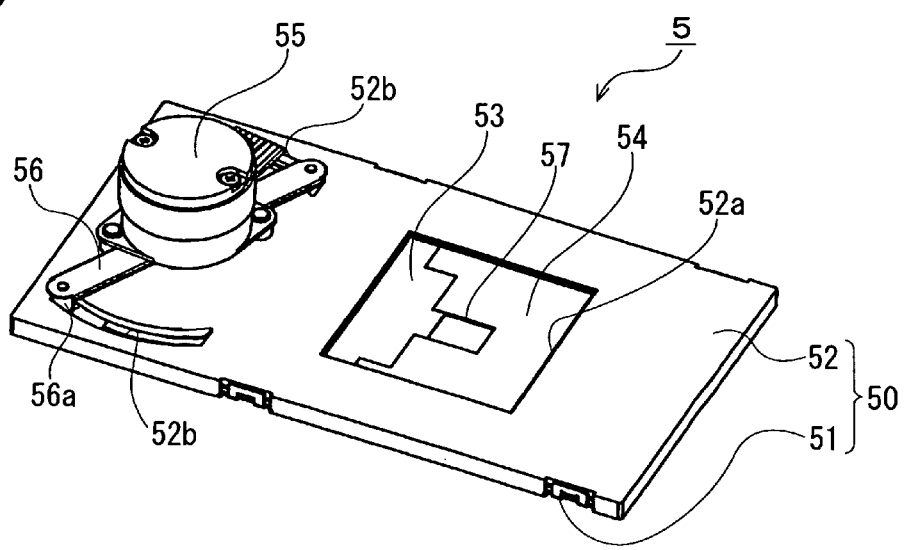
FIG. 6 is a perspective view of a diaphragm mechanism.
Figure 7:
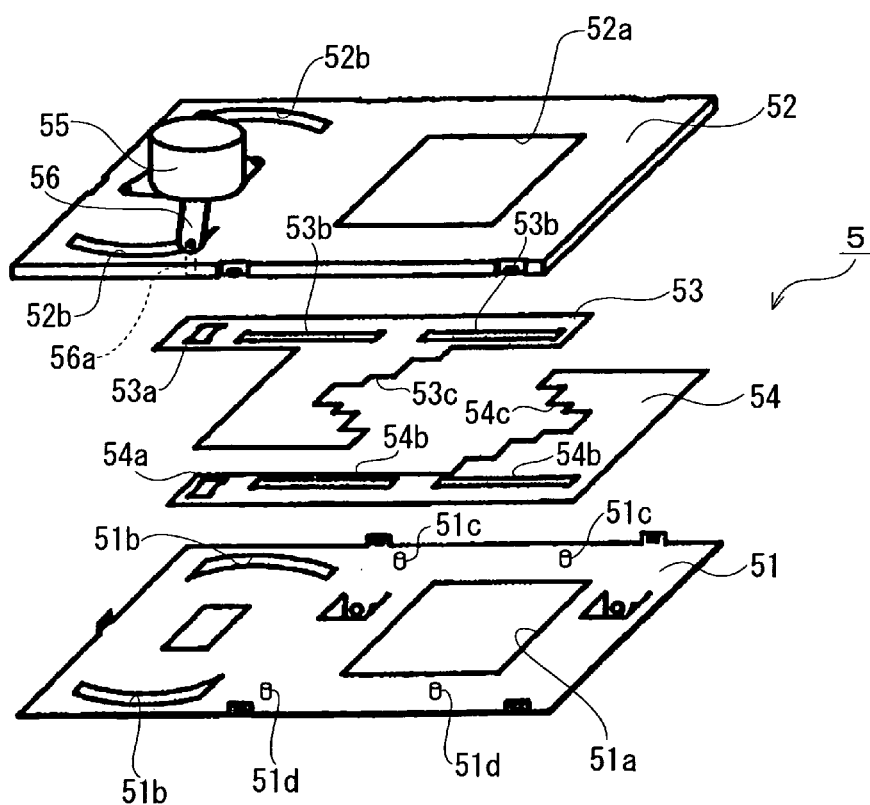
FIG. 7 is an exploded perspective view of the diaphragm mechanism.

As shown in FIG. 6 and FIG. 7, the diaphragm mechanism 5 includes a T-shaped first diaphragm plate 53 and an L-shaped second diaphragm plate 54 superposed on each other on a plane perpendicular to the optical axis of light passing through the diaphragm mechanism 5, which are disposed inside a flat casing 50 formed by joining a rectangular base plate 51 and a cover plate 52 to each other. Attached to the cover plate 52 is a motor 55 for driving the first diaphragm plate 53 and second diaphragm plate 54 toward or away from each other along the plane.

The base plate 51 and cover plate 52 have rectangular openings 51a, 52a, respectively, formed therein. The light having passed through the first integrator lens 31 shown in FIG. 5 irradiates the second integrator lens 32 through the both openings 51a, 52a.

As shown in FIG. 6, the motor 55 has a turning member 56 attached to an output shaft thereof, which rotates together with the output shaft. The turning member 56 has opposite ends thereof formed with projections 56a, 56a toward the cover plate 52. The projections 56a, 56a are engaged with a pair of circular arc grooves 51b, 51b, 52b, 52b provided in the base plate 51 and cover plate 52, respectively, shown in FIG. 7. As shown in FIG. 7, the first diaphragm plate 53 and second diaphragm plate 54 have left ends thereof provided with rectangular through holes 53a, 54a. The projections 56a, 56a of the turning member 56 are through both through holes 53a, 54a, respectively.

The first diaphragm plate 53 and second diaphragm plate 54 have an upper end thereof and a lower end thereof provided with two guide holes 53b, 53b, 54b, 54b, respectively, along a pair of long sides constituting a rectangular contour of the diaphragm mechanism 5 shown in FIG. 6, while the base plate 51 has, along each of the pair of long sides, two guide pins 51c, 51c, 51d, 51d, four in total, protruded from an inner surface thereof toward the cover plate 52. The two upper guide pins 51c, 51c are engaged with the two guide holes 53b, 53b of the first diaphragm plate 53, respectively. The two lower guide pins 51d, 51d are engaged with the two guide holes 54b, 54b of the second diaphragm plate 54, respectively.

Figure 10:
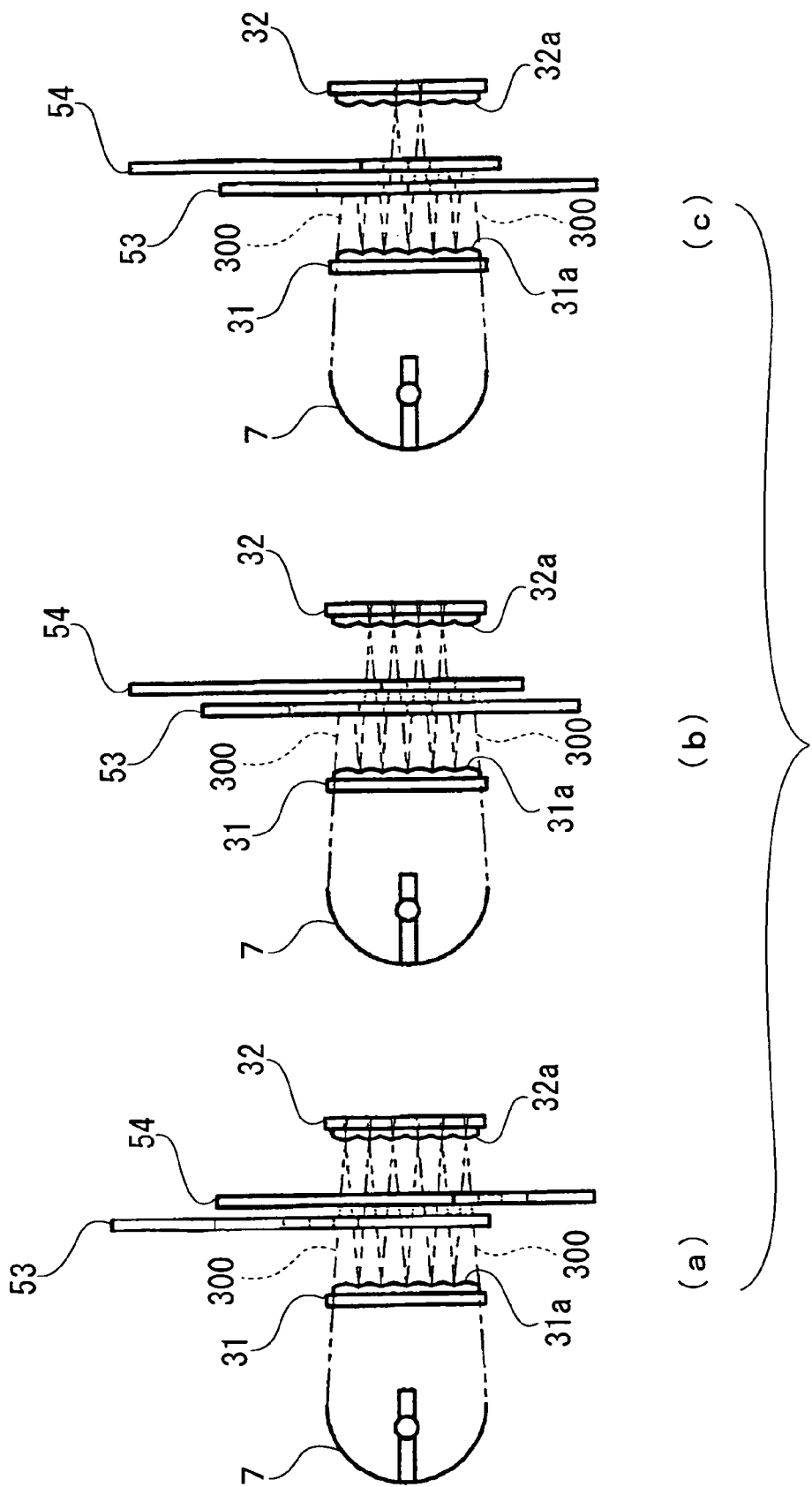
FIG. 10 illustrates luminous flux blocking states of the diaphragm mechanism.

As shown in FIG. 9, the second integrator lens 32 includes 56 rectangular cells 32a arranged in the form of a matrix. The first integrator lens 31 also has the same arrangement as of the second integrator lens 32. As shown in FIGS. 10(a)-(c), the second integrator lens 32 is arranged such that optical centers of the cells 32a constituting the second integrator lens 32 correspond to focuses of respective cells 31a constituting the first integrator lens 31.

Therefore, as shown in FIGS. 10(a)-(c), the cells 31a of the first integrator lens 31 emit quadrangular-pyramid-shaped luminous fluxes 300 toward the optical centers of the corresponding cells 32a of the second integrator lens 32. Each of the luminous fluxes 300 has a rectangular cross-sectional shape at the set position of the first diaphragm mechanism 5.

As shown in FIG. 7, the first diaphragm plate 53 and second diaphragm plate 54 have recesses 53c, 54c, respectively, formed on opposed end faces thereof. Both recesses 53c, 54c are each formed in the shape of stairs along latticed border lines between a plurality of luminous fluxes 300 from respective cells 31a of the first integrator lens 31 to respective cells 32a of the second integrator lens 32.

As shown in FIGS. 8(a)-(e), the recesses 53c, 54c of both diaphragm plates 53, 54 are exposed from the openings 51a, 52a in accordance with slide operation of both diaphragm plates 53, 54. The light having passed through the first integrator lens 31 reaches the second integrator lens 32 through a light passage window 57 surrounded by both recesses 53c, 54c.

FIGS. 8(a)-(e) show states where the recesses 53c, 54c of both diaphragm plates 53, 54 have end faces thereof positioned on latticed border lines between a plurality of luminous fluxes 300 from respective cells 31a of the first integrator lens 31 to respective cells 32a of the second integrator lens 32 (hereafter referred to as ideal light blocking states).

Figure 8:
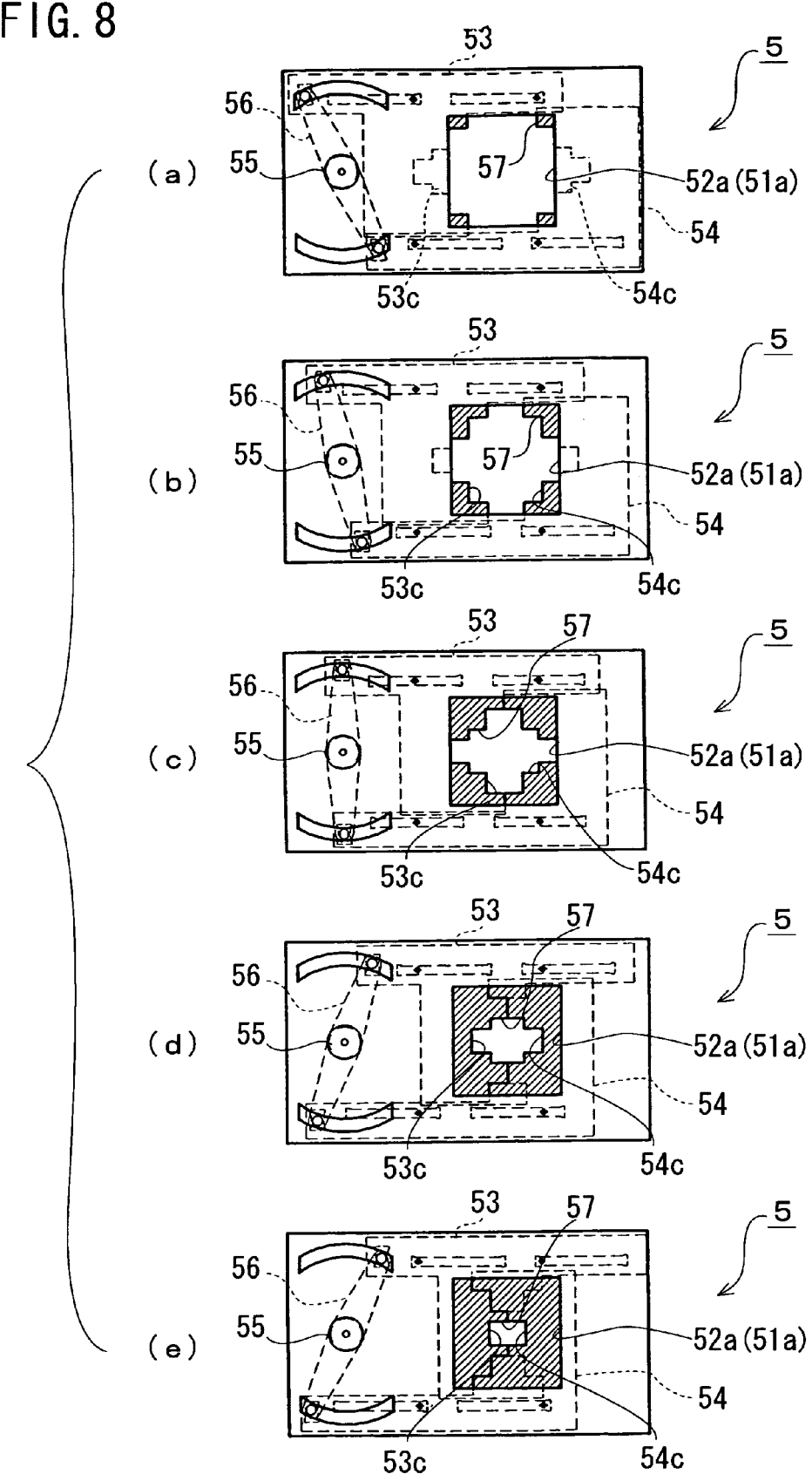
FIG. 8 includes state transition diagrams of the diaphragm mechanism.

FIGS. 9(a)-(e) show areas of light irradiated on the second integrator lens 32 with hatching when the diaphragm mechanism 5 is set in the ideal light blocking states shown in FIGS. 8(a)-(e). FIGS. 10(a)-(c) show that when the diaphragm mechanism 5 is set as shown in FIG. 8(a), FIG. 8(c) and FIG. 8(e), respectively, the diaphragm mechanism 5 blocks a plurality of luminous fluxes 300 of all the luminous fluxes 300 from the respective cells 31a of the first integrator lens 31 to the respective cells 32a of the second integrator lens 32.

As shown in FIGS. 8(a)-(e), when the motor 55 rotates clockwise, the first diaphragm plate 53 slides rightward, while the second diaphragm plate 54 slides leftward. Consequently, the first diaphragm plate 53 and second diaphragm plate 54 are moved toward each other. This makes larger the area of the first diaphragm plate 53 and second diaphragm plate 54 exposed from the openings 51a, 52a.

On the other hand, when the motor 55 rotates counterclockwise, the first diaphragm plate 53 slides leftward, while the second diaphragm plate 54 slides rightward. Consequently, the first diaphragm plate 53 and second diaphragm plate 54 are moved away from each other. This makes smaller the area of the first diaphragm plate 53 and second diaphragm plate 54 exposed from the openings 51a, 52a.

As described above, because the area of the first diaphragm plate 53 and the second diaphragm plate 54 exposed from the openings 51a, 52a varies depending on the rotation angle of the motor 55, the light irradiation region on the second integrator lens 32 can be varied by controlling the rotation angle of the motor 55 between the first ideal light blocking state shown in FIG. 8(a) and the fifth ideal light blocking state shown in FIG. 8(e).

Figure 44:
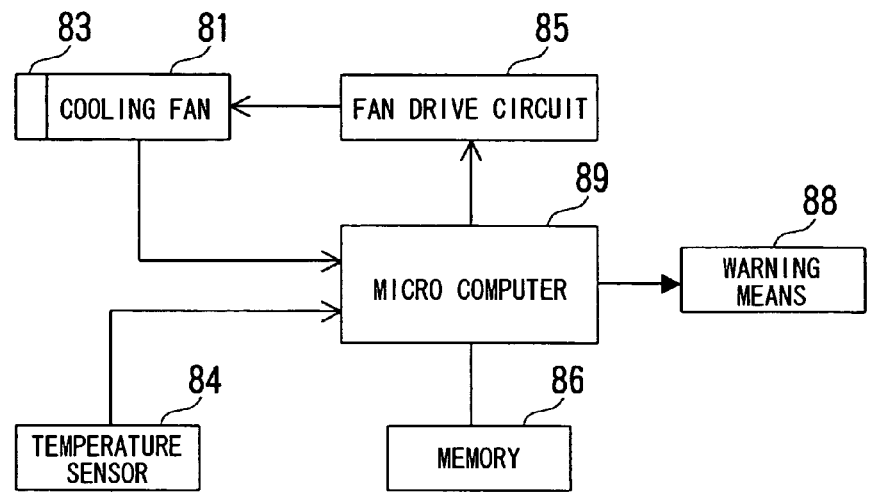
FIG. 44 is a control block diagram showing a configuration for detecting clogging of an air filter.

In the first ideal light blocking state shown in FIG. 8(a), the turning member 56 is turned counterclockwise by the motor 55 to the limit position. In this state, as shown in FIG. 9(a) and FIG. 10(a), all the 56 cells 32a constituting the second integrator lens 32 are irradiated with light. On the other hand, in the fifth ideal light blocking state shown in FIG. 8(e), the turning member 56 is turned clockwise by the motor 55 to the limit position. In this state, as shown in FIG. 9(e) and FIG. 10(c), only four central constituent cells 32a of the second integrator lens 32 are irradiated with light. In the second ideal light blocking state shown in FIG. 8(b), as shown in FIG. 9(b), 44 cells 32a except 12 cells 32a arranged peripherally in the second integrator lens 32 are irradiated with light.

Similarly, in the third ideal light blocking state shown in FIG. 8(c), as shown in FIG. 9(c) and FIG. 10(b), only 28 cells 32a generally in the form of a cross arranged centrally of the second integrator lens 32 are irradiated with light. In the fourth ideal light blocking state shown in FIG. 8(d), as shown in FIG. 9(d), only 12 cells 32a generally in the form of a cross arranged centrally of the second integrator lens 32 are irradiated with light.

If the diaphragm mechanism 5 is set in an intermediate state between the first to fifth ideal light blocking states shown in FIGS. 8(a)-(e), that is, if the first diaphragm plate 53 and second diaphragm plate 54 move so as to partly block passage of at least one luminous flux 300 of all the luminous fluxes 300 from the respective cells 31a of the first integrator lens 31 to the respective cells 32a of the second integrator lens 32, and to allow passage thereof in the other part, then uneven coloring can occur in the projection image.

Because the opposed recesses 53c, 54c of both diaphragm plates 53, 54 defining the light passage window 57 that allows passage of light are formed in the shape of stairs along latticed border lines between a plurality of luminous fluxes 300 from respective cells 31a of the first integrator lens 31 toward respective cells 32a of the second integrator lens 32, the diaphragm mechanism 5 of the present invention changes from the intermediate state to any one of the first to fifth ideal light blocking states whenever the end faces of the recesses 53c, 54c of both diaphragm plates 53, 54 reach the latticed border lines during reciprocation of both diaphragm plates 53, 54. Therefore, both diaphragm plates 53, 54 are set in the ideal light blocking state more frequently than conventionally during reciprocation of both diaphragm plates 53, 54. Consequently, occurrence of uneven coloring is suppressed more than conventionally.

In addition, because the recesses 53c, 54c of both diaphragm plates 53, 54 are formed in the shape of stairs along latticed border lines between a plurality of luminous fluxes 300 from respective cells 31a of the first integrator lens 31 to respective cells 32a of the second integrator lens 32, the diaphragm mechanism 5 can be constituted of a one-directional slide mechanism for horizontally moving both diaphragm plates 53, 54 close or away. This allows the more simplified diaphragm mechanism 5 than a conventional one that needs a two-directional slide mechanism.

Optical Compensation Sheet Holders 6b, 6g, 6r

As shown in FIG. 3, the optical compensation sheet holders 6b, 6g, 6r are attached to the optical system holding case 30 at three end edges thereof opposed to three side surfaces of the color synthesis prism 40 of the image synthesizer 4. The optical compensation sheet holders 6b, 6g, 6r hold the optical compensation sheets 42b, 42g, 42r, respectively, shown in FIG. 5. As shown in FIG. 5, the optical compensation sheets 42b, 42g, 42r are arranged between the incidence polarizing plates for the respective colors 41b, 41g, 41r and the liquid crystal panels for the respective colors 43b, 43g, 43r, respectively.

The optical compensation sheets 42b, 42g, 42r have liquid crystal molecules therein. The optical compensation sheets 42b, 42g, 42r are attached such that the liquid crystal molecules have a slow axis in a direction parallel to an alignment direction of liquid crystal molecules constituting the respective liquid crystal panels 43b, 43g, 43r to thereby perform a function of blocking incidence of unwanted component waves of light on the respective liquid crystal panels 43b, 43g, 43r. This can prevent light leak and uneven coloring from occurring in the liquid crystal panels 43b, 43g, 43r.

Figure 11:
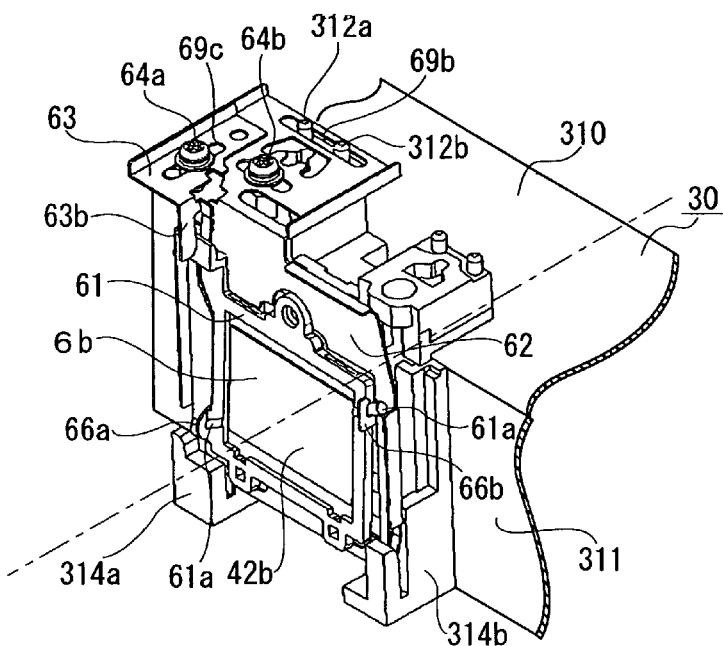
FIG. 11 is a perspective view of an optical compensation sheet holder.

Because the three optical compensation sheet holders 6b, 6g, 6r have the same configuration, only the optical compensation sheet holder for blue 6b will be described below, and the optical compensation sheet holders for green and red 6g, 6r will not be described. As shown in FIG. 11, the optical compensation sheet 42b is held by the optical compensation sheet holder 6b turnably within a plane perpendicular to an optical axis of light (indicated by the dashed line in the drawing) passing through the optical compensation sheet 42b, and turnably on a rotation axis parallel to a plane perpendicular to the optical axis. The attachment posture of the optical compensation sheet 42b can be adjusted by adjusting fastening positions of two screws 64a, 64b, as descried later. The attachment posture of each of the optical compensation sheets 42b, 42g, 42r is adjusted in an adjustment process before shipment of the liquid crystal projector device.

Figure 12:
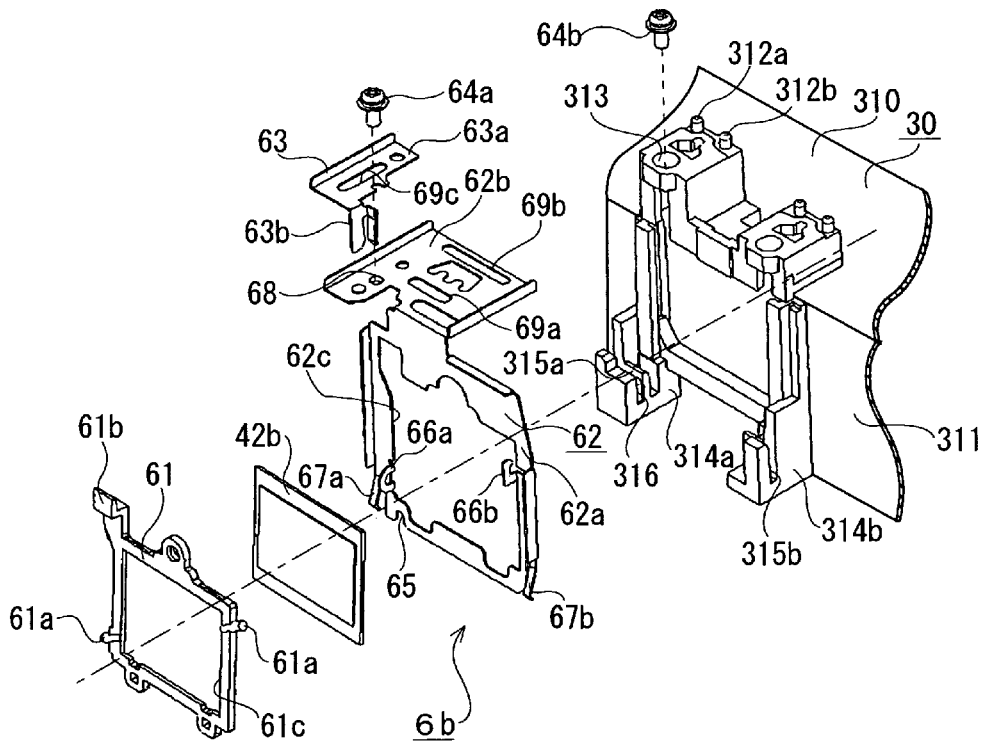
FIG. 12 is an exploded perspective view of the optical compensation sheet holder.

As shown in FIG. 11 and FIG. 12, the optical compensation sheet holder 6b includes a rectangular frame 61 for holding the optical compensation sheet 42b, a turning member 62 for turnably holding the frame 61 and to be attached to the optical system holding case 30, and a slide member 63 to engage with the frame 61.

As shown in FIG. 12, the frame 61 has a pair of columnar shanks 61a, 61a protruded therefrom so as to be approximately parallel to one of two diagonals of the liquid crystal panel for blue 43b, and a stepped projection 61b protruded upward from the upper left corner of the frame 61. The optical compensation sheet 42b is fitted in an opening 61c provided centrally of the frame 61.

The turning member 62 has a rectangular holding part 62a for holding the frame 61, and an attachment part 62b along an upper wall 310 of the optical system holding case 30. The holding part 62a has a rectangular opening 62c provided centrally therein, and a pair of supports 66a, 66b for supporting the shanks 61a, 61a of the frame 61, protruded around the opening 62c, on a line approximately parallel to one of two diagonals of the liquid crystal panel for blue 43b, and in the traveling direction of light passing through the optical compensation sheet 42b. Of the pair of supports 66a, 66b, one support 66a is formed with a through hole through which the shank 61a of the frame 61 penetrates, while the other support 66b is L-shaped. The holding part 62a has a pair of flat springs 67a, 67b formed downward from lower opposite ends thereof, while the holding part 62a has a semicircular recess 65 formed at the lower left end thereof.

The optical system holding case 30 has a side wall 311 having a pair of foot parts 314a, 314b protruded therefrom in the optical axis direction of light to pass through the optical compensation sheet 42b. Both foot parts 314a, 314b are formed with grooves 315a, 315b into which both flat springs 67a, 67b of the holding part 62a are to be inserted. The flat springs 67a, 67b are to be held between opposed surfaces of the grooves 315a, 315b, respectively, with the optical compensation sheet holder 6b attached to the optical system holding case 30. Further, the left groove 315a has a columnar shank 316 formed therein parallel to the optical axis. The recess 65 of the holding part 62a is to be fitted with the shank 316.

The attachment part 62b of the turning member 62 is provided with a screw hole 68 through which a screw 64a for fixing the slide member 63 penetrates, a first long hole 69a through which a screw 64b to be screwed into a screw hole 313 for fixing the turning member 62 to the upper wall 310 of the optical system holding case 30 penetrates, and a third long hole 69b through which a pair of pins 312a, 312b protruded from the upper wall 310 of the optical system holding case 30 penetrate. The pair of pins 312a, 312b are provided away from each other in the right-and-left direction perpendicular to the optical axis of light to pass through the optical compensation sheet 42b. The first long hole 69a and third long hole 69b are shaped to be long in the left-and-right direction.

The slide member 63 has a flat plate part 63a along the attachment part 62b of the turning member 62, and a U-shaped pinching part 63b protruded downward from one corner of the flat plate part 63a. The flat plate part 63a is provided with a second long hole 69c longer in the optical axis direction of light to pass through the optical compensation sheet 42b. The screw 64a for fixing the slide member 63 to the attachment part 62b of the turning member 62 is to penetrate through the second long hole 69c. The pinching part 63b is to pinch the projection 61b of the frame 61.

The optical compensation sheet holder 6b is adjusted in place using a first adjustment operation of turning the optical compensation sheet holder 6b, with the screw 64b loosened, on the shank 316 provided on the left foot part 314a of the optical system holding case 30 within a plane perpendicular to the optical axis of light to pass through the optical compensation sheet 42b, and a second adjustment operation of sliding the slide member 63 of the optical compensation sheet holder 6b, with the screw 64a loosened, along the optical axis direction to thereby turn the frame 61 on the pair of shanks

61$a$, 61$a$, so that a surface of the optical compensation sheet 42$b$ is inclined relative to a plane perpendicular to the optical axis.

Figure 13:
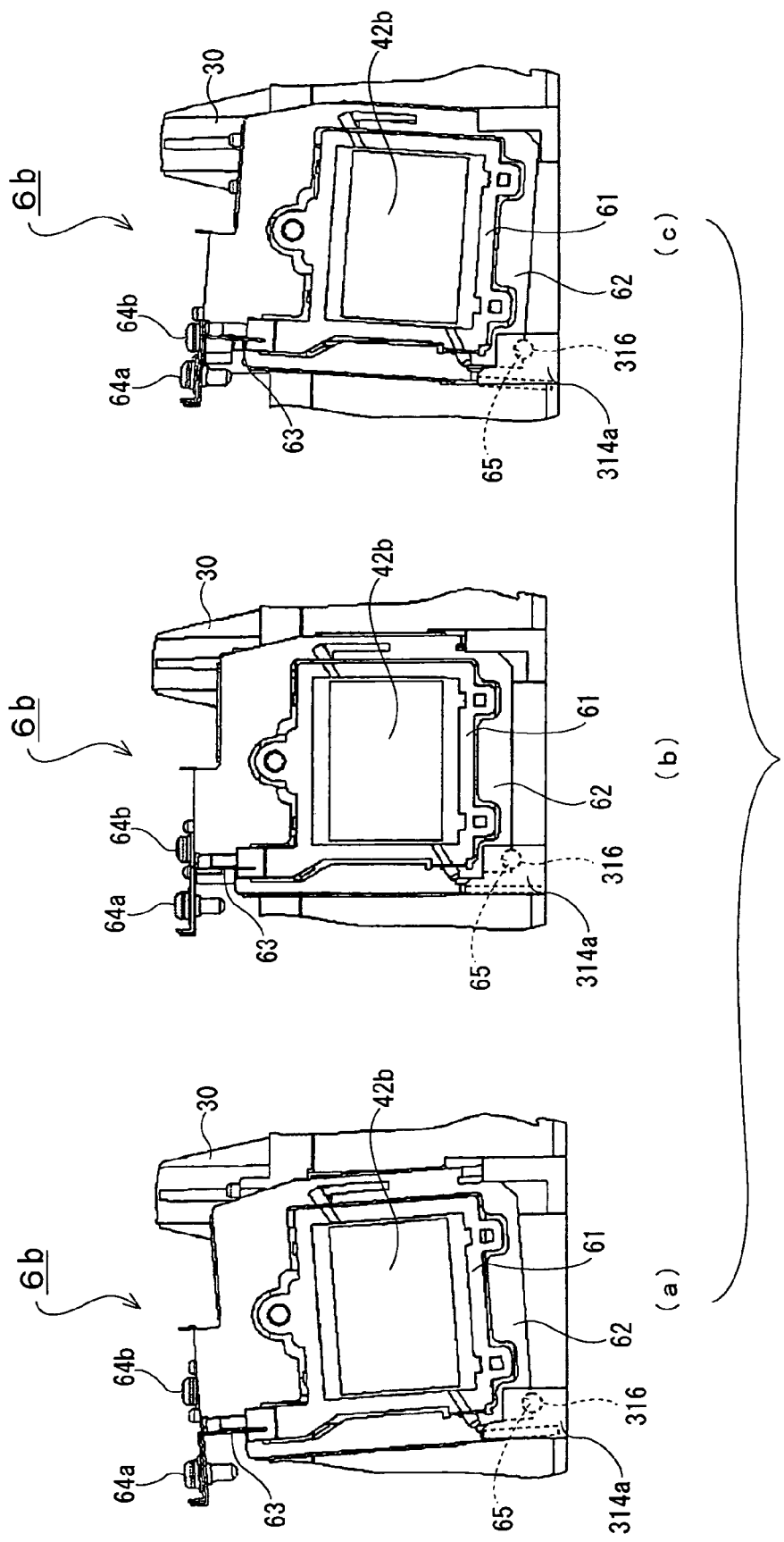
FIG. 13 illustrates changes in an attachment posture of the optical compensation sheet holder in the case of adjusting the attachment posture of the optical compensation sheet holder with a first adjustment operation.

FIGS. 13($a$)-($c$) show the optical compensation sheet holder 6$b$, the attachment posture of which is adjusted by the first adjustment operation.

As shown in FIG. 11, the pair of pins 312$a$, 312$b$ of the optical system holding case 30 are through the third long hole 69$b$ of the turning member 62 of the optical compensation sheet holder 6$b$. Therefore, loosening the screw 64$b$ allows slide operation of the optical compensation sheet holder 6$b$ within the first long hole 69$a$ in the left-and-right direction perpendicular to the optical axis of light to pass through the optical compensation sheet 42$b$.

The recess 65 of the turning member 62 of the optical compensation sheet holder 6$b$ is engaged with the shank 316 provided on the left foot part 314$a$ of the optical system holding case 30. Therefore, as shown in FIGS. 13($a$)-($c$), the slide operation of the optical compensation sheet holder 6$b$ in the left-and-right direction causes the optical compensation sheet holder 6$b$ to turn about the shank 316 within a plane perpendicular to the optical axis.

FIG. 13($a$) shows a state where the screw 64$b$ is fastened at the right end of the first long hole 69$a$ of the optical compensation sheet holder 6$b$ (hereafter referred to as the first fastened state). FIG. 13($c$) shows a state where the screw 64$b$ is fastened at the left end of the first long hole 69$a$ of the optical compensation sheet holder 6$b$ (hereafter referred to as the second fastened state). FIG. 13($b$) shows a state where the screw 64$b$ is fastened at the center of the first long hole 69$a$ of the optical compensation sheet holder 6$b$ (hereafter referred to as the third fastened state).

According to the first adjustment operation, as shown in FIGS. 13($a$)-($c$), the attachment posture of the optical compensation sheet holder 6$b$ can be adjusted between the first fastened state and second fastened state.

Figure 14:
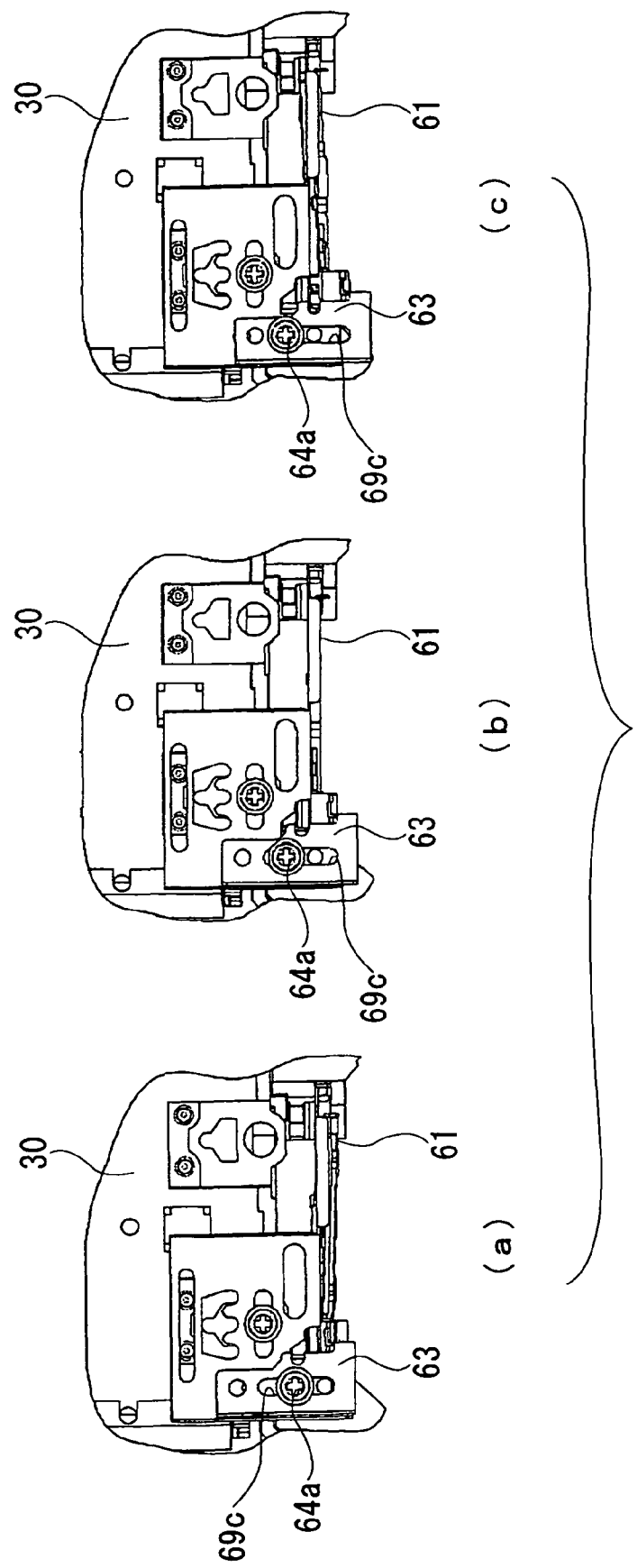
FIG. 14 illustrates changes in an attachment posture of the optical compensation sheet holder in the case of adjusting the attachment posture of the optical compensation sheet holder with a second adjustment operation.

FIGS. 14($a$)-($c$) show the optical compensation sheet holder 6$b$, the attachment posture of which is adjusted by the second adjustment operation.

As shown in FIG. 11, the slide member 63 of the optical compensation sheet holder 6$b$ is fastened to the turning member 62 by the screw 64$a$ through the second long hole 69$c$ of the slide member 63. Loosening the screw 64$a$ allows slide operation of the slide member 63 along the optical axis within the second long hole 69$c$.

Because the projection 61$b$ of the frame 61 is pinched by the pinching part 63$b$ of the slide member 63, the projection 61$b$ of the frame 61 moves along the optical axis together with the slide member 63. This causes the frame 61 to turn on the pair of shanks 61$a$, 61$a$ formed along one diagonal of the optical compensation sheet 42$b$, so that a surface of the optical compensation sheet 42$b$ fixed to the frame 61 is inclined relative to a plane perpendicular to the optical axis.

FIG. 14($a$) shows a state where the screw 64$a$ is fastened at the front end of the second long hole 69$c$ of the slide member 63 (hereafter referred to as the fourth fastened state). In the fourth fastened state, the upper left end of the frame 61 having the projection 61$b$ protruded therefrom projects forward along the optical axis more than the lower right end of the frame 61.

On the other hand, FIG. 14($c$) shows a state where the screw 64$a$ is fastened at the rear end of the second long hole 69$c$ (hereafter referred to as the fifth fastened state). In the fifth fastened state, the upper left end of the frame 61 retreats along the optical axis backward more than the lower right end of the frame 61.

FIG. 14($b$) shows a state where the screw 64$a$ is fastened at the center of the second long hole 69$c$ (hereafter referred to as the sixth fastened state). In the sixth fastened state, the optical compensation sheet 42$b$ fixed to the frame 61 has a surface approximately perpendicular to the optical axis.

According to the second adjustment operation, as shown in FIGS. 14($a$)-($c$), the attachment posture of the optical compensation sheet holder 6$b$ can be adjusted between the fourth fastened state and fifth fastened state.

The attachment posture of the optical compensation sheet holder 6$b$ is adjusted before shipment of the liquid crystal projector device. Specifically, the attachment posture of the optical compensation sheet holder 6$b$ is adjusted by projecting an adjustment image using the liquid crystal projector device and using the first and second adjustment operations to ensure that the adjustment image has a clear black-and-white contrast.

According to the first adjustment operation, the optical compensation sheet 42$b$ can be adjusted in its attachment posture turnably within a plane perpendicular to the optical axis. Therefore, the slow axis of the liquid crystal molecules in the optical compensation sheet 42$b$ viewed from the optical axis direction can be set approximately parallel to an alignment direction of liquid crystal molecules of the liquid crystal panel 43$b$ shown in FIG. 5.

According to the second adjustment operation, the inclination angle of the surface of the optical compensation sheet 42$b$ relative to a plane perpendicular to the optical axis is adjustable. Therefore, the apparent slow axis of the optical compensation sheet 42$b$ can correspond to the slow axis in the optical axis direction of the liquid crystal molecules in the liquid crystal panel 43$b$ shown in FIG. 5.

Further, the above second adjustment operation can incline the surface of the optical compensation sheet 42$b$ relative to the optical axis on the rotation axis approximately parallel to one diagonal of the liquid crystal panel 43$b$. That is, because the surface of the optical compensation sheet 42$b$ can be inclined relative to one diagonal of the liquid crystal panel 43$b$, the attachment posture of the optical compensation sheet holder 6$b$ is adjusted more easily than conventionally.

Furthermore, as shown in FIG. 11, the optical compensation sheet 42$b$ is fixed to the frame 61, and the frame 61 is supported by the turning member 62 turnably on the rotation axis. Therefore, the frame 61 and optical compensation sheet 42$b$ will not experience any unnatural force in adjustment with the second adjustment operation. This can prevent warpages and flexures from occurring in the frame 61 and optical compensation sheet 42$b$, and, as a result, provide a uniform projection image with a clearer contrast than a conventional one, and without uneven coloring or the like.

Lens Shift Mechanism 2

As shown in FIG. 2, the projection lens system includes the projection lens 20 and cylinder 21 for holding the projection lens. The projection lens system is held by the lens shift mechanism 2, and attached to the forward end of the optical system holding case 30. The lens shift mechanism 2 is for horizontally and vertically reciprocatingly moving the projection lens system within a certain range where the brightness of color image light will not be significantly reduced.

The projector device with the lens shift mechanism 2 makes it easier than ever to adjust an image display position relative to a screen because the lens shift mechanism 2 makes it possible to adjust the image display position relative to the screen after appropriately positioning the projector device relative to the screen.

Figure 15:
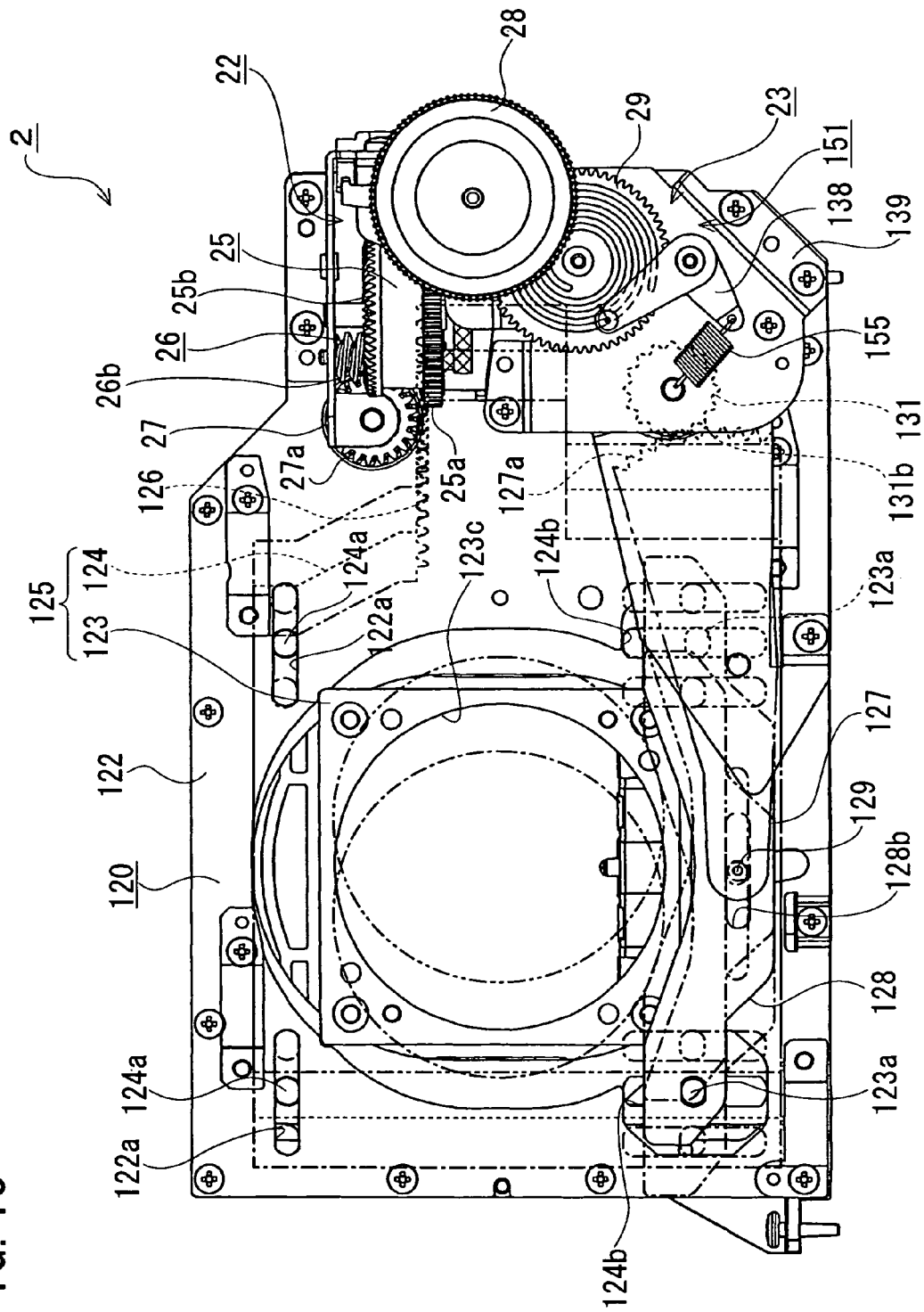
FIG. 15 is a front view showing a horizontal moving range of a lens shift mechanism.
Figure 16:
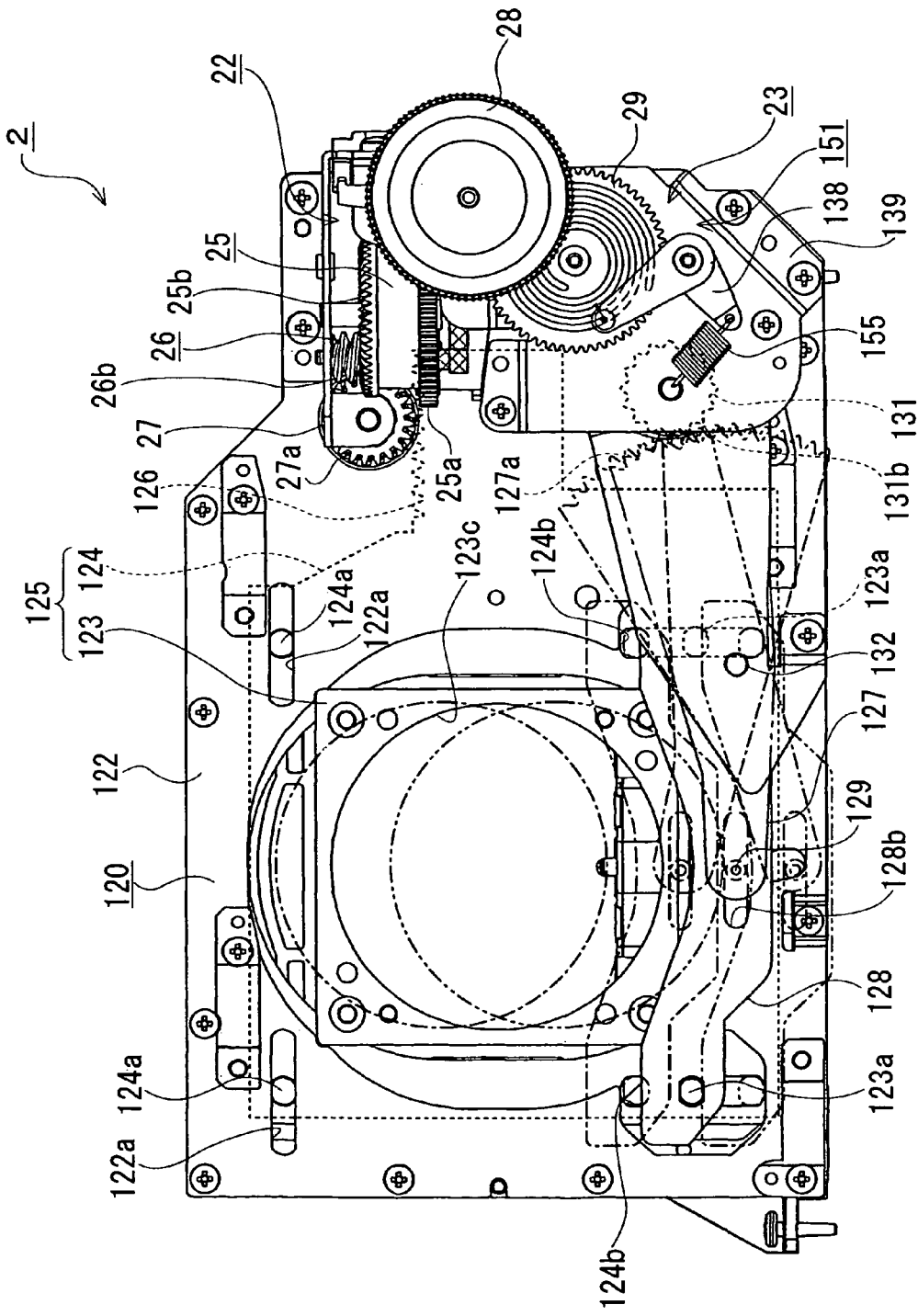
FIG. 16 is a front view showing a vertical moving range of the lens shift mechanism.

As shown in FIG. 15 and FIG. 16, the lens shift mechanism 2 includes a stationary base 120, a movable member 125 to which the projection lens system is attached, a vertical drive mechanism 23 for vertically driving the movable member 125, and a horizontal drive mechanism 22 for horizontally driving the movable member 125.

Figure 17:
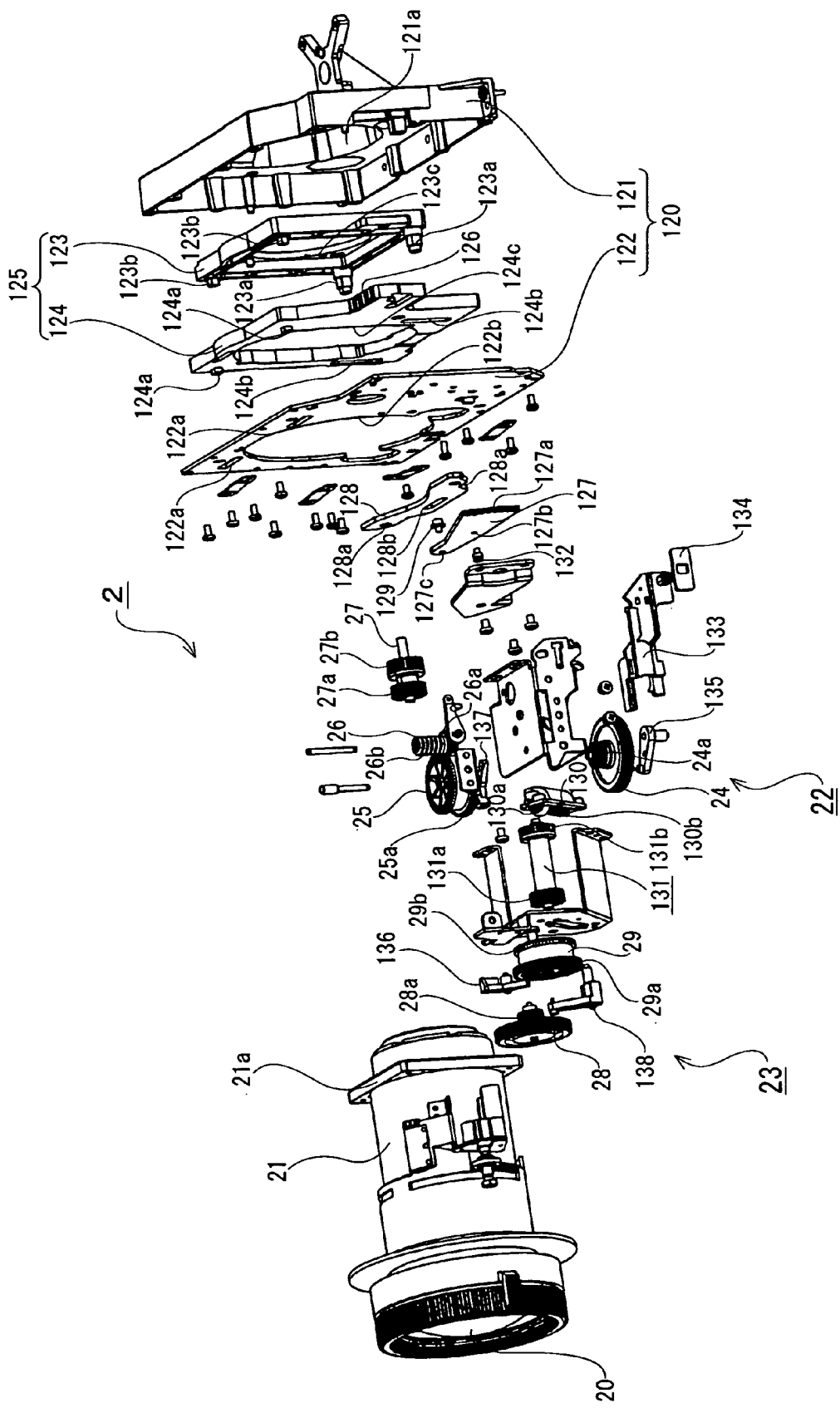
FIG. 17 is an exploded perspective view of the lens shift mechanism.
Figure 19:
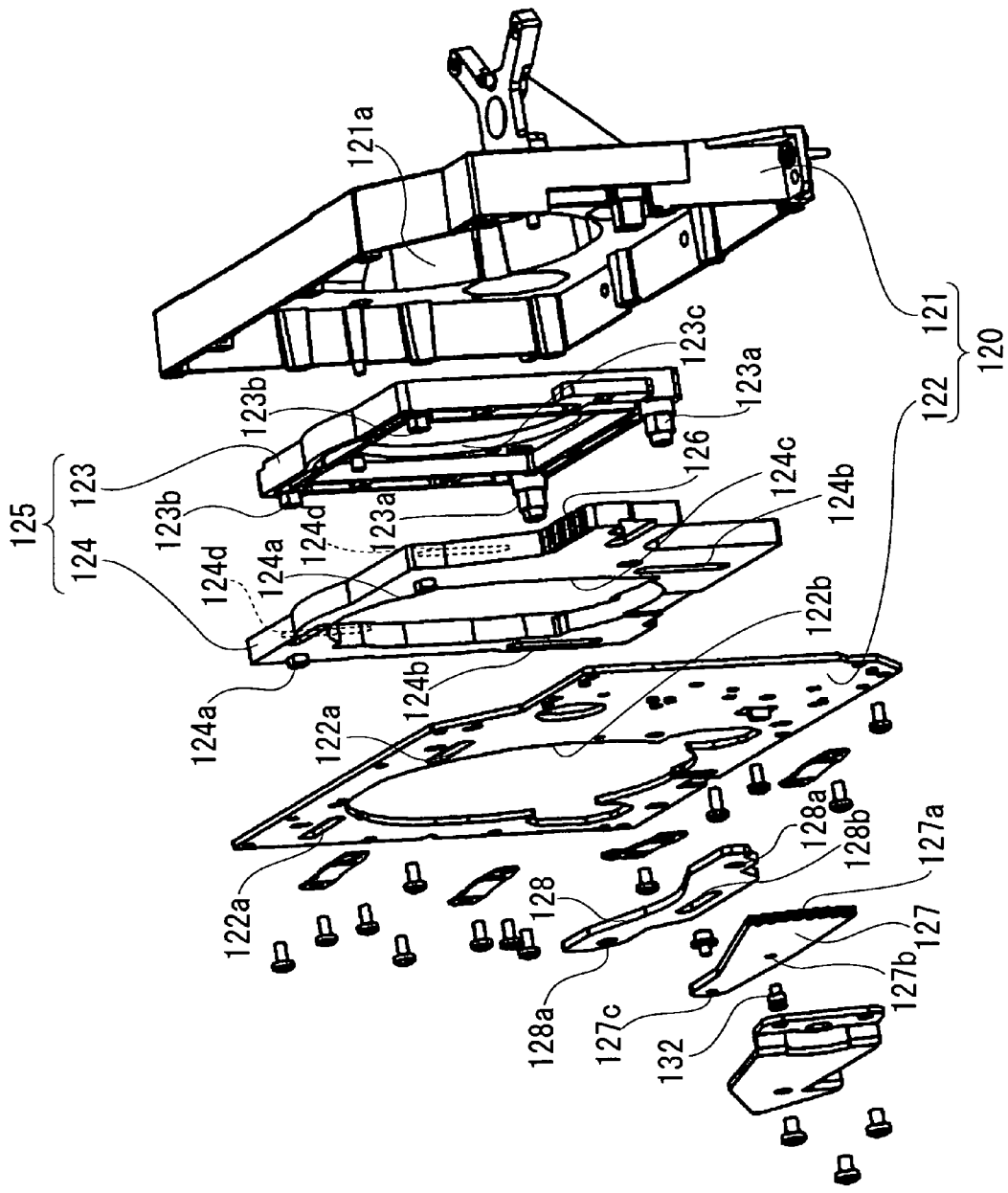
FIG. 19 is an exploded perspective view enlargingly showing a stationary base and a movable member shown in FIG. 17.

As shown in FIG. 17 and FIG. 19, the stationary base 120 includes a metal front plate 122 screwed on the front of a metal back case 121. The back case 121 and front plate 122 have circular openings 121a, 122b, respectively, formed centrally therein. The cylinder 21 is to be inserted into both openings 121a, 122b.

The movable member 125 includes a vertically movable plate 123 and a horizontally movable plate 124 in close contact with each other, and is placed inside the stationary base 120. The vertically movable plate 123 and horizontally movable plate 124 are generally rectangular. Both movable plates 123, 124 have circular openings 123c, 124c, respectively, formed centrally therein, into which the cylinder 21 is to be inserted.

As shown in FIG. 17, the cylinder 21 has an outer peripheral surface thereof formed with a rectangular flange 21a. The cylinder 21 is to be attached to the movable member 125 with the flange 21a held between the horizontally movable plate 124 and vertically movable plate 123.

As shown in FIG. 19, the vertically movable plate 123 has four vertical guide pins 123a, 123a, 123b, 123b protruded from a front surface thereof toward the horizontally movable plate 124. The horizontally movable plate 124 is provided with two vertically long slot-like guide holes 124b, 124b. The two lower vertical guide pins 123a, 123a of the vertically movable plate 123 are to penetrate through the respective guide holes 124b, 124b. The horizontally movable plate 124 has a back surface thereof provided with two vertically long slot-like guide grooves 124d, 124d. The two upper vertical guide pins 123b, 123b of the vertically movable plate 123 are to engage with the respective guide grooves 124d, 124d.

The horizontally movable plate 124 has a right end thereof formed with a horizontally extending rack 126. The rack 126 is to engage with a last stage pinion 27b constituting the horizontal drive mechanism 22 shown in FIG. 18. As shown in FIG. 19, the horizontally movable plate 124 has two horizontal guide pins 124a, 124a protruded from upper opposite ends of a front surface thereof toward the front plate 122, while the front plate 122 has two horizontally long slot-like guide holes 122a, 122a provided therein. The two horizontal guide pins 124a, 124a of the horizontally movable plate 124 are to penetrate through both guide holes 122a, 122a, respectively.

Figure 18:
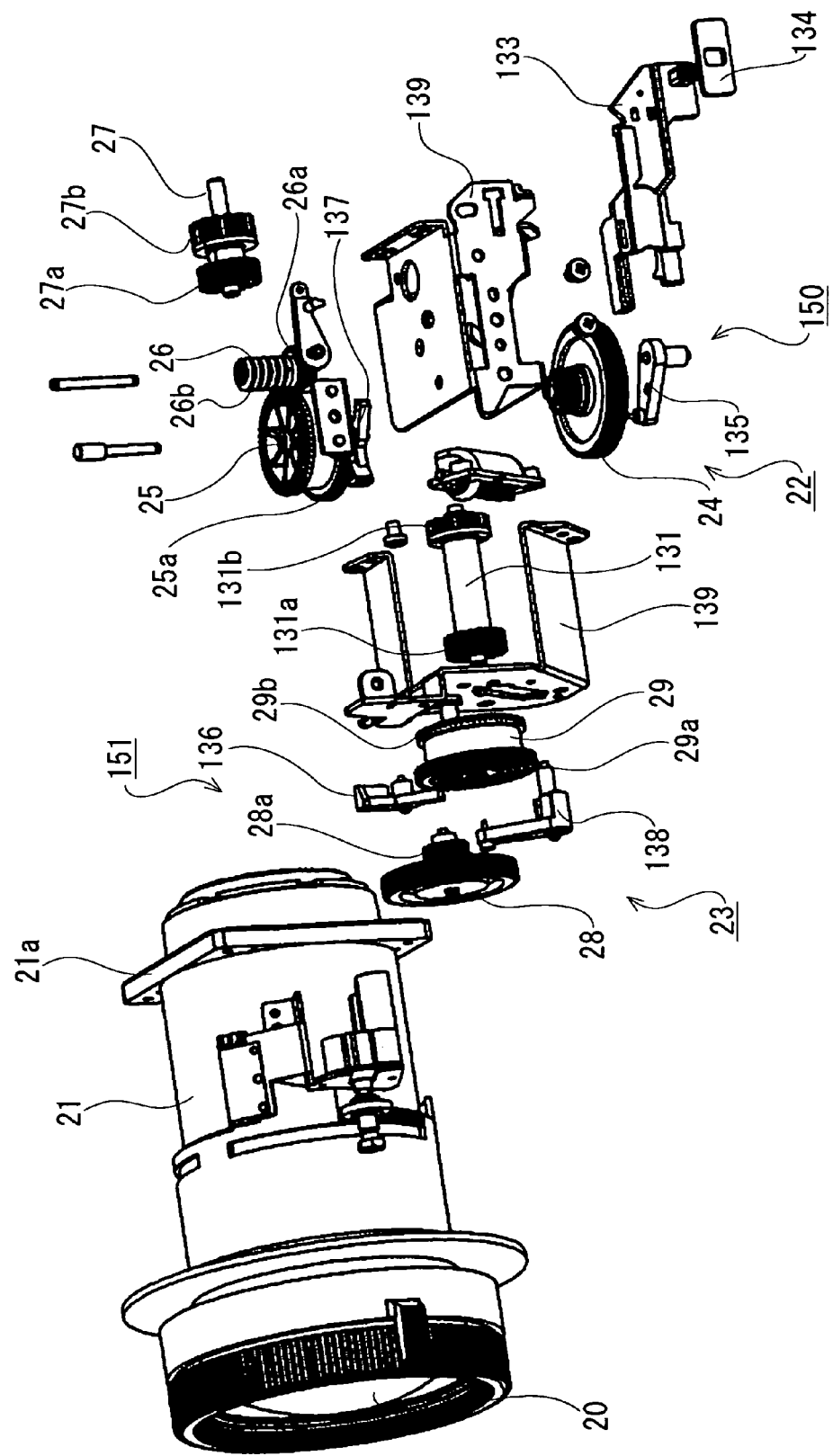
FIG. 18 is an exploded perspective view enlargingly showing a cylinder, a vertical drive mechanism and a horizontal drive mechanism shown in FIG. 17.

As shown in FIG. 17 and FIG. 18, the horizontal drive mechanism 22 includes a horizontal operation dial 24 to be operated by a user, and a plurality of transmission gears 24a, 25, 26, 27 for converting rotary motion of the horizontal operation dial 24 to linear motion of the horizontally movable plate 124. As shown in FIG. 1, the horizontal operation dial 24 is partly exposed from the right side wall of the casing 1.

As shown in FIG. 18, the horizontal operation dial 24 is disposed rotatably on a vertical rotation axis. The spur gear 24a is provided on the reverse surface of the horizontal operation dial 24. The spur gear 24a is engaged with a spur gear 25a of the first transmission gear 25, which rotates on a vertical rotation axis. The spur gear 25a is engaged with a spur gear 26a of the second transmission gear 26, which rotates on a vertical rotation axis. The second transmission gear 26 has a worm 26b engaged with a worm wheel 27a formed at one end of the third transmission gear 27, which rotates on a rotation axis along the optical axis of the projection lens system. The rack 126 of the horizontally movable plate 124 is engaged with the pinion 27b of the third transmission gear 27.

The vertical drive mechanism 23 includes a vertical operation dial 28 to be operated by a user, a plurality of transmission gears 28a, 29, 130, 131 for converting rotary motion of the vertical operation dial 28 to linear motion of the vertically movable plate 124, a turning plate 127 and a connection plate 128. As shown in FIG. 1, the vertical operation dial 28 is partly exposed from the right side wall of the casing 1.

The vertical operation dial 28 is disposed rotatably on a rotation axis along the optical axis. The spur gear 28a is provided on the reverse surface of the vertical operation dial 28. The spur gear 28a is engaged with a spur gear 29a at one end of the fourth transmission gear 29, which rotates on a rotation axis along the optical axis. The fourth transmission gear 29 has a face gear 29b at the other end thereof engaged with a bevel gear 130a formed at one end of the fifth transmission gear 130. The fifth transmission gear 130 has a worm 130b engaged with a worm wheel 131a at one end of the sixth transmission gear 131, which rotates on a rotation axis along the optical axis. The sixth transmission gear 131 has a spur gear 131b at the other end thereof engaged with a sector gear portion 127a of the turning plate 127 shown in FIG. 17 and FIG. 19.

As shown in FIG. 19, the turning plate 127 has an axial bore 127b provided centrally therein. The turning plate 127 is attached to the front plate 122 of the stationary base 120 by a support pin 132 through the axial bore 127b turnably on the support pin 132. The sector gear portion 127a is formed at the right end of the turning plate 127, while the turning plate 127 has a left end thereof provided with a through hole 127c. The turning plate 127 is connected to the connection plate 128 by a connection pin 129 through the through hole 127c.

The connection plate 128 has both right and left ends thereof provided with screw holes 128a, 128a, respectively. The connection plate 128 is fixed to the lower end of the vertically movable plate 123 with two screws through both screw holes 128a, 128a fastened to top ends of the two lower vertical guide pins 123a, 123a of the vertically movable plate 123 exposed from the opening 122b of the front plate 122.

The connection plate 128 has a horizontally long slot-like engagement hole 128b provided centrally therein. The connection pin 129 is through the engagement hole 128b. Therefore, the connection plate 128 and turning plate 127 are to be connected to each other such that the connection plate 128 can be horizontally displaced relative to the turning plate 127 within the engagement hole 128b.

When a user rotates the horizontal operation dial 24 clockwise, the horizontal operation dial 24 transmits its turning force via the plurality of transmission gears 24a, 25, 26, 27 constituting the above horizontal drive mechanism 22 to the rack 126 of the horizontally movable plate 124 shown in FIG. 15. The horizontal guide pins 124a of the horizontally movable plate 124 are then guided by the respective horizontal guide holes 122a of the front plate 122a to slide the horizontally movable plate 124 leftward.

The vertically movable plate 123 can be horizontally displaced relative to the turning plate 127 within the engagement hole 128b of the connection plate 128. Further, the vertically movable plate 123 is restrained from being horizontally displaced relative to the horizontally movable plate 124 by engagement of the two lower vertical guide pins 123a, 123a of the vertically movable plate 123 with the vertical guide holes 124b, 124b of the horizontally movable plate 124, and engagement of the two upper vertical guide pins 123b, 123b shown in FIG. 19 with the vertical guide grooves 124d, 124d of the horizontally movable plates 124. Therefore, the vertically movable plate 123 and the projection lens system attached to the vertically movable plate 123 slide horizontally together with the horizontally movable plate 124 as shown in FIG. 15.

Similarly, when a user rotates the horizontal operation dial 24 counterclockwise, the horizontally movable plate 124, vertically movable plate 123 and projection lens system slide rightward.

In FIG. 15, the dashed line shows the horizontally movable plate 124 and vertically movable plate 123 slid leftward to the limit position, and the double-dashed line shows the horizontally movable plate 124 and vertically movable plate 123 slid rightward to the limit position. The solid line shows the horizontally movable plate 124 and vertically movable plate 123 in the horizontally central position. The central position can provide the brightest projection image. As the horizontally movable plate 124 and vertically movable plate 123 move leftward or rightward away from the central position, the brightness of the projection image slightly lowers.

As shown in FIG. 15, when the horizontally movable plate 124 and vertically movable plate 123 are in the horizontally central position, the connection pin 129 is positioned on a vertically extending line through the centroid of the projection lens system.

When a user rotates the vertical operation dial 28 clockwise, the vertical operation dial 28 transmits its turning force via the plurality of transmission gears 28a, 29, 130, 131 constituting the vertical drive mechanism 23 shown in FIG. 18 to the sector gear portion 127a of the turning plate 127 shown in FIG. 16. The turning plate 127 then turns counterclockwise on the support pin 132, causing the left end of the turning plate 127 to move downward.

The turning plate 127 has the connection plate 128 connected to the left end thereof via the connection pin 129. The connection plate 128 is fixed to the vertically movable plate 123. Therefore, as the turning plate 127 turns counterclockwise, the two lower vertical guide pins 123a, 123a of the vertically movable plate 123 are guided by the vertical guide holes 124b, 124b of the horizontally movable plate 124, and the two upper vertical guide pins 123b, 123b shown in FIG. 19 are guided by the vertical guide grooves 124d, 124d of the horizontally movable plate 124, to move the vertically movable plate 123 and the projection lens system attached to the vertically movable plate 123 downward relative to the horizontally movable plate 124.

On the other hand, when a user rotates the vertical operation dial 28 counterclockwise, the turning plate 127 turns clockwise on the support pin 132, causing the left end of the turning plate 127 to move upward. This causes the vertically movable plate 123 and the projection lens system to be displaced upward relative to the horizontally movable plate 124.

In FIG. 16, the dashed line shows the vertically movable plate 123 slid upward to the limit position, and the double-dashed line shows the vertically movable plate 123 slid downward to the limit position. The solid line shows the vertically movable plate 123 in the vertically central position. The central position can provide the brightest projection image. As the vertically movable plate 123 moves upward or downward away from the central position, the brightness of the projection image slightly lowers.

The above lens shift mechanism 2 makes it possible to minimize the turning force to act on the vertically movable plate 123 due to the self-weight of the projection lens system in vertical shift operation of the projection lens system because the turning plate 127 constituting the vertical drive mechanism 23 and the vertically movable plate 123 having the projection lens system attached thereto are connected to each other by the connection pin 129 on a vertically extending line through the centroid of the projection lens system. This enables the projection lens system to be vertically driven smoothly.

Figure 20:
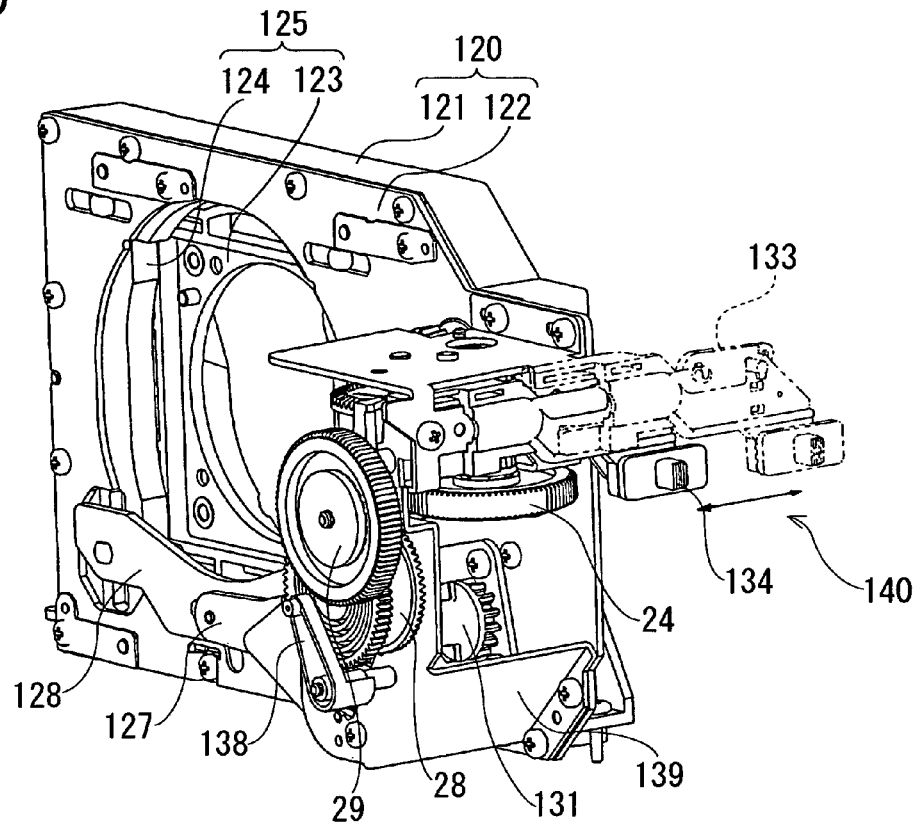
FIG. 20 is a perspective view showing a lock mechanism of the lens shift mechanism.
Figure 21:
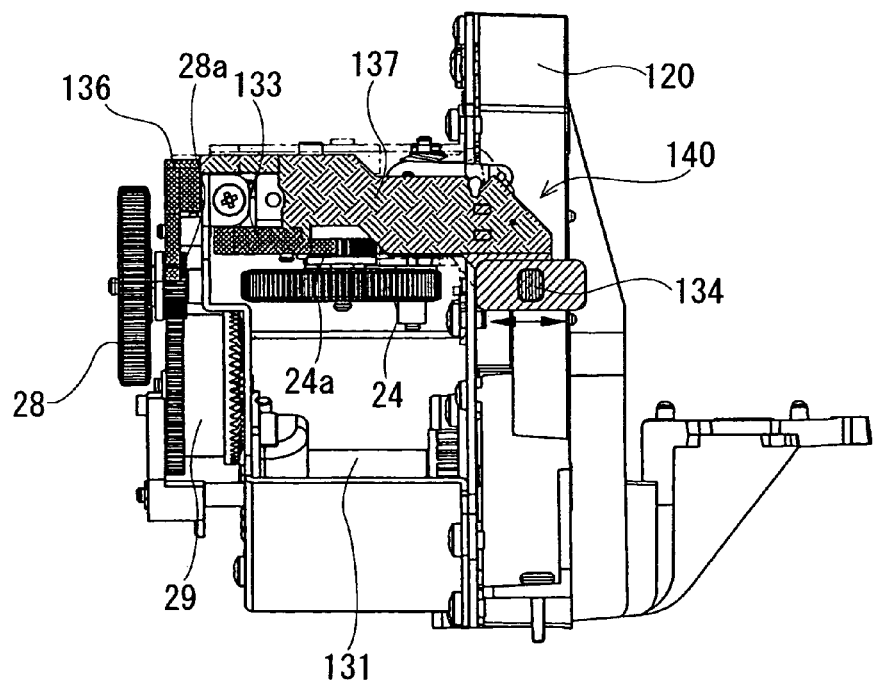
FIG. 21 is a side view showing the lock mechanism.

As shown in FIG. 20 and FIG. 21, the lens shift mechanism 2 includes a lock mechanism 140 for fixing the projection lens system in a desired position. The lock mechanism 140 is for fixing the projection lens system in place after adjusting an image projected from the liquid crystal projector device in place in accordance with a forward screen using the lens shift mechanism 2 in setting of the liquid crystal projector device. The lock mechanism 140 eliminates the necessity of later readjustment unless the liquid crystal projector device or screen is moved.

As shown in FIG. 21, the lock mechanism 140 includes the lever member 133 slidable along the optical axis of the projection lens system, a horizontal lock member 137 to disengagably engage with the spur gear 24a of the horizontal operation dial 24, and a vertical lock member 136 to disengagably engage with the spur gear 28a of the vertical operation dial 28, in accordance with slide operation of the lever member 133. As shown in FIG. 20, the lever member 133 is attached to an attachment plate 139 fastened to the stationary base 120, and slidable along the optical axis between an unlocked position indicated by the solid line and a locked position indicated by the double-dashed line in the drawing. As shown in FIG. 1, the knob 134 of the lever member 133 is exposed from the right side wall of the casing 1.

In adjustment of the image projection position using the lens shift mechanism 2, the lever member 133 is set in the unlocked position. After completion of the adjustment, the knob 134 of the lever member 133 is operated to slide the lever member 133 to the locked position, whereby the horizontal lock member 137 and vertical lock member 136 shown in FIG. 21 are engaged with the spur gears 24a, 28a of the horizontal operation dial 24 and vertical operation dial 28 constituting the lens shift mechanism 2, to disable both operation dials 24, 28 from rotating. This enables the projection lens system to be fixed in a desired position.

If the image projection position needs readjustment, the knob 134 of the lever member 133 is operated to slide the lever member 133 to the unlocked position, whereby the horizontal lock member 137 and vertical lock member 136 shown in FIG. 21 are disengaged from the spur gears 24a, 28a of the horizontal operation dial 24 and vertical operation dial 28 constituting the lens shift mechanism 2, to enable both operation dials 24, 28 to rotate.

Figure 22:
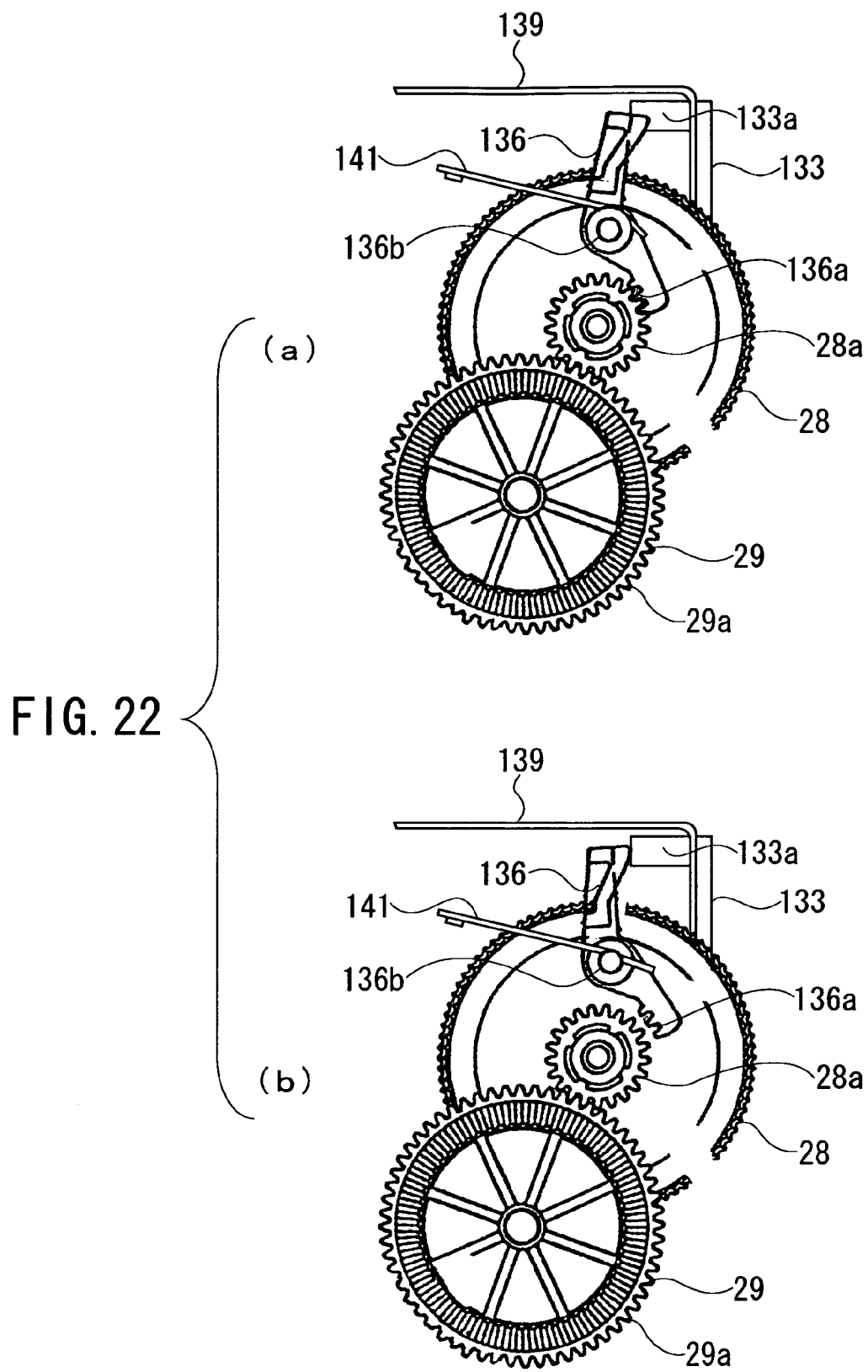
FIG. 22 illustrates the vertical drive mechanism locked or unlocked by the lock mechanism.

FIG. 22(a) and FIG. 22(b) show a relative position relationship between the lever member 133 and vertical lock member 136, with the lever member 133 set in the locked position or unlocked position. As shown in FIG. 22(a) and FIG. 22(b), the vertical lock member 136 is approximately L-shaped, and attached to the attachment plate 139 shown in FIG. 20 turnably on a rotation axis 136b along the optical axis. The vertical lock member 136 has one end thereof formed with a gear portion 136a.

The rotation axis 136b of the vertical lock member 136 has a torsion spring 141 fitted there around. The torsion spring 141 has one end thereof locked on the attachment plate 139, and the other end hung on the back surface of the gear portion 136a of the vertical lock member 136.

The elastic restoring force of the torsion spring 141 causes counterclockwise turning force to act on the vertical lock member 136. The gear portion 136a of the vertical lock member 136 is always biased by the turning force toward the spur gear 28a of the vertical operation dial 28.

When the lever member 133 is set in the locked position, the lever member 133 is positioned rearward along the optical axis, as indicated by the double-dashed line in FIG. 20. In this state, the lever member 133 has an end 133a thereof spaced apart from the vertical lock member 136 as shown in FIG. 22(a). The gear portion 136a of the vertical lock member 136 is engaged with the spur gear 28a of the vertical operation dial 28 by the biasing force of the torsion spring 141. This results in the vertical operation dial 28 disabled from rotating.

On the other hand, when the lever member 133 is set in the unlocked position, the lever member 133 is positioned forward along the optical axis, as indicated by the solid line in FIG. 20. In this state, the end 133a of the lever member 133 touches one end of the vertical lock member 136 as shown in FIG. 22(b). This causes the vertical lock member 136 to turn counterclockwise against the biasing force of the torsion spring 141.

Consequently, the gear portion 136a formed at the other end of the vertical lock member 136 moves away from the spur gear 28a of the vertical operation dial 28. This results in the vertical operation dial 28 enabled to rotate.

Figure 23:
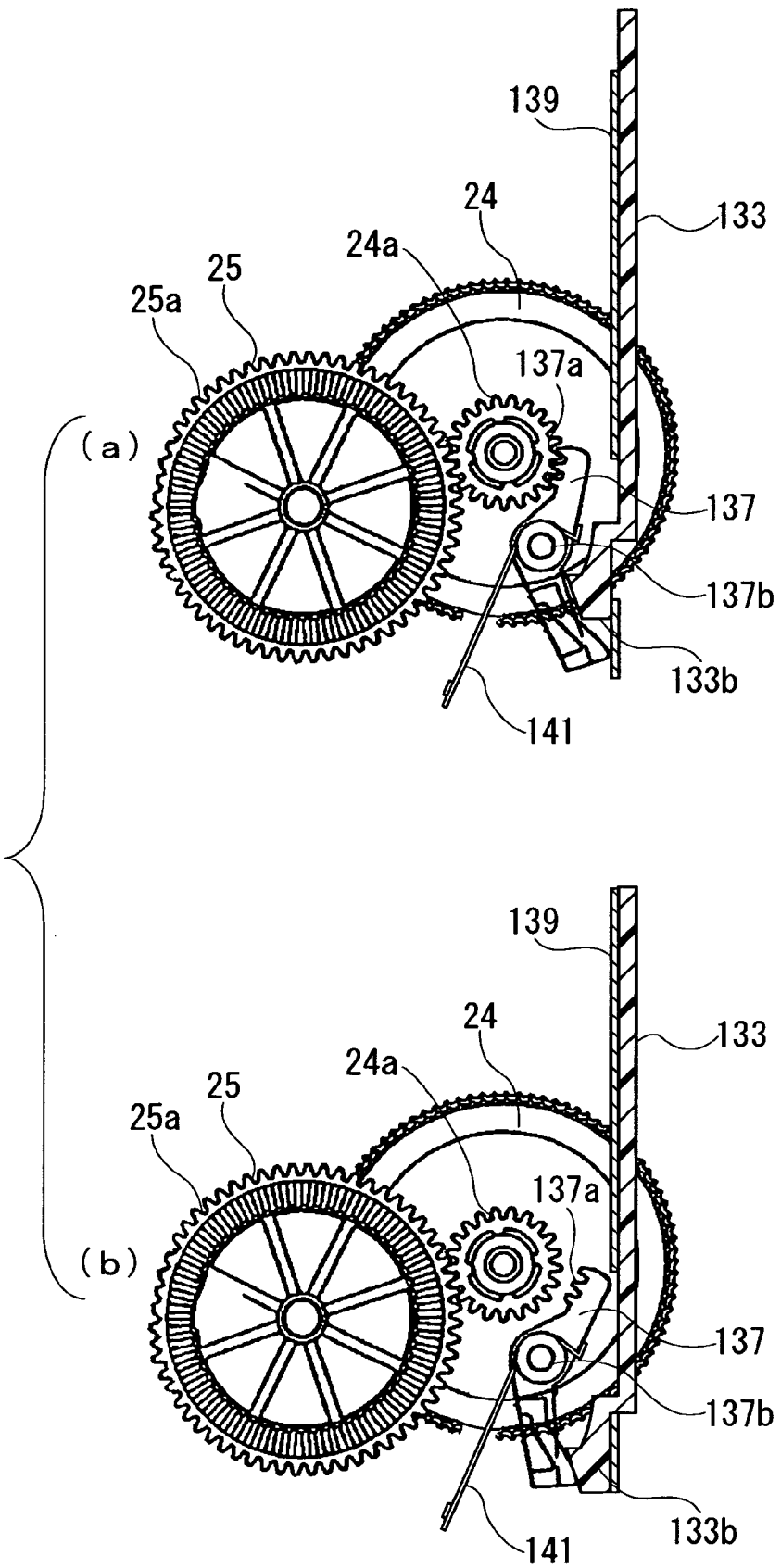
FIG. 23 illustrates the horizontal drive mechanism locked or unlocked by the lock mechanism.

FIG. 23(a) and FIG. 23(b) show a relative position relationship between the lever member 133 and horizontal lock member 137, with the lever member 133 set in the locked position or unlocked position. As shown in FIG. 23(a) and FIG. 23(b), the horizontal lock member 137 is approximately L-shaped, and attached to the attachment plate 139 shown in FIG. 20 turnably on a vertical rotation axis 137b. The horizontal lock member 137 has one end thereof formed with a gear portion 137a.

The rotation axis 137b of the horizontal lock member 137 has a torsion spring 141 fitted therearound. The torsion spring 141 has one end thereof locked on the attachment plate 139, and the other end hung on the back surface of the gear portion 137a of the horizontal lock member 137.

The elastic restoring force of the torsion spring 141 causes counterclockwise turning force to act on the horizontal lock member 137. The gear portion 137a of the horizontal lock member 137 is always biased by the turning force toward the spur gear 24a of the horizontal operation dial 24.

When the lever member 133 is set in the locked position, the lever member 133 is positioned rearward along the optical axis, as indicated by the double-dashed line in FIG. 20. In this state, the lever member 133 has an end 133b thereof spaced apart from the horizontal lock member 137 as shown in FIG. 23(a). The gear portion 137a of the horizontal lock member 137 is engaged with the spur gear 24a of the horizontal operation dial 24 by the biasing force of the torsion spring 141. This results in the horizontal operation dial 24 disabled from rotating.

On the other hand, when the lever member 133 is set in the unlocked position, the lever member 133 is positioned forward along the optical axis, as indicated by the solid line in FIG. 20. In this state, the end 133b of the lever member 133 touches one end of the horizontal lock member 137 as shown in FIG. 23(b). This causes the horizontal lock member 137 to turn clockwise against the biasing force of the torsion spring 141.

Consequently, the gear portion 137a formed at the other end of the horizontal lock member 137 moves away from the spur gear 24a of the horizontal operation dial 24. This results in the horizontal operation dial 24 enabled to rotate.

Therefore, the liquid crystal projector device of the present invention can realize, with a simple structure, the lock mechanism 140 capable of simultaneously setting the two operation dials 24, 28 so as to rotate or not to rotate, with slide operation of the single lever member 133.

The lens shift mechanism 2 further includes a first click-feeling generation mechanism 150 for giving a certain click-feeling to the horizontal operation dial 24 when operation of the horizontal operation dial 24 brings the projection lens system into the horizontally central position indicated by the solid line in FIG. 15, and a second click-feeling generation mechanism 151 for giving a certain click-feeling to the operation of the vertical operation dial 28 when operation of the vertical operation dial 28 brings the projection lens system into the vertically central position indicated by the solid line in FIG. 16.

Figure 24:
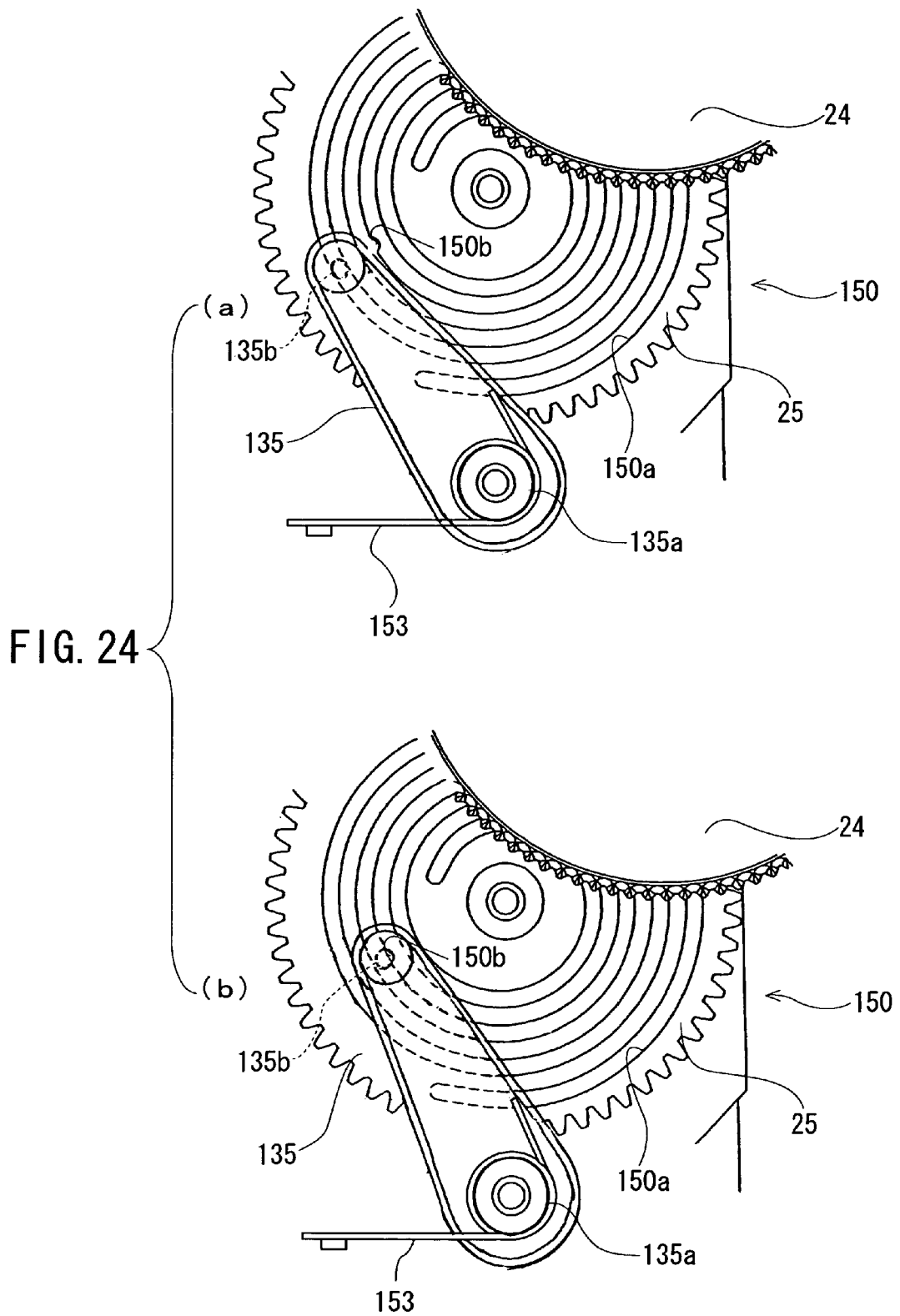
FIG. 24 illustrates a change of how a click-feeling generation mechanism is engaged with the horizontal drive mechanism.

As shown in FIG. 24(a) and FIG. 24(b), the first click-feeling generation mechanism 150 includes a first whorl groove 150a provided in a side surface of the first transmission gear 25 constituting the horizontal drive mechanism 22, a first turning member 135 to slide on the first whorl groove 150a along with rotation of the first transmission gear 25, and a torsion spring 153 fitted around a rotation axis 135a of the first turning member 135. The first turning member 135 is attached to the attachment plate 139 shown in FIG. 20 turnably on the vertical rotation axis 135a provided at one end of the first turning member 135.

The first turning member 135 has the other end thereof formed with a projection 135b projecting toward the first transmission gear 25. The projection 135b is engaged with the first whorl groove 150a. The first turning member 135 has a clockwise turning force on the rotation axis 135a caused by the elastic restoring force of the torsion spring 153, whereby the projection 135b is biased toward the inner peripheral wall surface of the first whorl groove 150a.

Therefore, when a user rotates the horizontal operation dial 24 to thereby rotate the first transmission gear 25, the projection 135b of the first turning member 135 slides on the first whorl groove 150a while contacting the inner peripheral wall surface of the first whorl groove 150a.

When the rotation of the horizontal operation dial 24 brings the projection lens system into the horizontally central position indicated by the solid line in FIG. 15, the projection 135b of the first turning member 135 is engaged by the biasing force of the torsion spring 153 with a recess 150b provided on the inner peripheral wall surface of the first whorl groove 150a, as shown in FIG. 24(b).

The certain click-feeling will be given to the operation of the horizontal operation dial 24 by a collision made when the projection 135b of the first turning member 135 engages with the recess 150b of the first whorl groove 150a. In order to further rotate the horizontal operation dial 24 from this state, it is necessary to disengage the projection 135b of the first turning member 135 from the recess 150b of the first whorl groove 150a against the biasing force of the torsion spring 153. This will give a certain resistance force to the rotation operation of the horizontal operation dial 24.

Figure 25:
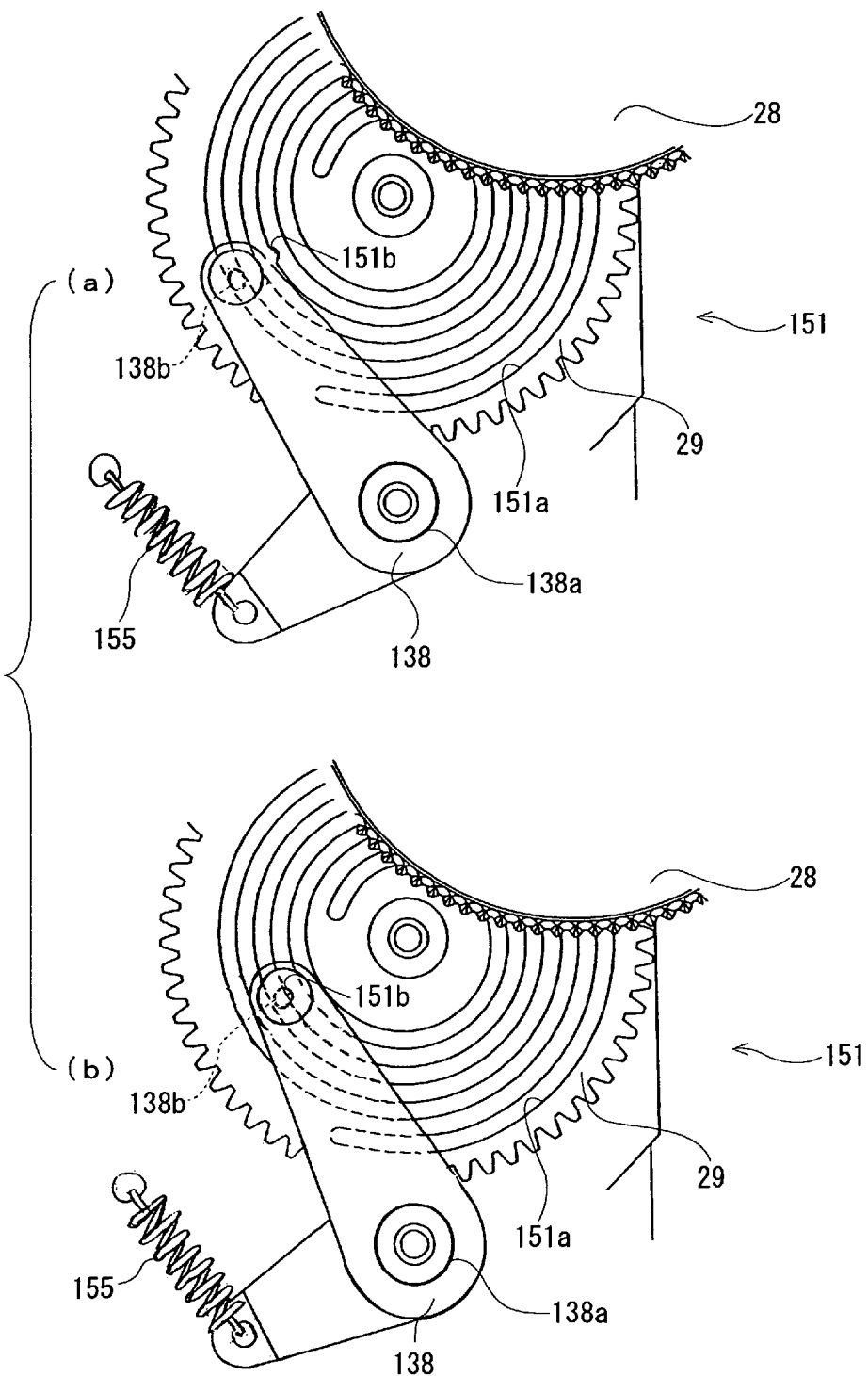
FIG. 25 illustrates a change of how a click-feeling generation mechanism is engaged with the vertical drive mechanism.

As shown in FIG. 25(a) and FIG. 25(b), the second click-feeling generation mechanism 151 includes a second whorl groove 151a provided in a side surface of the fourth transmission gear 29 constituting the vertical drive mechanism 23, a second turning member 138 to slide on the second whorl groove 151a along with rotation of the fourth transmission gear 29, and a coil spring 155 for giving a clockwise turning force to the second turning member 138.

The second turning member 138 is approximately L-shaped, and attached to the attachment plate 139 shown in FIG. 15 and FIG. 16 turnably on the rotation axis 138a extending along the optical axis direction. The coil spring 155 is stretched between one end of the second turning member 138 and the attachment plate 139.

As shown in FIG. 25(a) and FIG. 25(b), the second turning member 138 has the other end thereof formed with a projection 138b projecting toward the fourth transmission gear 29. The projection 138b is engaged with the second whorl groove 151a. The second turning member 138 has a clockwise turning force on the rotation axis 138a caused by the elastic restoring force of the coil spring 155, whereby the projection 138b is biased toward the inner peripheral wall surface of the second whorl groove 151a.

Therefore, when a user rotates the vertical operation dial 28 to thereby rotate the fourth transmission gear 29, the projection 138b of the second turning member 138 slides on the second whorl groove 151a while contacting the inner peripheral wall surface of the second whorl groove 151a.

When the rotation of the vertical operation dial 28 brings the projection lens system into the vertically central position indicated by the solid line in FIG. 16, the projection 138b of the second turning member 138 is engaged by the biasing force of the coil spring 155 with a recess 151b provided on the inner peripheral wall surface of the second whorl groove 151a, as shown in FIG. 25(b).

The certain click-feeling will be given to the operation of the vertical operation dial 28 by a collision made when the projection 138b of the second turning member 138 engages with the recess 151b of the second whorl groove 151a. In order to further rotate the vertical operation dial 28 from this state, it is necessary to disengage the projection 138b of the second turning member 138 from the recess 151b of the second whorl groove 151a against the biasing force of the coil spring 155. This will give a certain resistance force to the rotation operation of the vertical operation dial 28.

According to the above liquid crystal projector device of the present invention, when adjusting the image projection position with the lens shift mechanism 2, a user can recognize, due to the click-feelings of both operation dials 24, 28, the horizontally and vertically central positions, which give a projection image with the maximum brightness. This allows adjustment of the image projection position with reference to the horizontally and vertically central positions. Consequently, the image projection position is adjusted more easily than conventionally.

Lamp Unit 7

Figure 26:
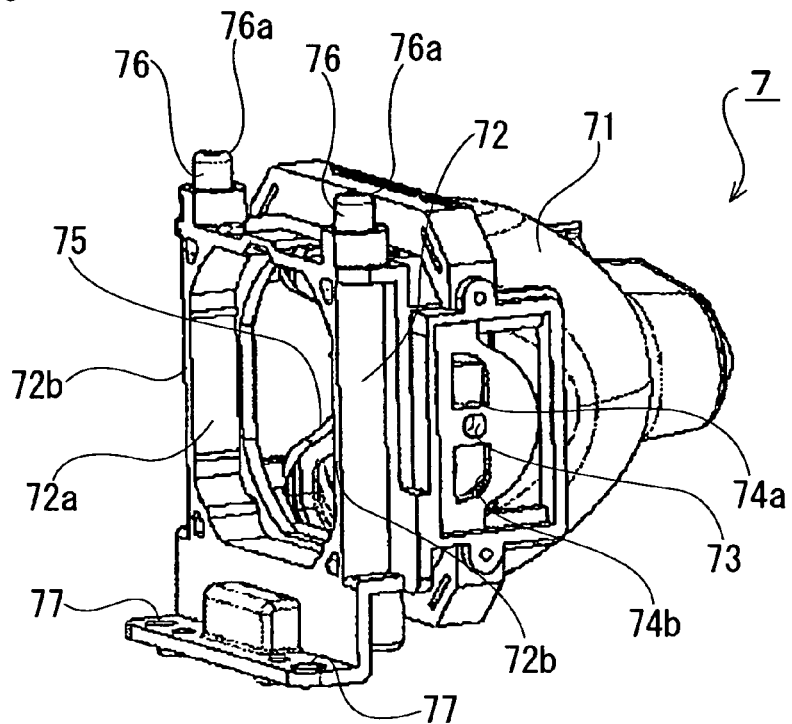
FIG. 26 is a perspective view of a lamp unit.

As shown in FIG. 2, the lamp unit 7 providing a light source is attached to the left end of the optical system holding case 30. As shown in FIG. 26, the lamp unit 7 includes a reflector 71 having an ellipsoidal reflecting surface and joined to a rectangular frame 72. As shown in FIG. 34, the reflector 71 has a lamp bulb 170 providing the light source arranged at the focal position thereof. The lamp bulb 170 includes a luminous body enclosed inside a columnar glass tube 171. A light emitting portion 172 enclosing the luminous body is spherical.

Figure 27:
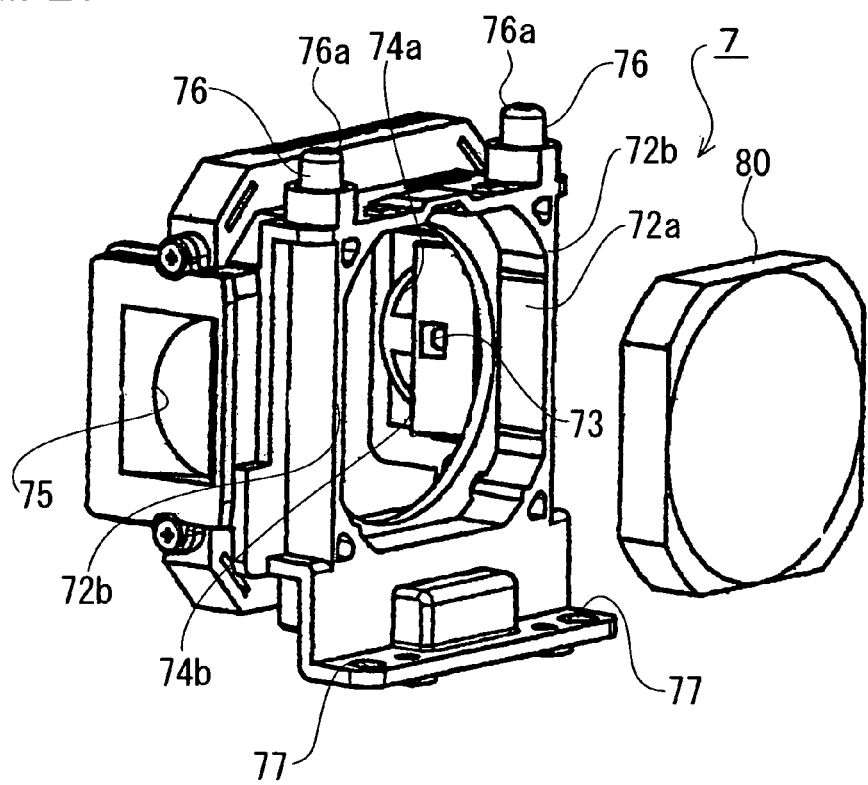
FIG. 27 is an exploded perspective view showing a frame and a concave lens of the lamp unit.

As shown in FIG. 26 and FIG. 27, the frame 72 has a rectangular opening 72a. A concave lens 80 is fitted in the opening 72a. As shown in FIG. 35(a), the concave lens 80 has a concave surface 80a on the light emergence surface. As shown in FIG. 35(b), the concave lens 80 has a concavity 80b formed only centrally on the light incidence surface.

As shown in FIG. 3, the lamp cooling fan 190 for cooling the lamp unit 7 is arranged at the rear left end of the casing 1. As shown in FIG. 26 and FIG. 27, the lamp unit 7 has the lamp cooling fan 190 facing side formed with three air introduction openings 74a, 73, 74b for introducing the air drawn from the lamp cooling fan 190 toward the lamp bulb 170 shown in FIG. 34. Formed on the opposite side of the lamp unit 7 is an air discharge opening 75 for discharging the air introduced from the three air introduction openings 74a, 73, 74b.

The lamp unit 7 is a user replacement part because its performance deteriorates due to long use. This requires that the lamp unit 7 have an attachment structure that allows easy attachment/detachment. If the lamp unit 7 is attached slantingly relative to the optical system holding case 30, then the brightness of the projection image lowers. Therefore, it is required that the lamp unit 7 have an attachment structure that allows the lamp unit 7 to be easily attached/detached, as well as ensuring that the lamp unit 7 can be positioned in a particular place relative to the optical system holding case 30.

Figure 29:
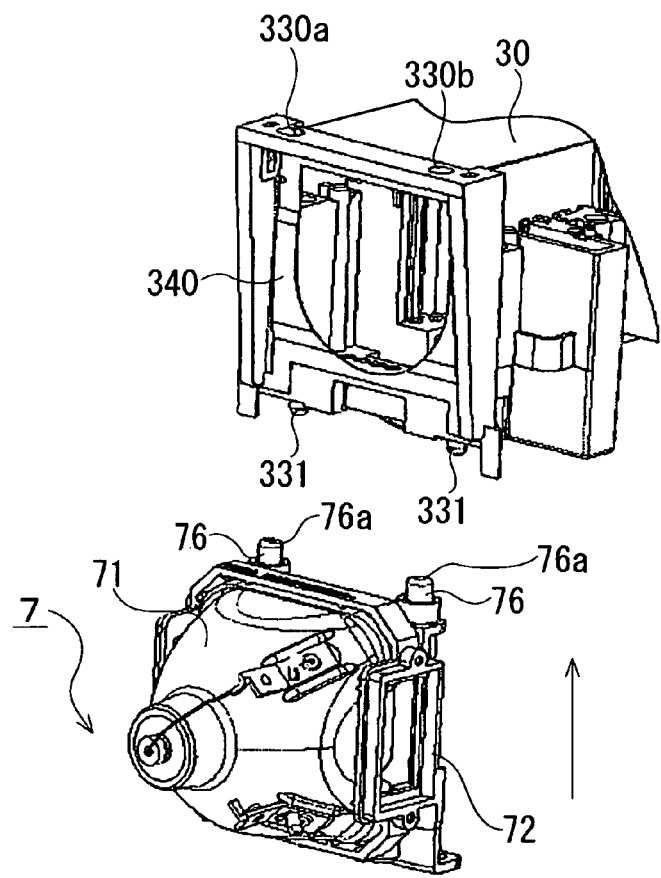
FIG. 29 is a perspective view showing an attachment structure for attaching the lamp unit to the left end of the optical system holding case.

As shown in FIG. 29, in the projector device of the present invention, the lamp unit 7 can be attached to and detached from the left end of the optical system holding case 30 by sliding along a plane perpendicular to the optical axis of the optical system 3 disposed in the optical system holding case 30.

The optical system holding case 30 has an upper wall and a lower wall of the left end thereof provided with two positioning holes 330a, 330b and two positioning pins 331, 331 for positioning the lamp unit 7. The two positioning holes 330a, 330b and two positioning pins 331, 331 are adjacently provided at a certain distance in the direction perpendicular to the optical axis of light emitted from the lamp unit 7.

Figure 28:
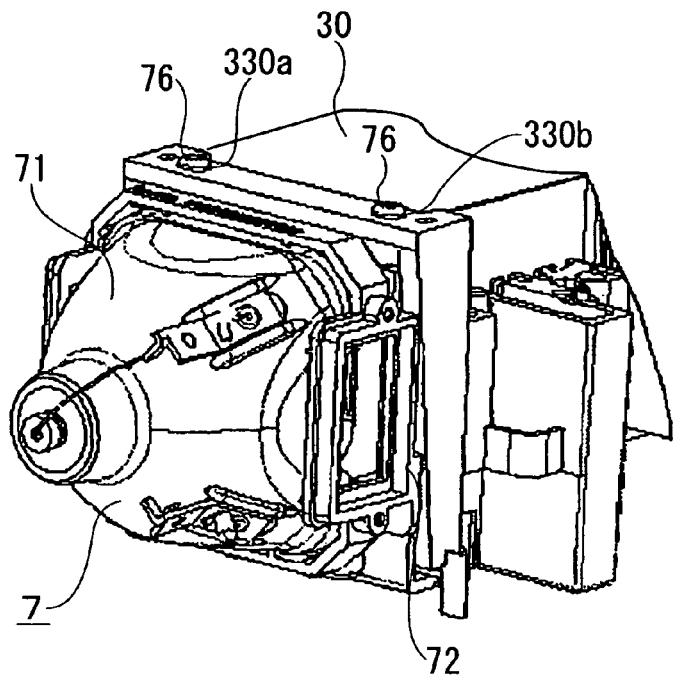
FIG. 28 is a perspective view showing the lamp unit attached to the left end of an optical system holding case.

As shown in FIG. 28 and FIG. 29, the frame 72 of the lamp unit 7 has, protruded upward from an upper surface thereof, two fitting pins 76, 76 to fit into the two positioning holes 330a, 330b of the optical system holding case 30, while, as shown in FIG. 26 and FIG. 27, the frame 72 has a lower end thereof provided with two fitting holes 77, 77. The two positioning pins 331, 331 of the optical system holding case 30 shown in FIG. 29 are to be fitted into both fitting holes 77, 77.

The fitting pins 76 have an outer diameter of 5 mm, and the positioning holes 330a, 330b have an inner diameter of 5.1 mm. The positioning pins 331 have an outer diameter of 4 mm, and the fitting holes 77 have an inner diameter of 4.1 mm.

Figure 30:
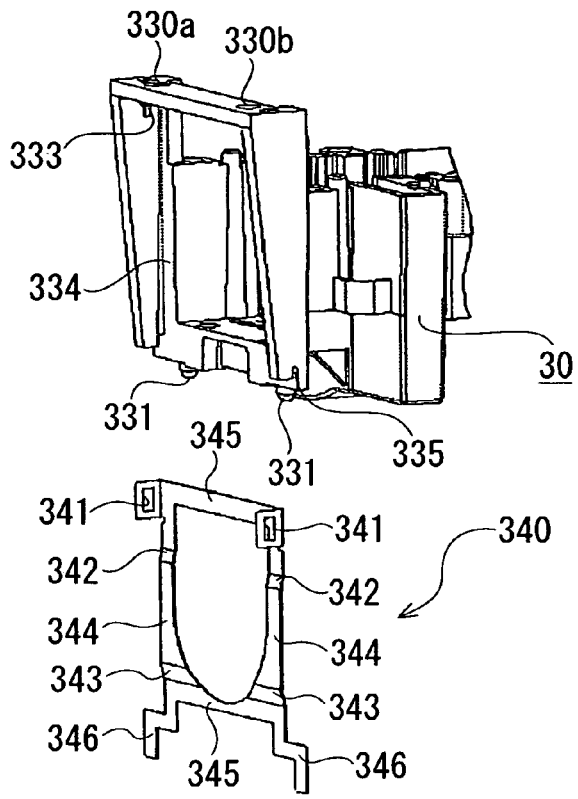
FIG. 30 is a perspective view showing an attachment structure for attaching a flat spring member to the left end of the optical system holding case.

As shown in FIG. 29 and FIG. 30, the optical system holding case 30 has a sheet metal, rectangular frame-like flat spring member 340 attached to the left end thereof. As shown in FIG. 30, the flat spring member 340 is attached to the left end of the optical system holding case 30 with hook holes 341, 341 provided on opposite upper ends engaged with hooks 333, 333 protruded from inner surfaces of opposite side walls of the optical system holding case 30, and with L-shaped bent portions 346, 346 provided on opposite lower ends inserted in a slit groove 335 provided in the lower end of the optical system holding case 30.

The flat spring member 340 has a first flat portion 345 to contact an end surface 334 of the left end of the optical system holding case 30, a second flat portion 344 projecting from the first flat portion 345 toward the lamp unit 7, and inclined portions 342, 343 connecting the first flat portion 345 and second flat portion 344.

When the lamp unit 7 is attached to the optical system holding case 30, as shown in FIG. 29, the two fitting pins 76, 76 formed on the frame 72 of the lamp unit 7 are inserted into the two positioning holes 330a, 330b of the optical system holding case 30 from beneath the optical system holding case 30.

Figure 32:
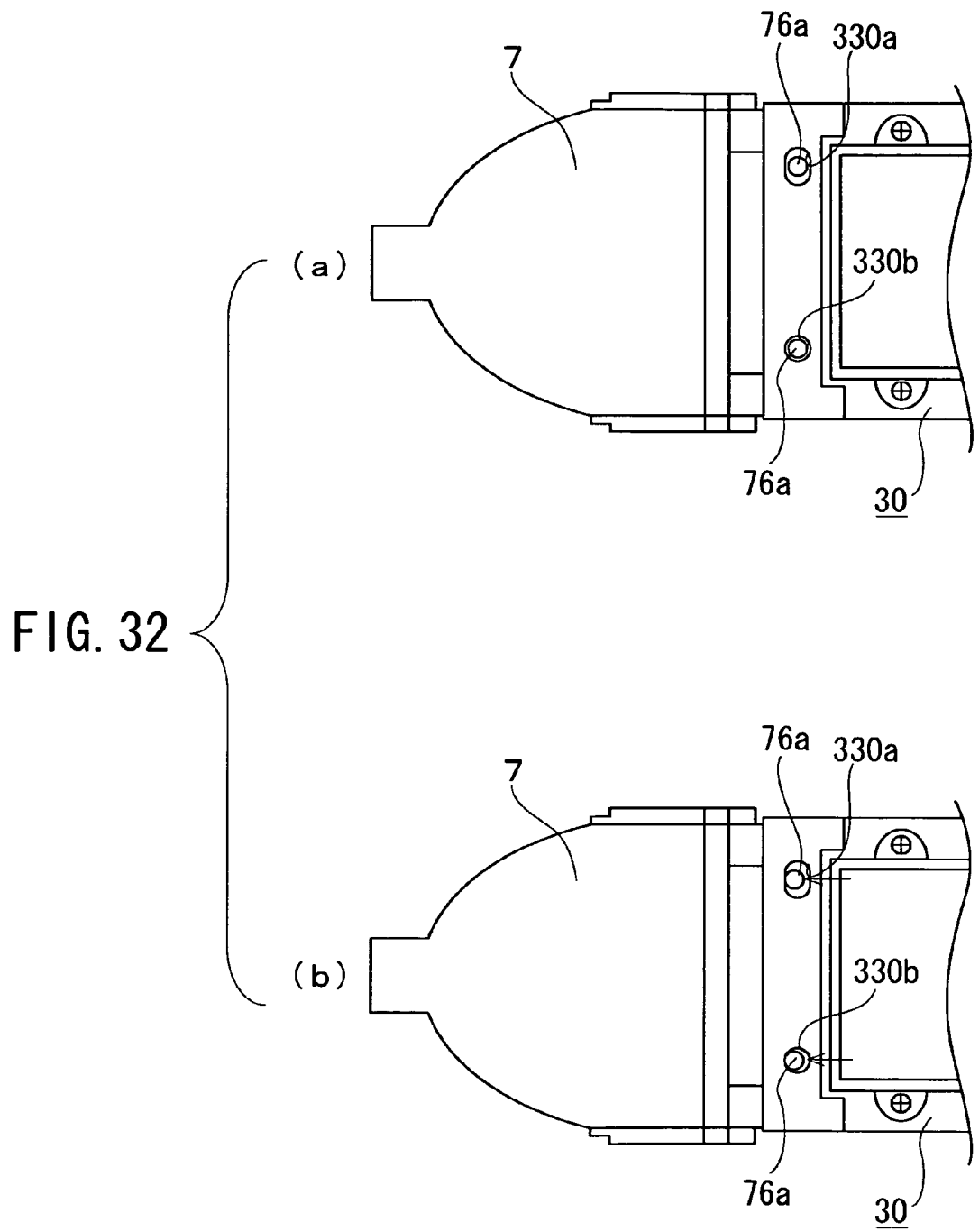
FIG. 32 illustrates fitting pins of the lamp unit having ends thereof inserted into positioning holes, and the lamp unit attached to the left end of the optical system holding case.

As shown in FIG. 26, FIG. 27 and FIG. 29, taper machining is applied to tips 76a, 76a of the two fitting pins 76, 76 of the frame 72 to thereby give the two fitting pins 76, 76 a tapered shape. Further, as shown in FIG. 32(a) and FIG. 32(b), one positioning hole 330a of the two positioning holes 330a, 330b of the optical system holding case 30 has a shape longer in the direction perpendicular to the optical axis direction. Therefore, the two fitting pins 76, 76 of the frame 72 can be easily inserted into the two positioning holes 330a, 330b of the optical system holding case 30.

Figure 33:
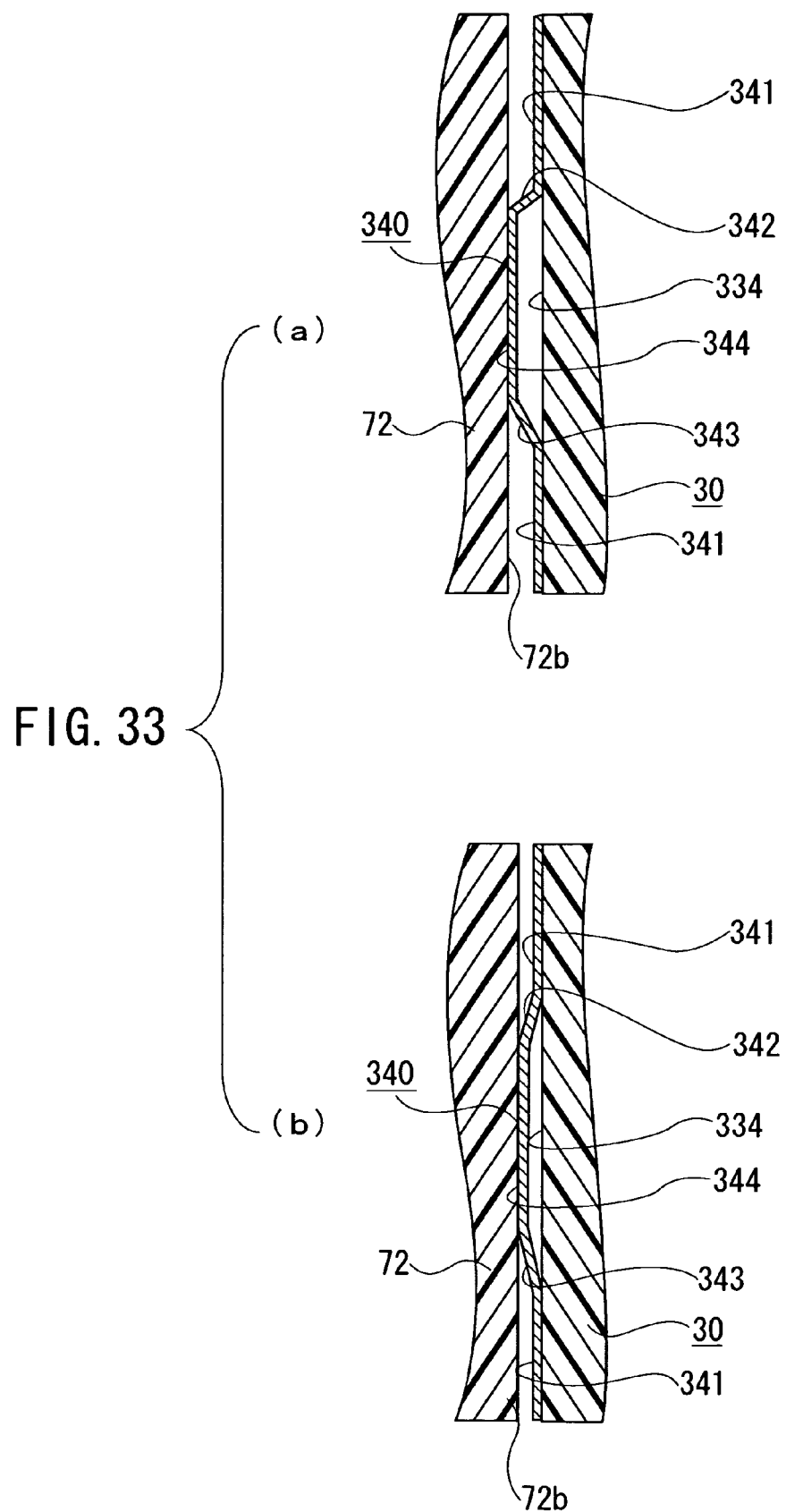
FIG. 33 includes enlarged sectional views showing deformations of the flat spring member in the state where the fitting pins of the lamp unit have the ends inserted into the positioning holes, and in the state where the lamp unit is attached to the left end of the optical system holding case.

FIG. 32(a) shows the tips 76a, 76a of the two fitting pins 76, 76 of the frame 72 inserted in the two positioning holes 330a, 330b of the optical system holding case 30. FIG. 33(a) shows the deformation of the flat spring member 340 in this state. In this state, an end surface 72b of the frame 72 is only in contact with the second flat portion 344 of the flat spring member 340, and does not deform the flat spring member 340.

When the lamp unit 7 is further inserted from this state, an end of the lamp unit 7 contacts the lower surface of the upper wall of the optical system holding case 30, which receives the lamp unit 7, while the two positioning pins 331, 331 of the optical system holding case 30 shown in FIG. 29 and FIG. 30 are fitted into the two fitting holes 77, 77 formed in the lower end of the frame 72 of the lamp unit 7 shown in FIG. 29. As shown in FIG. 28, the lamp unit 7 is thus attached to the left end of the optical system holding case 30.

Figure 31:
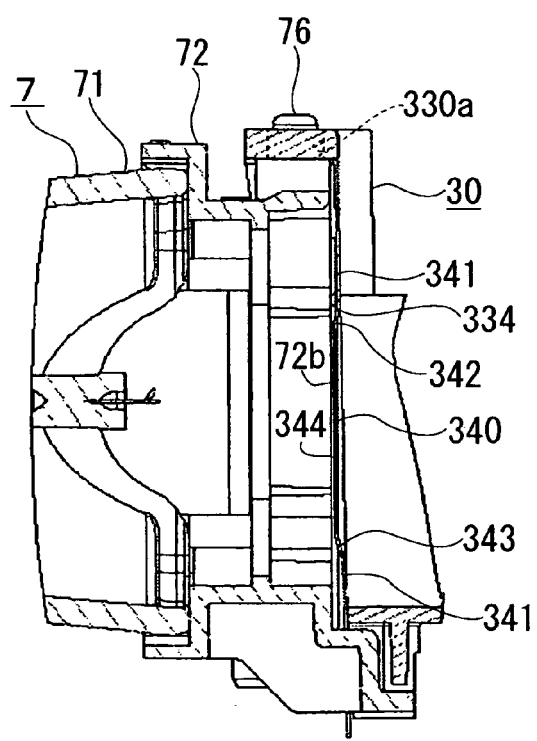
FIG. 31 is a sectional view showing the lamp unit attached to the left end of the optical system holding case.

FIG. 31 and FIG. 32(b) show the lamp unit 7 attached to the left end of the optical system holding case 30. FIG. 33(b) shows the deformation of the flat spring member 340 in this state. In this state, as shown in FIG. 31 and FIG. 33(b), the end surface 72b of the frame 72 pushes the second flat portion 344 of the flat spring member 340, whereby the flat spring member 340 is pressed between the end surface 72b of the frame 72 and the end surface 334 of the optical system holding case 30. This causes the elastic deformation in the flat spring member 340.

The lamp unit 7 is pushed away from the optical system holding case 30 by the elastic restoring force of this flat spring member 340. Because the fitting pin 76 is columnar and the first positioning hole 330b is circular, the centering effect due to the engagement of both causes the fitting pin 76 to move to a position where its central axis and the center of the first positioning hole 330b stand in a line parallel to the optical axis.

Consequently, as shown in FIG. 32(b), the lamp unit 7 is positioned, in the direction along the optical axis, in a place where outer peripheral surfaces of the fitting pins 76, 76 of the frame 72 are in contact with lamp unit 7 side end edges of the respective positioning holes 330a, 330b of the optical system holding case 30, and, in the direction perpendicular to the optical axis, in a place where the central axis of the lower fitting pin 76 and the center of the lower positioning hole 330b stand in a line parallel to the optical axis.

According to the above attachment structure of the lamp unit 7, a user can easily replace the lamp unit 7, and can incorporate the lamp unit 7 into the device with high accuracy.

It is known that in light emission of the lamp bulb 170 shown in FIG. 34, the temperature at the vertically upper side of the lamp bulb 170 is higher than the temperature at the lower side thereof, which results in the temperature difference between above and below the lamp bulb 170. This temperature difference between above and below is the greatest at the light emitting portion 172 of the lamp bulb 170. In order to fully bring out the performance of the lamp bulb 170, it is necessary to maintain the temperature of the lamp bulb 170 below a certain temperature, as well as to cool the lamp bulb 170 such that the temperature difference between above and below is held within a certain range.

Figure 39:
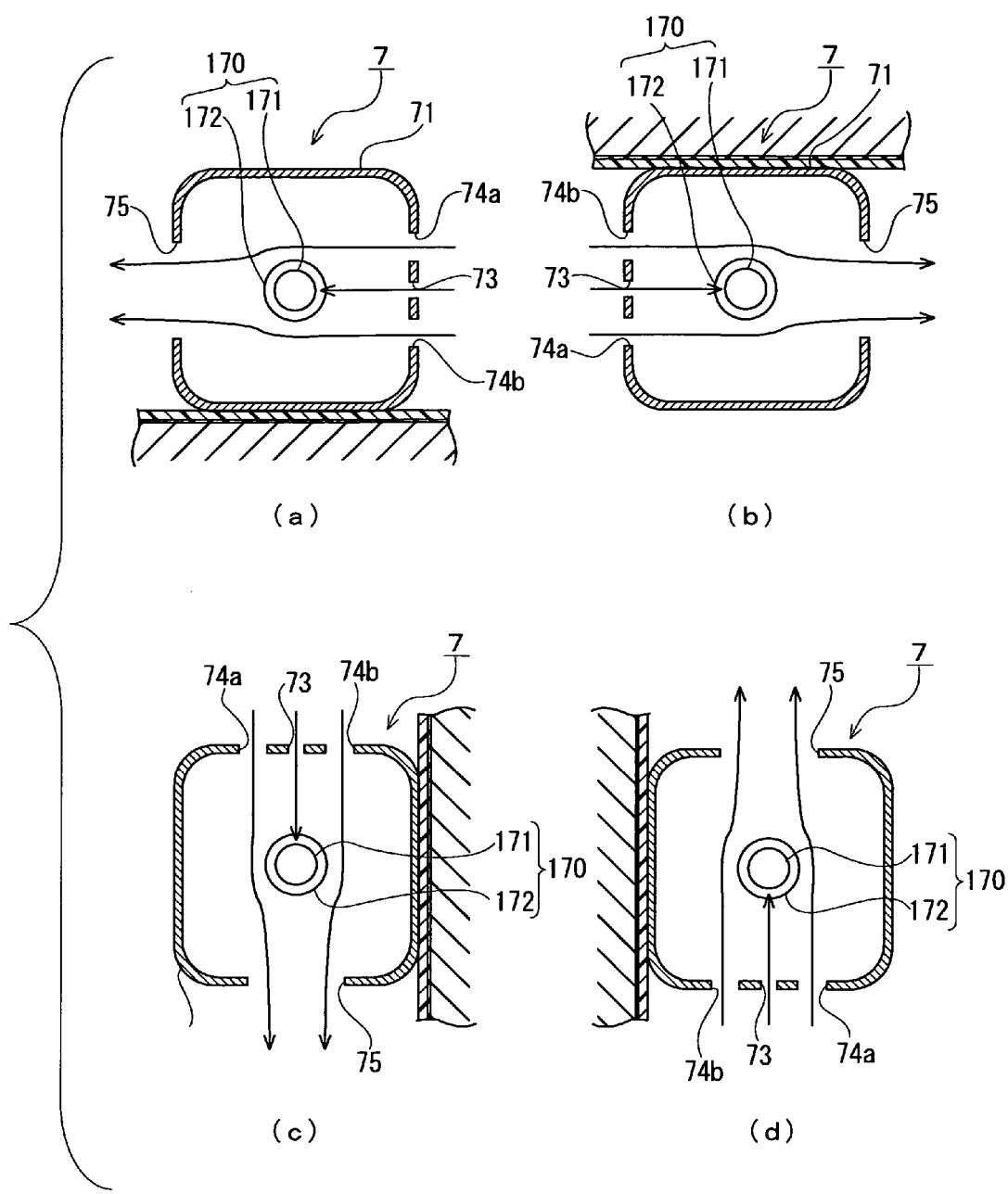
FIG. 39 illustrates flows of cooled air in the lamp unit in the state where the liquid crystal projector device of the present invention is set in four different setting postures.

FIG. 39(a) shows air flows in the lamp unit 7 in the case where the liquid crystal projector device is set as shown in FIG. 1. As shown in FIG. 39(a), among the three air introduction openings 74a, 73, 74b for introducing the air drawn from the lamp cooling fan 190 toward the lamp bulb 170, the first air introduction opening 74a and second air introduction opening 74b are formed at opposite sides of a plane passing through a central axis of the lamp bulb 170 and perpendicular to a side wall of the lamp unit 7, and open toward the light emitting portion 172 of the lamp bulb 170. The third air introduction opening 73 is formed between the first air introduction opening 74a and second air introduction opening 74b, and open toward an end of the glass tube 171 of the lamp bulb 170.

Therefore, the air drawn from the lamp cooling fan 190 shown in FIG. 3 is forcibly separated by part of the side wall of the lamp unit 7 intervening between the first air introduction opening 74a and second air introduction opening 74b, so that the air introduced from the first air introduction opening 74a will flow above the light emitting portion 172 of the lamp bulb 170, and the air introduced from the second air introduction opening 74b will flow below the light emitting portion 172 of the lamp bulb 170. The air introduced from the third air introduction opening 73 will flow toward the end of the lamp bulb 170.

The liquid crystal projector device of the present invention can be attached with an attachment hardware to a ceiling or a vertical wall opposed to a screen with the bottom surface shown in FIG. 1 providing an attachment surface. The liquid crystal projector device of the present invention has functions for rotating by 180 degrees and vertically flipping an image to be projected so as to allow the image to be projected on a screen in a normal direction regardless of its setting. When the liquid crystal projector device is set by being hung from a ceiling, its setting is vertically reversed from the setting shown in FIG. 1, and therefore projection images are rotated by 180 degrees.

When attached to a vertical wall opposed to a screen, the liquid crystal projector device is set with the projection lens 20 shown in FIG. 1 facing vertically upward or downward. Images can be projected forward by a mirror arranged at an inclination angle of 45 degrees relative to an optical axis of image light projected from the projection lens 20. When it is set with the projection lens 20 facing vertically downward, projection images are vertically flipped.

FIG. 39(b) shows air flows in the lamp unit 7 in the case where the liquid crystal projector device is hung from a ceiling. In this setting state, the air drawn from the lamp cooling fan 190 shown in FIG. 3 is forcibly separated by part of the side wall of the lamp unit 7 intervening between the first air introduction opening 74a and second air introduction opening 74b, so that the air introduced from the first air introduction opening 74a will flow below the light emitting portion 172 of the lamp bulb 170, and the air introduced from the second air introduction opening 74b will flow above the light emitting portion 172 of the lamp bulb 170. The air introduced from the third air introduction opening 73 will flow toward the end of the lamp bulb 170.

FIG. 39(c) and FIG. 39(d) show air flows in the lamp unit 7 in the case where the liquid crystal projector device is attached to the vertical wall. In this setting state, the air drawn from the lamp cooling fan 190 shown in FIG. 3 is forcibly separated by part of the side wall of the lamp unit 7 intervening between the first air introduction opening 74a and second air introduction opening 74b, so that the air introduced from the first air introduction opening 74a and second air introduction opening 74b will flow through both right and left sides of the light emitting portion 172 of the lamp bulb 170. The air introduced from the third air introduction opening 73 will flow toward the end of the lamp bulb 170.

Therefore, the air drawn from the lamp cooling fan 190 shown in FIG. 3 will not be vertically blown to the vertically lower surface of the light emitting portion 172 of the lamp bulb 170 in any of the above four settings. This prevents the low-temperature, vertically lower side of the light emitting portion 172 of the lamp bulb 170 from being excessively cooled. Consequently, the temperature difference between the vertically upper side and vertically lower side of the light emitting portion 172 of the lamp bulb 170 can be held within a certain range regardless of the setting of the device.

Figure 36:
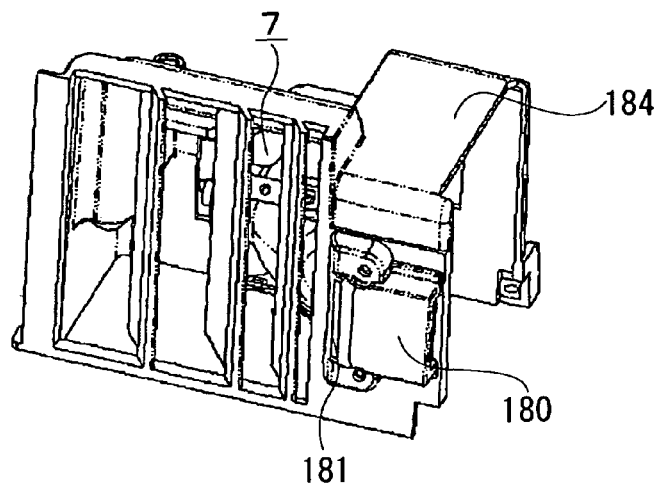
FIG. 36 is a perspective view showing an attached channel housing.
Figure 37:
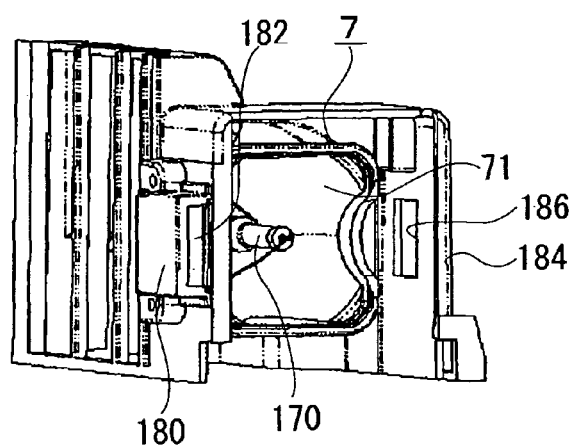
FIG. 37 is a perspective view showing an attached air filter.
Figure 38:
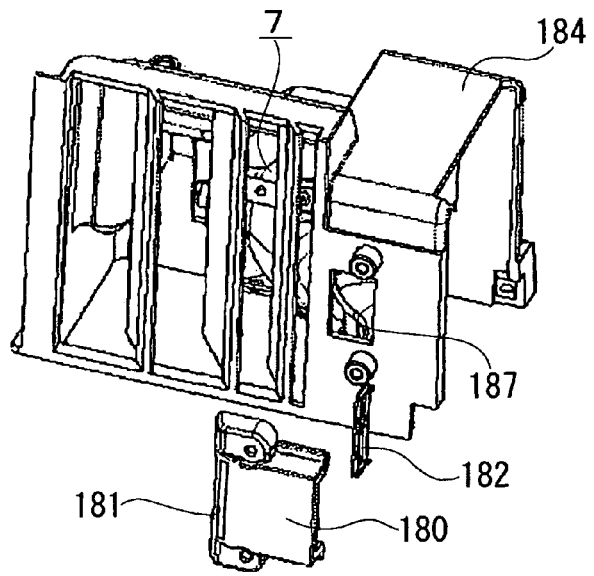
FIG. 38 is an exploded perspective view showing an attachment structure of the channel housing and air filter.

As shown in FIG. 36 through FIG. 38, the lamp unit 7 has attached thereto a cover member 184 for covering the lamp unit 7 in order to prevent leak light. As shown in FIG. 37, the cover member 184 has one side wall thereof provided with a first opening 186 at the opposed position to the three air introduction openings 74a, 73, 74b of the lamp unit 7. As shown in FIG. 38, the opposite side wall of the cover member 184 is provided with a second opening 187 at the opposed position to the air discharge opening 75 of the lamp unit 7, and has attached thereto a channel housing 180 for constituting a channel for the air discharged from the second opening 187.

As shown in FIG. 36 and FIG. 38, the channel housing 180 has a slit-like through hole 181 formed in a side wall thereof intersectingly with the flow of air flowing in the channel housing 180, while, as shown in FIG. 37 and FIG. 38, the channel housing 180 has an air filter 182 of porous material attached to the termination end thereof. The lamp bulb 170 shown in FIG. 37 can explode due to long use. When the lamp bulb 170 explodes, the gas enclosed in the lamp bulb 170 will be discharged. The air filter 182 has a function for adsorbing particulates included in the gas to thereby prevent the particulates included in the gas from being discharged outside the device. A HEPA (High Efficiency Particulate Air) filter is used for the air filter 182.

Figure 40:
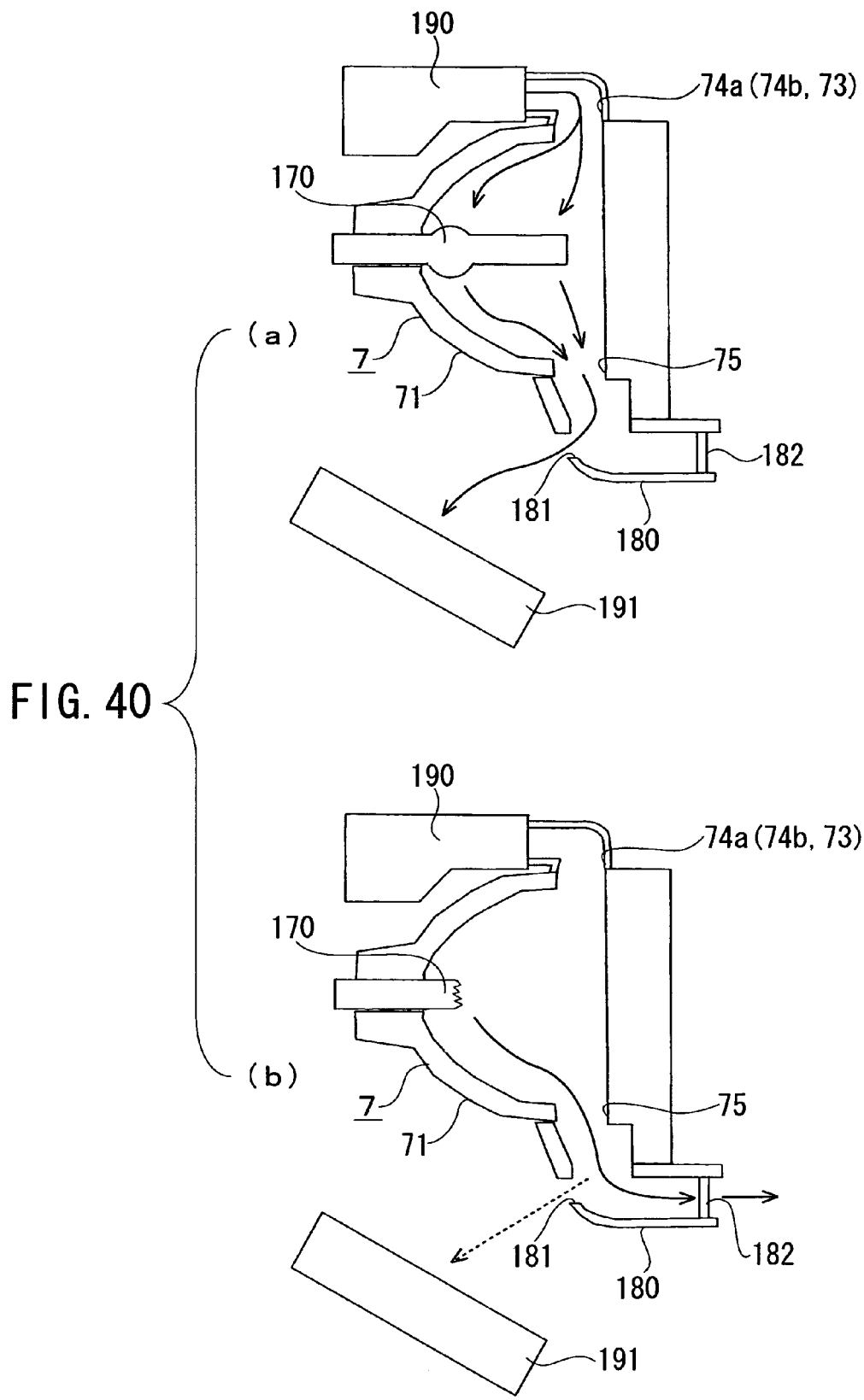
FIG. 40 illustrates a flow of cooled air in the lamp unit in ordinary use, and a flow of air in the lamp unit in a lamp bulb explosion.

FIG. 40(*a*) shows flows of air cooling the lamp bulb 170 in ordinary use. As shown in FIG. 40(*a*), the air drawn from the lamp cooling fan 190 is introduced inside the lamp unit 7 through the three air introduction openings 74a, 73, 74b of the lamp unit 7. The air having cooled the lamp bulb 170 and become high in temperature will flow through the air discharge opening 75 at the opposite side and the channel in the channel housing 180.

The high-temperature air will flow toward the termination end of the channel housing 180, but its flow velocity is not so high that the air cannot pass through the air filter 182. The high-temperature air blocked by the air filter 182 will be discharged outside the channel housing 180 by suction of the exhaust fan 191 through the through hole 181.

In contrast, FIG. 40(*b*) shows flows of gas enclosed in the lamp bulb 170 in explosion of the lamp bulb 170. Because the gas is enclosed in the lamp bulb 170 under high pressure, the internal pressure of the reflector 71 of the lamp unit 7 and the channel housing 180 will drastically rise at the moment of explosion of the lamp bulb 170. This causes the gas to burst into the channel in the channel housing 180.

The gas has a high flow velocity, and therefore will flow along the channel in the channel housing 180, so that only a slight amount of the gas will be discharged outside the channel housing 180 from the through hole 181 formed intersectingly with the channel in the channel housing 180. Consequently, the gas will mostly flow toward the termination end of the channel in the channel housing 180, i.e. air filter 182.

The gas has also a high pressure, and therefore will not be blocked by the air filter 182. The particulates included in the gas will be adsorbed by the air filter 182 while the gas is passing through the air filter 182. Consequently, the purified gas will be discharged outside the channel housing 180 from the termination end of the channel housing 180.

Therefore, the lamp unit 7 of the present invention makes it possible to prevent the particulates included in the gas enclosed in the lamp bulb 170 from being discharged outside the device when the lamp bulb 170 explodes without losing cooling efficiency for the lamp bulb 170.

As mentioned above, the liquid crystal projector device of the present invention employs the ellipsoidal reflector 71 as a reflector constituting the lamp unit 7 shown in FIG. 34. Conventional liquid crystal projector devices have been using a lamp unit having a parabolic reflector. The lamp unit 7 having the ellipsoidal reflector 71 can give a smaller width of light emitted from the lamp unit 7 than that of a lamp unit having a parabolic reflector, whereby the device can be miniaturized.

As shown in FIG. 5, the liquid crystal projector device of the present invention employs the integrator lens illumination system using the two integrator lenses 31, 32. Therefore, as shown in FIG. 34, the concave lens 80 having the concave surface 80a on the light emergence side is attached to the front of the lamp unit 7 in order to collimate the light emitted from the lamp unit 7. As shown in FIG. 35(*b*), the concavity 80b is formed only centrally on the light incidence surface of the concave lens 80. The concave lens 80 has an effective diameter of 37 mm and a focal distance of 99 mm. The concavity 80b has an effective diameter of 10 mm and a focal distance of 48 mm.

Figure 41:
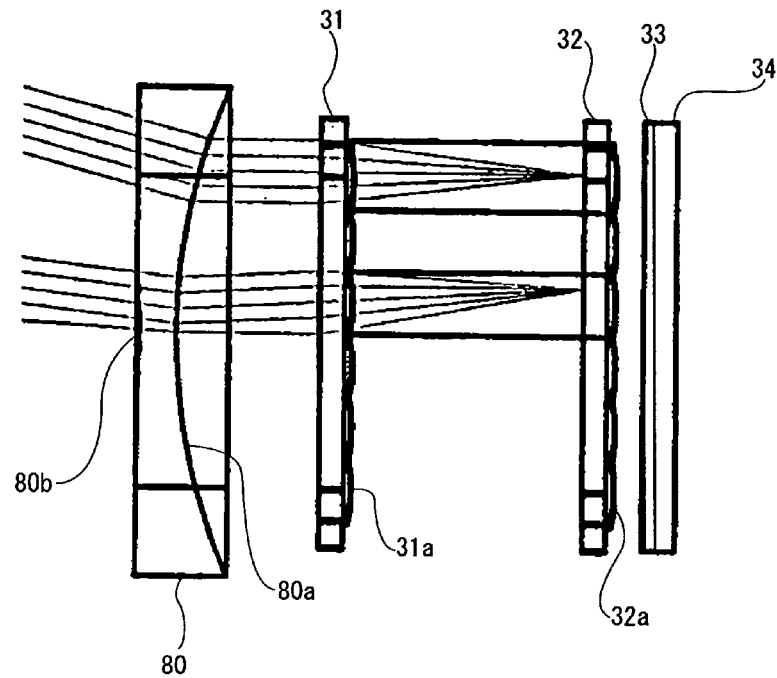
FIG. 41 illustrates light paths through the concave lens, first integrator lens, second integrator lens and a slit plate to a polarization beam splitter.

As shown in FIG. 41, the light emitted from the concave lens 80 of the lamp unit 7 passes through cells 31a constituting the first integrator lens 31, is imaged on respective cells 32a of the second integrator lens 32 corresponding to the cells 31a, and reach through the slit plate 33 to the polarization beam splitter 34.

FIG. 43(*a*) shows arc images of the lamp unit 7 imaged on the polarization beam splitter 34, which are obtained by a computer simulation. FIG. 43(*b*) shows arc images of the lamp unit 7 imaged on the polarization beam splitter 34 in the case of using a conventional concave lens without the concavity 80b formed on the light incidence surface instead of the concave lens 80 of the present invention.

When the lamp unit 7 having the ellipsoidal reflector 71 is used as an illumination system, the light emitted from the light emitting portion 172 of the lamp unit 7 is reflected by the reflector 71, and condensed centrally of the concave lens 80. Therefore, the light emitted from the concave lens 80 at its central portion has a high brightness compared with the light emitted from the periphery.

Figure 42:
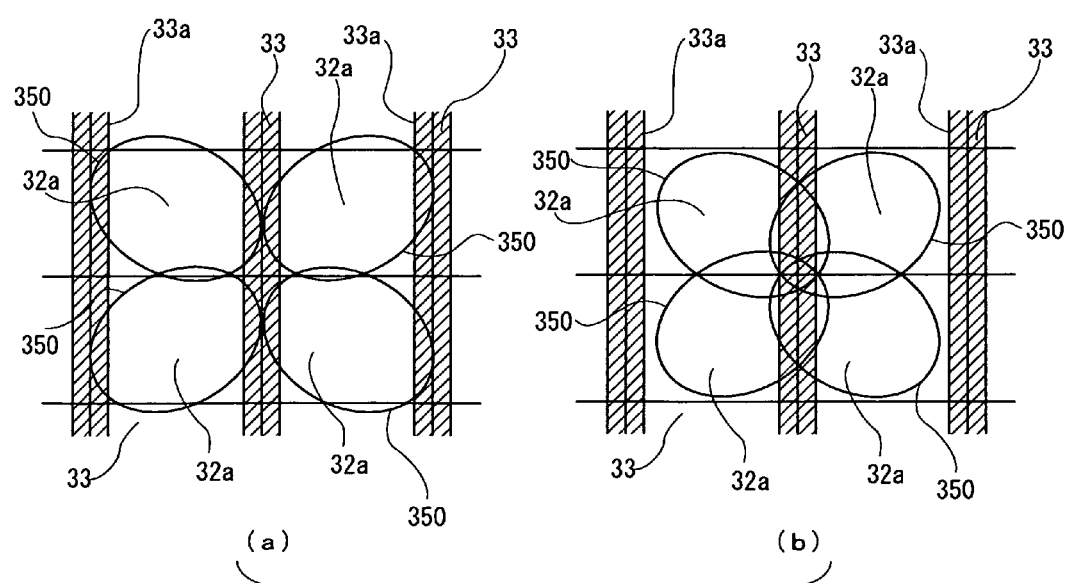
FIG. 42 illustrates arc images formed on a plurality of cells constituting the central portion of the second integrator lens in the case of using the concave lens of the present invention, and arc images formed on a plurality of cells constituting the central portion of the second integrator lens in the case of using a conventional concave lens.

FIG. 42(*a*) shows arc images 350 imaged on a plurality of central constituent cells 32a of the second integrator lens 32 of the present invention. FIG. 42(*b*) shows arc images 350 imaged on the plurality of central constituent cells 32a of the second integrator lens 32 in the case of using the conventional concave lens without the concavity 80b formed on the light incidence surface instead of the concave lens 80 of the present invention.

As shown in FIGS. 43(*a*)(*b*), arc images imaged centrally on the polarization beam splitter 34 are larger than arc images imaged on a plurality of peripheral constituent cells 32a. As shown in FIGS. 42(*a*)(*b*), the arc images 350 are imaged on and beyond the respective central constituent cells 32a of the second integrator lens 32.

Each of the arc images 350 is caused to have distortion by the aberration caused by the reflector 71, concave lens 80 and first integrator lens 31 of the lamp unit 7. Therefore, each of the arc images 350 is in the form of an approximate ellipse along a diagonal of the respective cells 32a. In FIGS. 42(*a*)(*b*), hatching shows areas where light is blocked by the slit plate 33. Light is blocked by the slit plate 33 in areas of each of the arc images 350 not exposed from the slit apertures 33a of the slit plate 33.

Therefore, it is important to reduce the amount of light blocked by the slit plate 33 in order to improve utilization efficiency of the light emitted from the lamp unit 7. For this purpose, it is necessary to increase the area of arc images 350 imaged on respective cells of the second integrator lens 32 corresponding to open areas of the slit apertures 33a of the slit plate 33, as well as to increase the average brightness of the arc images 350.

As shown in FIG. 42(b), in the illumination system using the conventional concave lens, the arc images 350 are formed leaningly toward the center of the second integrator lens 32 relative to the respective central constituent cells 32a of the second integrator lens 32. Therefore, the slit plate 33 blocks a larger amount of light, which results in a problem of a smaller amount of light reaching the polarization beam splitter 34 at its central portion as shown in FIG. 43(b).

Accordingly, the light irradiation position for the cells 32a of the second integrator lens 32 was eagerly examined with computer simulations and experiments. The result reveals that a larger amount of light is allowed to reach the polarization beam splitter 34 shown in FIG. 41 by, as shown in FIG. 42(a), moving the arc images 350 formed on the respective central constituent cells 32a of the second integrator lens 32 outward relative to the center of the second integrator lens 32 from the position shown in FIG. 42(b).

Accordingly, as shown in FIG. 35(b) and FIG. 41, the concavity 80b is formed only centrally on the light incidence surface of the concave lens 80. As shown in FIG. 41, the light incident on a central portion of the concave lens 80 is slightly refracted outward from the central portion by passing through the concavity 80b of the concave lens 80. The light having passed via the concavity 80b and concave surface 80a through the concave lens 80 passes through the central constituent cells 31a of the first integrator lens 31, and is imaged on the respective central constituent cells 32a of the second integrator lens 32. Due to the lens effect of the concavity 80b of the concave lens 80, the arc images imaged on the respective central constituent cells 32a of the second integrator lens 32 are formed in positions moved outward relative to the center of the second integrator lens 32 as shown in FIG. 42(a) from the position shown in FIG. 42(b).

Thus, as shown in FIG. 43(a), a larger amount of light reaches the polarization beam splitter 34 at its central portion than in the illumination system using the conventional concave lens shown in FIG. 43(b). Consequently, utilization efficiency of the light emitted from the lamp unit 7 can be improved.

When the lamp unit 7 having the ellipsoidal reflector 71 is used to constitute an illumination system, it is possible to improve utilization efficiency of the light emitted from the lamp unit 7 without causing an increase in the number of components because the concave lens 80 is an essential component. Further, the concavity 80b has a simple shape, which makes it easy to work the concave lens 80. In addition, the optical system 3 can be constructed using the two integrator lenses 31, 32 having a plurality of cells 31a, 32a having a simple shape arranged in the form of a matrix, which can reduce production costs more than conventionally.

Cooling System 8

The cooling system 8 for cooling a plurality of optical components constituting the image synthesizer 4 is, as shown in FIG. 4, disposed below the image synthesizer 4 shown in FIG. 3. The cooling system 8 includes two cooling fans 81, 81 placed on the bottom surface of the lower half case 12 and a channel housing 82 constituting a channel for sending the outside air drawn from both cooling fans 81, 81 toward the liquid crystal panels 43b, 43g, 43r and incidence polarizing plates 41b, 41g, 41r for the respective colors shown in FIG. 5. The channel housing 82 has an upper surface thereof formed with air discharge openings 82b, 82b, 82g, 82g, 82r, 82r toward the liquid crystal panels 43b, 43g, 43r and incidence polarizing plates 41b, 41g, 41r for the respective colors. Both cooling fans 81, 81 are disposed in the channel housing 82.

Both cooling fans 81, 81 have an air filter (not shown) attached to an outside air intake opening thereof in order to prevent dust from entering the inside of the device. The channel in the channel housing 82 is provided with a temperature sensor (not shown) for detecting the temperature of the outside air drawn from both cooling fans 81, 81.

As shown in FIG. 44, the air filter 83 is attached to each of the cooling fans 81, and each of the cooling fans 81 and the temperature sensor 84 are connected to a microcomputer 89. The cooling fans 81 have a function of outputting a signal to change the on/off state each time it rotates a predetermined number of times (hereafter referred to as a revolutions detection signal). The revolutions detection signal and a temperature detection signal output from the temperature sensor 84 are captured into the microcomputer 89.

Further connected to the microcomputer 89 are a fan drive circuit 85, a memory 86, and a warning means 88. The microcomputer 89 feedback-controls the drive voltage to be given to the cooling fans 81 based on the temperature detection signal output from the temperature sensor 84 and the revolutions detection signal output from the cooling fans 81 such that the number of revolutions of the cooling fans 81 will be a certain number of revolutions in accordance with an outside air temperature T. The fan drive circuit 85 controls the drive voltage for driving the cooling fans 81 in response to instructions from the microcomputer 89.

Figure 45:
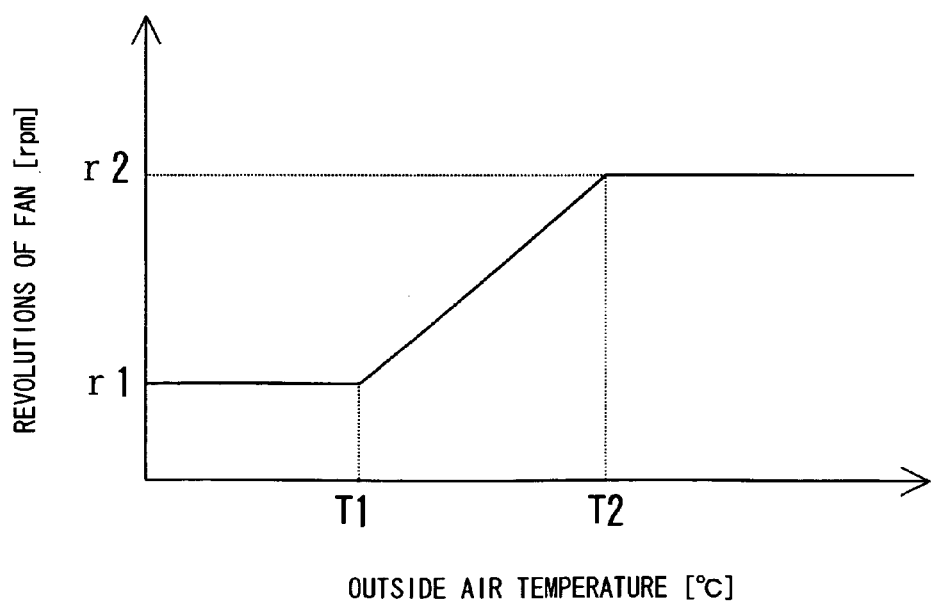
FIG. 45 is a graph showing a relationship between outside air temperatures and revolutions of a cooling fan.

As shown in FIG. 45, if the outside air temperature T is less than a predetermined temperature T1, for example, the cooling fans 81 are driven at a predetermined number of revolutions r1. On the other hand, if the outside air temperature T exceeds a predetermined temperature T2, the cooling fans 81 are driven at a predetermined number of revolutions r2 greater than the number of revolutions r1. If the outside air temperature T is not less than T1 and not more than T2, they are driven at a predetermined number of revolutions r3 obtained by the following formula 1.

$$r3=(r2-r1)/(T2-T1)\times(T-T1)+r1 \qquad \text{Formula 1}$$

Besides the predetermined temperatures T1 and T2 and predetermined numbers of revolutions r1 and r2, the memory 86 shown in FIG. 44 stores a reference drive voltage V1 referred to when the cooling fans 81 are driven at the predetermined number of revolutions r1 and a reference drive voltage V2 referred to when the cooling fans 81 are driven at the predetermined number of revolutions r2.

The microcomputer 89 detects the outside air temperature T based on the temperature detection signal output from the temperature sensor 84. When determining that the outside air temperature T is lower than the predetermined temperature T1, the microcomputer 89 instructs the fan drive circuit 85 to give the cooling fans 81 the reference drive voltage V1, so that the cooling fans 81 will be driven at the reference drive voltage V1.

The microcomputer 89 then detects the number of revolutions Rf of the cooling fans 81 based on the revolutions detection signal output from the cooling fans 81. When determining that the number of revolutions Rf is smaller than the predetermined number of revolutions r1, the microcomputer 89 gives the fan drive circuit 85 instructions for changing the drive voltage to be given to the cooling fans 81 to the voltage (V1+ΔV) obtained by adding a predetermined voltage ΔV to the current drive voltage V1. Consequently, the cooling fans 81 will be driven at the drive voltage (V1+ΔV).

On the other hand, when determining that the number of revolutions Rf is greater than the predetermined number of revolutions r1, the microcomputer 89 gives the fan drive circuit 85 instructions for changing the drive voltage to be given to the cooling fans 81 to the voltage (V1−ΔV) obtained by subtracting the predetermined voltage ΔV from the current drive voltage V1. Consequently, the cooling fans 81 will be driven at the drive voltage (V1−ΔV). When it is determined that the number of revolutions Rf is equal with the predetermined number of revolutions r1, the drive voltage of the cooling fans 81 are maintained without being changed.

Repetition of the above steps maintains the number of revolutions of the cooling fans 81 at the predetermined number of revolutions r1.

Similarly, when the microcomputer 89 detects the outside air temperature T based on the temperature detection signal output from the temperature sensor 84, and determines that the outside air temperature T is higher than the predetermined temperature T2, the microcomputer 89 instructs the fan drive circuit 85 to give the cooling fans 81 the reference drive voltage V2, so that the cooling fans 81 will be driven at the reference drive voltage V2.

The microcomputer 89 then detects the number of revolutions Rf of the cooling fans 81 based on the revolutions detection signal output from the cooling fans 81. When determining that the number of revolutions Rf is smaller than the predetermined number of revolutions r2, the microcomputer 89 gives the fan drive circuit 85 instructions for changing the drive voltage to be given to the cooling fans 81 to the voltage (V2+ΔV) obtained by adding the predetermined voltage ΔV to the current drive voltage V2. Consequently, the cooling fans 81 will be driven at the drive voltage (V2+ΔV).

On the other hand, when determining that the number of revolutions Rf is greater than the predetermined number of revolutions r2, the microcomputer 89 gives the fan drive circuit 85 instructions for changing the drive voltage to be given to the cooling fans 81 to the voltage (V2−ΔV) obtained by subtracting the predetermined voltage ΔV from the current drive voltage V2. Consequently, the cooling fans 81 will be driven at the drive voltage (V2−ΔV). When it is determined that the number of revolutions Rf is equal with the predetermined number of revolutions r2, the drive voltage of the cooling fans 81 are maintained without being changed.

Repetition of the above steps maintains the number of revolutions of the cooling fans 81 at the predetermined number of revolutions r2.

When the microcomputer 89 detects the outside air temperature T based on the temperature detection signal output from the temperature sensor 84, and determines that the outside air temperature T is between the predetermined temperature T1 and predetermined temperature T2, the predetermined number of revolutions r3 at which the cooling fans 81 are to rotate in the outside air temperature T is first calculated based on the formula 1. The microcomputer 89 then calculates a reference drive voltage V3 to be given to the cooling fans 81 with reference to the predetermined numbers of revolutions r1 and r2, reference drive voltages V1 and V2, and calculated predetermined number of revolutions r3, and instructs the fan drive circuit 85 to give the cooling fans 81 the reference drive voltage V3. Consequently, the cooling fans 81 will be driven at the reference drive voltage V3. For example, the reference drive voltage V3 is calculated by the following formula 2.

$$V3=(V2-V1)/(r2-r1)\times(r3-r1)+V1 \qquad \text{Formula 2}$$

The microcomputer 89 then detects the number of revolutions Rf of the cooling fans 81 based on the revolutions detection signal output from the cooling fans 81. When determining that the number of revolutions Rf is smaller than the predetermined number of revolutions r3, the microcomputer 89 gives the fan drive circuit 85 instructions for changing the drive voltage to be given to the cooling fans 81 to the voltage (V3+ΔV) obtained by adding the predetermined voltage ΔV to the current drive voltage V3. Consequently, the cooling fans 81 will be driven at the drive voltage (V3+ΔV).

On the other hand, when determining that the number of revolutions Rf is greater than the predetermined number of revolutions r3, the microcomputer 89 gives the fan drive circuit 85 instructions for changing the drive voltage to be given to the cooling fans 81 to the voltage (V3−ΔV) obtained by subtracting the predetermined voltage ΔV from the current drive voltage V3. Consequently, the cooling fans 81 will be driven at the drive voltage (V3−ΔV). When it is determined that the number of revolutions Rf is equal with the predetermined number of revolutions r3, the drive voltage of the cooling fans 81 are maintained without being changed.

Repetition of the above steps maintains the number of revolutions of the cooling fans 81 at the predetermined number of revolutions r3.

If the air filters 83 of the cooling fans 81 are clogged due to long use, an insufficient amount of outside air is drawn from the cooling fan 81, while a certain amount of air is discharged outside the device from the exhaust fan 191 shown in FIG. 3. This gives a negative pressure in the channel housing 82, which in turn gives a small load when the cooling fans 81 rotate. In this case, the cooling fans 81 will receive a reduced drive voltage although the number of revolutions will not increase because the cooling fans 81 are driven at a predetermined number of revolutions determined depending on the outside air temperature T.

Accordingly, when the cooling fans 81 are driven at a predetermined number of revolutions determined depending on the outside air temperature T, the microcomputer 89 compares an actual drive voltage Vf given to the cooling fans 81 with the reference drive voltage Vref, determines that the air filters 83 are clogged when the difference between both voltages is a certain value or more, gives a warning that the air filters 83 are clogged, and performs a protection operation of shutting off or reducing the power to be supplied to the lamp unit 7 lower than usual.

Figure 46:
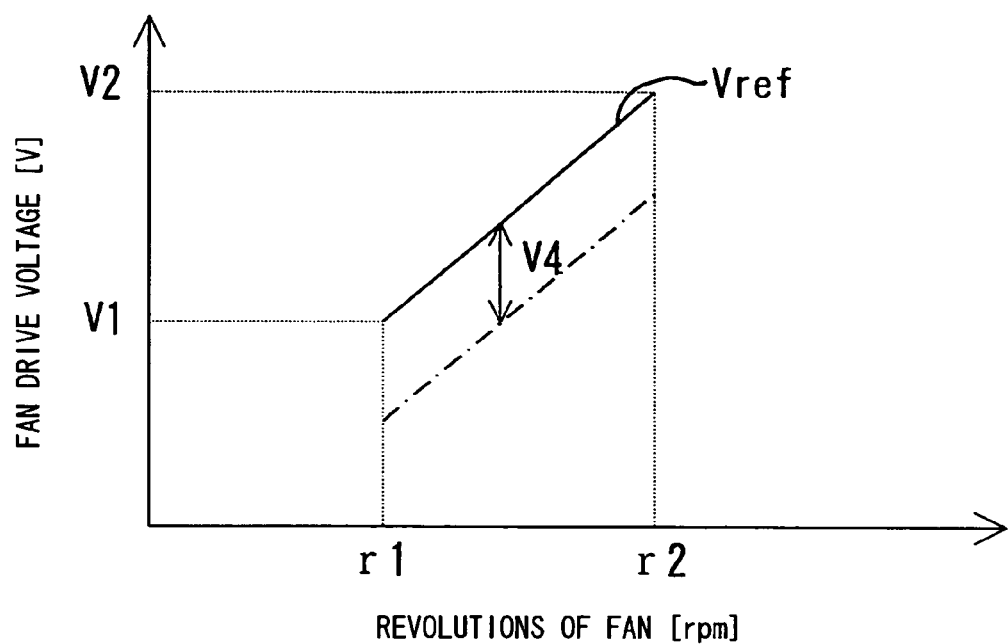
FIG. 46 is a graph showing a relationship between revolutions of the cooling fan and reference drive voltages Vref, and a relationship between revolutions of the cooling fan and drive voltages where it is determined that the air filter is clogged.

In FIG. 46, the solid line indicates a relationship between the number of revolutions of the cooling fans 81 and the reference drive voltage Vref, and the dashed line indicates a relationship between the number of revolutions of the cooling fans 81 and the drive voltage at which it is determined that the air filters 83 are clogged. The warning operation and protection operation will be performed when the difference between the reference drive voltage Vref and actual drive voltage is a predetermined value V4 or more as shown in FIG. 46.

Figure 47:
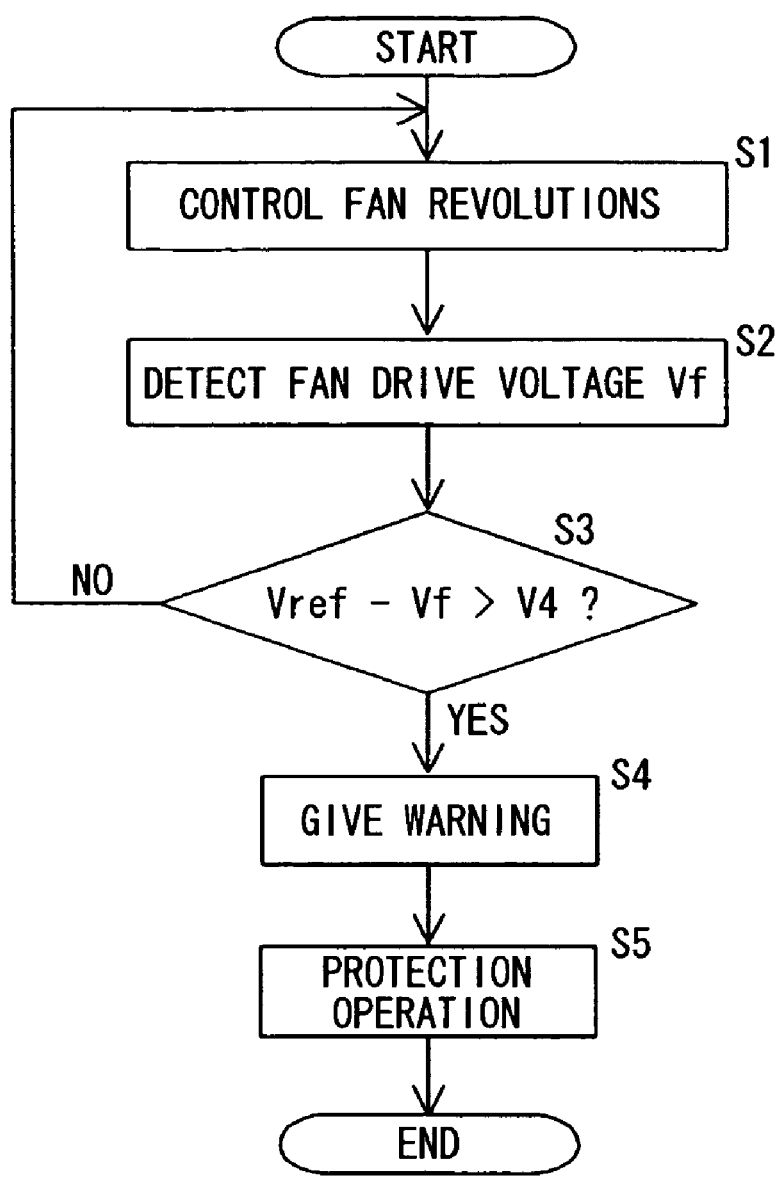
FIG. 47 is a flow chart showing a control procedure to be performed by a microcomputer in detecting clogging of the air filter.
Figure 48:
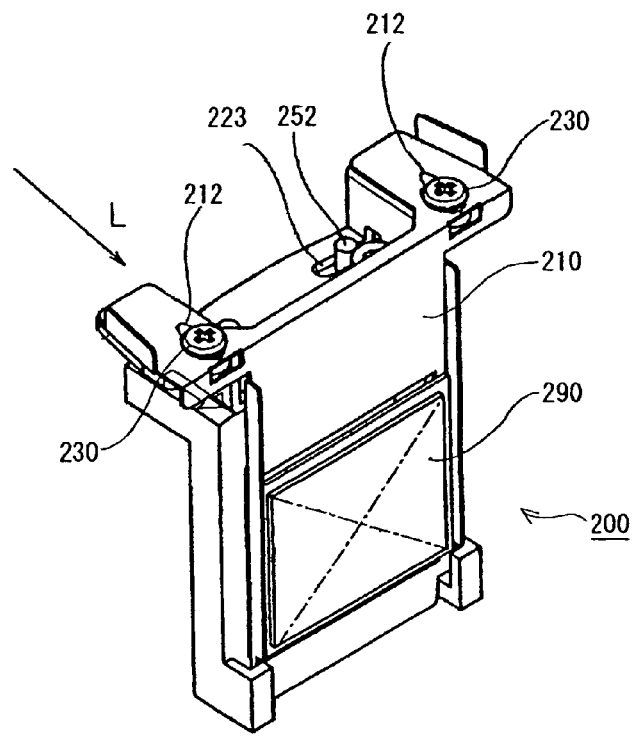
FIG. 48 is a perspective view of a conventional optical compensation sheet holder.
Figure 49:
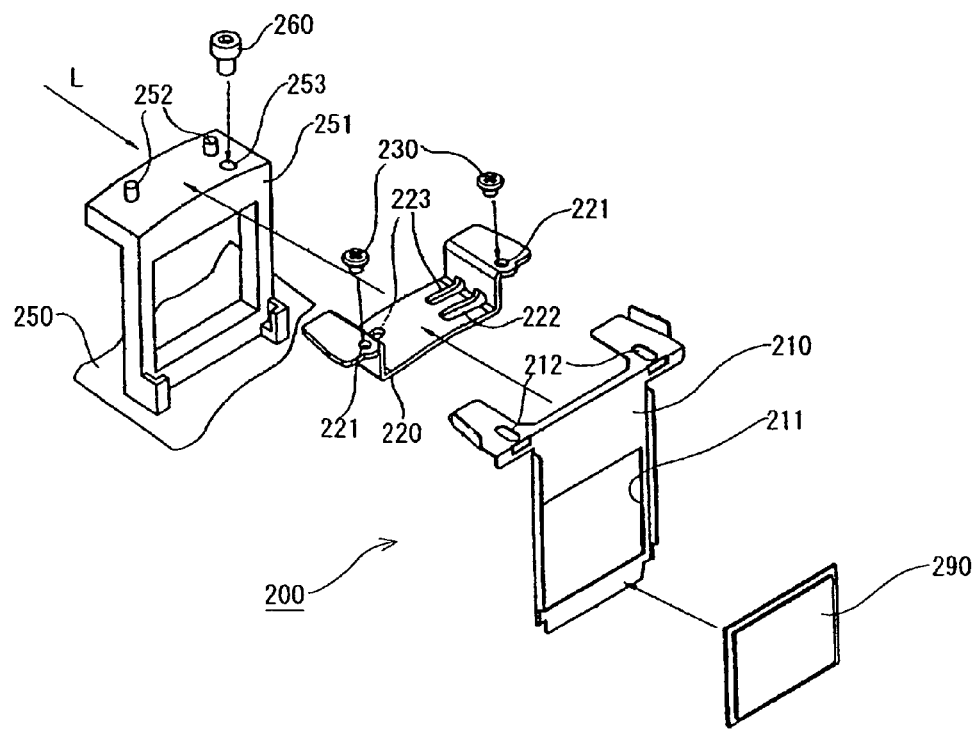
FIG. 49 is an exploded perspective view of the optical compensation sheet holder.

FIG. 47 shows a control procedure to be performed by the microcomputer 89 during clogging detection for the air filters 83. First, in step S1, the number of revolutions Rf of the cooling fans 81 are detected by the revolutions detection signal output from the cooling fans 81. Based on the number of revolutions Rf, the drive voltage Vf to be given to the cooling fans 81 are feedback-controlled such that the cooling fans 81 are driven at a predetermined number of revolutions determined depending on the outside air temperature T. Then, in step S2, the drive voltage Vf is detected when the cooling fans 81 rotate at the predetermined number of revolutions. In step S3, an inquiry is made as to whether or not the difference between the reference drive voltage Vref determined depending on the predetermined number of revolutions and the drive voltage Vf is greater than the predetermined value V4. If the inquiry in step S3 is answered in the negative, then step S1 follows to continue the feedback control of the drive voltage Vf to be given to the cooling fans 81.

If the inquiry in step S3 is answered in the affirmative, then step S4 follows to give a warning that the air filters 83 are clogged. The warning is given, for example, by lighting or flashing at least one of a plurality of warning lights constituting the warning portion 15 shown in FIG. 1. Alternatively, a message that the air filters 83 are clogged may be displayed on a forward projection screen.

Step S5 follows thereafter to shut off or reduce the power to be supplied to the lamp unit 7 lower than usual in order to suppress heat generation of a heat source of the lamp unit 7 to thereby perform the protection operation for preventing temperature rise of the liquid crystal panels 43*b*, 43*g*, 43*r* and incidence polarizing plates 41*b*, 41*g*, 41*r* for the respective colors shown in FIG. 5 to end the processing.

Step S5 may perform a protection operation of increasing the number of revolutions of the cooling fans 81 higher than usual in order to suppress the reduction of the outside air drawn from the cooling fans 81 due to clogging of the air filters.

According to the above driving method for the cooling fans 81, the cooling fans 81 are driven at a predetermined number of revolutions determined depending on the outside air temperature T, and therefore the cooling fans 81 draw an approximately constant amount of outside air regardless of individual differences of the cooling fans 81. Therefore, there is no variation in the cooling effect of the cooling system 8 between liquid crystal projector devices, which can always provide a constant cooling effect regardless of individual differences of the cooling fans 81.

In addition, clogging of the air filters 83 can be detected by comparing the actual drive voltage Vf of the cooling fans 81 with the reference drive voltage Vref, which eliminates the necessity of a temperature sensor for detecting the temperature of the liquid crystal panels 43*b*, 43*g*, 43*r* and incidence polarizing plates 41*b*, 41*g*, 41*r* for the respective colors shown in FIG. 5 unlike in conventional devices.

The present invention is not limited to the foregoing embodiment but can be modified variously by one skilled in the art without departing from the spirit of the invention as set forth in the appended claims.

What is claimed is:

1. A projector device comprising:

a light source;

an optical system for separating light from the light source into light of three primary colors;

an image synthesizer for synthesizing the light of three primary colors into color image light;

a holding case for holding the image synthesizer and the optical system;

a liquid crystal panel and a polarizing plate oppositely arranged on each optical path of the light of three primary colors;

a rectangular optical compensation sheet for compensating light birefringence due to the liquid crystal panel arranged between the liquid crystal panel and the polarizing plate;

an optical compensation sheet holder to hold the optical compensation sheet, the optical compensation sheet being attached on the optical path, the optical compensation sheet holder comprising a frame for holding the optical compensation sheet;

a turning member attached to the holding case, the turning member being turnable on a rotation axis perpendicular to the optical compensation sheet held by the frame; and a sliding member attached to the turning member, the sliding member being movable along the direction of the rotation axis perpendicular to the optical compensation sheet, wherein the sliding member contacts a corner part of the frame such that movement of the sliding member along the direction of the rotation axis perpendicular to the optical compensation sheet causes the frame to turn on a rotation axis parallel to the optical compensation sheet.

2. The projector device according to claim 1, wherein the frame has a pair of columnar shanks protruded outward from an outer peripheral thereof, and the turning member has a rectangular opening provided centrally therein, and a pair of supports for supporting the shanks of the frame, provided around the opening, the pair of columnar shanks providing the rotation axis of the frame.

3. The projector device according to claim 1, wherein the optical compensation sheet holder comprises a slide member attached to the turning member slidably along an optical axis of the optical compensation sheet, and the slide member has a pinching part for pinching a turning end of the frame, provided at one end thereof.

4. The projector device according to claim 3, wherein the turning member is provided with a first long hole longer in a direction perpendicular to the optical axis, and the slide member is provided with a second long hole longer in the optical axis direction, the slide member being fastened to the turning member by a first screw through the second long hole, the turning member being fastened to the holding case by a second screw through the first long hole.

5. A projector device comprising:

a light source;

a liquid crystal panel and a polarizing plate oppositely arranged on optical path of the light;

an optical compensation sheet for compensating light birefringence due to the liquid crystal panel, arranged between the liquid crystal panel and the polarizing plate;

an optical compensation sheet holder to hold the optical compensation sheet, the optical compensation sheet being attached on the optical path, the optical compensation sheet holder comprising a frame for holding the optical compensation sheet; and a turning member turnable on a rotation axis perpendicular to the optical compensation sheet held by the frame;

a sliding member attached to the turning member, the sliding member being movable along the direction of the rotation axis perpendicular to the optical compensation sheet, wherein the sliding member contacts a corner part of the frame such that movement of the sliding member along the direction of the rotation axis perpendicular to the optical compensation sheet causes the frame to turn on a rotation axis parallel to the optical compensation sheet.

* * * * *